US011468282B2

(12) United States Patent
Sanghavi et al.

(10) Patent No.: US 11,468,282 B2
(45) Date of Patent: Oct. 11, 2022

(54) VIRTUAL ASSISTANT IN A COMMUNICATION SESSION

(71) Applicant: Apple Inc., Cupertino, CA (US)

(72) Inventors: Mehul K. Sanghavi, Sunnyvale, CA (US); Jeffrey P. Schwerdtfeger, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 441 days.

(21) Appl. No.: 16/595,108

(22) Filed: Oct. 7, 2019

(65) Prior Publication Data

US 2020/0104668 A1 Apr. 2, 2020

Related U.S. Application Data

(63) Continuation of application No. 14/713,410, filed on May 15, 2015, now Pat. No. 10,460,227.

(51) Int. Cl.
*G06N 3/00* (2006.01)
*H04L 51/02* (2022.01)
(Continued)

(52) U.S. Cl.
CPC ............. *G06N 3/006* (2013.01); *G06F 40/30* (2020.01); *G06F 40/35* (2020.01); *G06Q 10/10* (2013.01); *H04L 51/02* (2013.01); *H04L 51/212* (2022.05)

(58) Field of Classification Search
CPC ...... G06N 99/005; G06N 3/006; G06N 7/005; G06N 5/04; G06N 5/02; G06N 3/0436;
(Continued)

(56) References Cited

U.S. PATENT DOCUMENTS 7,475,010 B2 1/2009 Chao
7,475,015 B2 1/2009 Epstein et al.
(Continued)

FOREIGN PATENT DOCUMENTS

AU 2014100581 B4 9/2014
AU 2015203483 A1 7/2015
(Continued)

OTHER PUBLICATIONS

Office Action received for Chinese Patent Application No. 201680027821.1, dated Aug. 5, 2020, 20 pages (9 pages of English Translation and 11 pages of Official Copy).
(Continued)

*Primary Examiner* — Paulinho E Smith
(74) *Attorney, Agent, or Firm* — Dentons US LLP

(57) ABSTRACT

Disclosed are systems, methods, and non-transitory computer-readable storage media for utilizing a virtual assistant as part of a communication session. One or more of the participant users can select to utilize a virtual assistant to assist the participant users with tasks during the communication session. A user can use a communication application to enter a message directed to the virtual assistant. The virtual assistant can analyze the entered message and determine that the message was directed to the virtual assistant rather than to the other participants of the communication session. As a result, the message will not be transmitted to the other participants of the communication session and the virtual assistant will assist the user with the identified task. A virtual assistant can assist a user with a variety of different tasks. For example, the virtual assistant can gather requested data for the user from one or more web servers, such as weather data, traffic data, etc.

45 Claims, 19 Drawing Sheets

Receive Input to Utilize Virtual Assistant 305
Notify Other Participants that Virtual Assistant has been Added to Communication Session 310
Receive Message to be Included in Communication Session 315
Message Intended for Virtual Assistant? 320
Identify and Perform Requested Task 325
Transmit Message as Part of Communication Session 330
Task Identified? 335
Assist with Task 340

(51) Int. Cl.
*G06Q 10/10* (2012.01)
*G06F 40/30* (2020.01)
*G06F 40/35* (2020.01)
*H04L 51/212* (2022.01)

(58) Field of Classification Search
CPC ............ G06N 3/06; G06N 3/08; G06N 5/022; G06N 5/025; G06N 5/045; G06F 17/2785; G06F 17/2765; G06F 17/277; G06F 17/278; G06Q 10/10; G06Q 10/02; G06Q 10/00; G06Q 10/06; G10L 15/22; G10L 2015/223
See application file for complete search history.

(56) References Cited

U.S. PATENT DOCUMENTS 7,475,063 B2 1/2009 Datta et al.
7,477,238 B2 1/2009 Fux et al.
7,477,240 B2 1/2009 Yanagisawa
7,478,037 B2 1/2009 Strong
7,478,091 B2 1/2009 Mojsilovic et al.
7,478,129 B1 1/2009 Chemtob
7,479,948 B2 1/2009 Kim et al.
7,479,949 B2 1/2009 Jobs et al.
7,483,832 B2 1/2009 Tischer
7,483,894 B2 1/2009 Cao
7,487,089 B2 2/2009 Mozer
7,487,093 B2 2/2009 Mutsuno et al.
7,490,034 B2 2/2009 Finnigan et al.
7,490,039 B1 2/2009 Shaffer et al.
7,493,251 B2 2/2009 Gao et al.
7,493,560 B1 2/2009 Kipnes et al.
7,496,498 B2 2/2009 Chu et al.
7,496,512 B2 2/2009 Zhao et al.
7,499,923 B2 3/2009 Kawatani
7,502,738 B2 3/2009 Kennewick et al.
7,505,795 B1 3/2009 Lim et al.
7,508,324 B2 3/2009 Suraqui
7,508,373 B2 3/2009 Lin et al.
7,516,123 B2 4/2009 Betz et al.
7,519,327 B2 4/2009 White
7,519,398 B2 4/2009 Hirose
7,522,927 B2 4/2009 Fitch et al.
7,523,036 B2 4/2009 Akabane et al.
7,523,108 B2 4/2009 Cao
7,526,466 B2 4/2009 Au
7,526,738 B2 4/2009 Ording et al.
7,528,713 B2 5/2009 Singh et al.
7,529,671 B2 5/2009 Rockenbeck et al.
7,529,676 B2 5/2009 Koyama
7,529,677 B1 5/2009 Wittenber
7,535,997 B1 5/2009 McQuaide, Jr. et al.
7,536,029 B2 5/2009 Choi et al.
7,536,565 B2 5/2009 Girish et al.
7,538,685 B1 5/2009 Cooper et al.
7,539,619 B1 5/2009 Seligman et al.
7,539,656 B2 5/2009 Fratkina et al.
7,541,940 B2 6/2009 Upton
7,542,967 B2 6/2009 Hurst-Hiller et al.
7,542,971 B2 6/2009 Thione et al.
7,543,232 B2 6/2009 Easton, Jr. et al.
7,546,382 B2 6/2009 Healey et al.
7,546,529 B2 6/2009 Reynar et al.
7,548,895 B2 6/2009 Pulsipher
7,552,045 B2 6/2009 Barliga et al.
7,552,055 B2 6/2009 Lecoeuche
7,555,431 B2 6/2009 Bennett
7,555,496 B1 6/2009 Lantrip et al.
7,558,381 B1 7/2009 Ali et al.
7,558,730 B2 7/2009 Davis et al.
7,559,026 B2 7/2009 Girish et al.
7,561,069 B2 7/2009 Horstemeyer
7,562,007 B2 7/2009 Hwang
7,562,032 B2 7/2009 Abbosh et al.
7,565,104 B1 7/2009 Brown et al.
7,565,380 B1 7/2009 Venkatachary
7,567,861 B2 7/2009 Inagaki
7,568,151 B2 7/2009 Bargeron et al.
7,571,092 B1 8/2009 Nieh
7,571,106 B2 8/2009 Cao et al.
7,577,522 B2 8/2009 Rosenberg
7,580,551 B1 8/2009 Srihari et al.
7,580,576 B2 8/2009 Wang et al.
7,580,839 B2 8/2009 Tamura et al.
7,584,092 B2 9/2009 Brockett et al.
7,584,093 B2 9/2009 Potter et al.
7,584,278 B2 9/2009 Rajarajan et al.
7,584,429 B2 9/2009 Fabritius
7,593,868 B2 9/2009 Margiloff et al.
7,596,269 B2 9/2009 King et al.
7,596,499 B2 9/2009 Anguera et al.
7,596,606 B2 9/2009 Codignotto
7,596,765 B2 9/2009 Almas
7,599,918 B2 10/2009 Shen et al.
7,603,349 B1 10/2009 Kraft et al.
7,603,381 B2 10/2009 Burke et al.
7,603,684 B1 10/2009 Ellis
7,606,444 B1 10/2009 Erol et al.
7,606,712 B1 10/2009 Smith et al.
7,607,083 B2 10/2009 Gong et al.
7,609,179 B2 10/2009 Diaz-Gutierrez et al.
7,610,258 B2 10/2009 Yuknewicz et al.
7,613,264 B2 11/2009 Wells et al.
7,614,008 B2 11/2009 Ording
7,617,094 B2 11/2009 Aoki et al.
7,620,407 B1 11/2009 Donald et al.
7,620,549 B2 11/2009 Di Cristo et al.
7,620,894 B1 11/2009 Kahn
7,623,119 B2 11/2009 Autio et al.
7,624,007 B2 11/2009 Bennett
7,627,481 B1 12/2009 Kuo et al.
7,630,900 B1 12/2009 Strom
7,630,901 B2 12/2009 Omi
7,633,076 B2 12/2009 Huppi et al.
7,634,409 B2 12/2009 Kennewick et al.
7,634,413 B1 12/2009 Kuo et al.
7,634,718 B2 12/2009 Nakajima
7,634,732 B1 12/2009 Blagsvedt et al.
7,636,657 B2 12/2009 Ju et al.
7,640,158 B2 12/2009 Detlef et al.
7,640,160 B2 12/2009 Di Cristo et al.
7,643,990 B1 1/2010 Bellegarda
7,647,225 B2 1/2010 Bennett et al.
7,649,454 B2 1/2010 Singh et al.
7,649,877 B2 1/2010 Vieri et al.
7,653,883 B2 1/2010 Hotelling et al.
7,656,393 B2 2/2010 King et al.
7,657,424 B2 2/2010 Bennett
7,657,430 B2 2/2010 Ogawa
7,657,828 B2 2/2010 Lucas et al.
7,657,844 B2 2/2010 Gibson et al.
7,657,849 B2 2/2010 Chaudhri et al.
7,660,715 B1 2/2010 Thambiratnam
7,663,607 B2 2/2010 Hotelling et al.
7,664,558 B2 2/2010 Lindahl et al.
7,664,638 B2 2/2010 Cooper et al.
7,668,710 B2 2/2010 Doyle
7,669,134 B1 2/2010 Christie et al.
7,672,841 B2 3/2010 Bennett
7,672,952 B2 3/2010 Isaacson et al.
7,673,238 B2 3/2010 Girish et al.
7,673,251 B1 3/2010 Wibisono
7,673,340 B1 3/2010 Cohen et al.
7,676,026 B1 3/2010 Baxter, Jr.
7,676,365 B2 3/2010 Hwang et al.
7,676,463 B2 3/2010 Thompson et al.
7,679,534 B2 3/2010 Kay et al.
7,680,649 B2 3/2010 Park
7,681,126 B2 3/2010 Roose
7,683,886 B2 3/2010 Willey
7,683,893 B2 3/2010 Kim
7,684,985 B2 3/2010 Dominach et al.
7,684,990 B2 3/2010 Caskey et al.

(56) References Cited

U.S. PATENT DOCUMENTS 7,684,991 B2 3/2010 Stohr et al.
7,689,245 B2 3/2010 Cox et al.
7,689,408 B2 3/2010 Chen et al.
7,689,409 B2 3/2010 Heinecke
7,689,412 B2 3/2010 Wu et al.
7,689,421 B2 3/2010 Li et al.
7,693,715 B2 4/2010 Hwang et al.
7,693,717 B2 4/2010 Kahn et al.
7,693,719 B2 4/2010 Chu et al.
7,693,720 B2 4/2010 Kennewick et al.
7,698,131 B2 4/2010 Bennett
7,702,500 B2 4/2010 Blaedow
7,702,508 B2 4/2010 Bennett
7,703,091 B1 4/2010 Martin et al.
7,706,510 B2 4/2010 Ng
7,707,026 B2 4/2010 Liu
7,707,027 B2 4/2010 Balchandran et al.
7,707,032 B2 4/2010 Wang
7,707,221 B1 4/2010 Dunning et al.
7,707,226 B1 4/2010 Tonse
7,707,267 B2 4/2010 Lisitsa et al.
7,710,262 B2 5/2010 Ruha
7,711,129 B2 5/2010 Lindahl et al.
7,711,550 B1 5/2010 Feinberg et al.
7,711,565 B1 5/2010 Gazdzinski
7,711,672 B2 5/2010 Au
7,712,053 B2 5/2010 Bradford et al.
7,716,056 B2 5/2010 Weng et al.
7,716,216 B1 5/2010 Harik et al.
7,720,674 B2 5/2010 Kaiser et al.
7,720,683 B1 5/2010 Vermeulen et al.
7,721,226 B2 5/2010 Barabe et al.
7,721,301 B2 5/2010 Wong et al.
7,724,242 B2 5/2010 Hillis et al.
7,724,696 B1 5/2010 Parekh
7,725,307 B2 5/2010 Bennett
7,725,318 B2 5/2010 Gavalda et al.
7,725,320 B2 5/2010 Bennett
7,725,321 B2 5/2010 Bennett
7,725,838 B2 5/2010 Williams
7,729,904 B2 6/2010 Bennett
7,729,916 B2 6/2010 Coffman et al.
7,734,461 B2 6/2010 Kwak et al.
7,735,012 B2 6/2010 Naik
7,739,588 B2 6/2010 Reynar et al.
7,742,953 B2 6/2010 King et al.
7,743,188 B2 6/2010 Haitani et al.
7,747,616 B2 6/2010 Yamada et al.
7,752,152 B2 7/2010 Paek et al.
7,756,707 B2 7/2010 Garner et al.
7,756,708 B2 7/2010 Cohen et al.
7,756,868 B2 7/2010 Lee
7,756,871 B2 7/2010 Yacoub et al.
7,757,173 B2 7/2010 Beaman
7,757,176 B2 7/2010 Vakil et al.
7,757,182 B2 7/2010 Elliott et al.
7,761,296 B1 7/2010 Bakis et al.
7,763,842 B2 7/2010 Hsu et al.
7,774,202 B2 8/2010 Spengler et al.
7,774,204 B2 8/2010 Mozer et al.
7,774,388 B1 8/2010 Runchey
7,777,717 B2 8/2010 Fux et al.
7,778,432 B2 8/2010 Larsen
7,778,595 B2 8/2010 White et al.
7,778,632 B2 8/2010 Kurlander et al.
7,778,830 B2 8/2010 Davis et al.
7,779,069 B2 8/2010 Frid-Nielsen et al.
7,779,353 B2 8/2010 Grigoriu et al.
7,779,356 B2 8/2010 Griesmer
7,779,357 B2 8/2010 Naik
7,783,283 B2 8/2010 Kuusinen et al.
7,783,486 B2 8/2010 Rosser et al.
7,788,590 B2 8/2010 Taboada et al.
7,788,663 B2 8/2010 Illowsky et al.
7,796,980 B1 9/2010 McKinney et al.
7,797,265 B2 9/2010 Brinker et al.
7,797,269 B2 9/2010 Rieman et al.
7,797,331 B2 9/2010 Theimer et al.
7,797,629 B2 9/2010 Fux et al.
7,801,721 B2 9/2010 Rosart et al.
7,801,728 B2 9/2010 Ben-David et al.
7,801,729 B2 9/2010 Mozer
7,805,299 B2 9/2010 Coifman
7,809,550 B1 10/2010 Barrows
7,809,565 B2 10/2010 Coifman
7,809,569 B2 10/2010 Attwater et al.
7,809,570 B2 10/2010 Kennewick et al.
7,809,610 B2 10/2010 Cao
7,809,744 B2 10/2010 Nevidomski et al.
7,813,729 B2 10/2010 Lee et al.
7,818,165 B2 10/2010 Carlgren et al.
7,818,176 B2 10/2010 Freeman et al.
7,818,215 B2 10/2010 King et al.
7,818,291 B2 10/2010 Ferguson et al.
7,818,672 B2 10/2010 Mccormack et al.
7,822,608 B2 10/2010 Cross, Jr. et al.
7,823,123 B2 10/2010 Sabbouh
7,826,945 B2 11/2010 Zhang et al.
7,827,047 B2 11/2010 Anderson et al.
7,831,246 B1 11/2010 Smith et al.
7,831,423 B2 11/2010 Schubert
7,831,426 B2 11/2010 Bennett
7,831,432 B2 11/2010 Bodin et al.
7,835,504 B1 11/2010 Donald et al.
7,836,437 B2 11/2010 Kacmarcik et al.
7,840,348 B2 11/2010 Kim et al.
7,840,400 B2 11/2010 Lavi et al.
7,840,447 B2 11/2010 Kleinrock et al.
7,840,581 B2 11/2010 Ross et al.
7,840,912 B2 11/2010 Elias et al.
7,844,394 B2 11/2010 Kim
7,848,924 B2 12/2010 Nurminen et al.
7,848,926 B2 12/2010 Goto et al.
7,853,444 B2 12/2010 Wang et al.
7,853,445 B2 12/2010 Bachenko et al.
7,853,574 B2 12/2010 Kraenzel et al.
7,853,577 B2 12/2010 Sundaresan et al.
7,853,664 B1 12/2010 Wang et al.
7,853,900 B2 12/2010 Nguyen et al.
7,865,817 B2 1/2011 Ryan et al.
7,869,998 B1 1/2011 Di Fabbrizio et al.
7,869,999 B2 1/2011 Amato et al.
7,870,118 B2 1/2011 Jiang et al.
7,870,133 B2 1/2011 Krishnamoorthy et al.
7,873,149 B2 1/2011 Schultz et al.
7,873,519 B2 1/2011 Bennett
7,873,523 B2 1/2011 Potter et al.
7,873,654 B2 1/2011 Bernard
7,877,705 B2 1/2011 Chambers et al.
7,880,730 B2 2/2011 Robinson et al.
7,881,283 B2 2/2011 Cormier et al.
7,881,936 B2 2/2011 Longe et al.
7,885,390 B2 2/2011 Chaudhuri et al.
7,885,844 B1 2/2011 Cohen et al.
7,886,233 B2 2/2011 Rainisto et al.
7,889,101 B2 2/2011 Yokota
7,889,184 B2 2/2011 Blumenberg et al.
7,889,185 B2 2/2011 Blumenberg et al.
7,890,329 B2 2/2011 Wu et al.
7,890,330 B2 2/2011 Ozkaragoz et al.
7,890,652 B2 2/2011 Bull et al.
7,895,039 B2 2/2011 Braho et al.
7,895,531 B2 2/2011 Radtke et al.
7,899,666 B2 3/2011 Varone
7,904,297 B2 3/2011 Mirkovic et al.
7,908,287 B1 3/2011 Katragadda
7,912,289 B2 3/2011 Kansal et al.
7,912,699 B1 3/2011 Saraclar et al.
7,912,702 B2 3/2011 Bennett
7,912,720 B1 3/2011 Hakkani-Tur et al.
7,912,828 B2 3/2011 Bonnet et al.
7,913,185 B1 3/2011 Benson et al.
7,916,979 B2 3/2011 Simmons
7,917,367 B2 3/2011 Di Cristo et al.

(56) References Cited

U.S. PATENT DOCUMENTS 7,917,497 B2 3/2011 Harrison et al.
7,920,678 B2 4/2011 Cooper et al.
7,920,682 B2 4/2011 Byrne et al.
7,920,857 B2 4/2011 Lau et al.
7,925,525 B2 4/2011 Chin
7,925,610 B2 4/2011 Elbaz et al.
7,929,805 B2 4/2011 Wang et al.
7,930,168 B2 4/2011 Weng et al.
7,930,183 B2 4/2011 Odell et al.
7,930,197 B2 4/2011 Ozzie et al.
7,936,339 B2 5/2011 Marggraff et al.
7,936,861 B2 5/2011 Martin et al.
7,936,863 B2 5/2011 John et al.
7,937,075 B2 5/2011 Zellner
7,941,009 B2 5/2011 Li et al.
7,945,294 B2 5/2011 Zhang et al.
7,945,470 B1 5/2011 Cohen et al.
7,949,529 B2 5/2011 Weider et al.
7,949,534 B2 5/2011 Davis et al.
7,949,752 B2 5/2011 Lange et al.
7,953,679 B2 5/2011 Chidlovskii et al.
7,957,975 B2 6/2011 Burns et al.
7,958,136 B1 6/2011 Curtis et al.
7,962,179 B2 6/2011 Huang
7,974,835 B2 7/2011 Balchandran et al.
7,974,844 B2 7/2011 Sumita
7,974,972 B2 7/2011 Cao
7,975,216 B2 7/2011 Woolf et al.
7,983,478 B2 7/2011 Liu et al.
7,983,915 B2 7/2011 Knight et al.
7,983,917 B2 7/2011 Kennewick et al.
7,983,919 B2 7/2011 Conkie
7,983,997 B2 7/2011 Allen et al.
7,984,062 B2 7/2011 Dunning et al.
7,986,431 B2 7/2011 Emori et al.
7,987,151 B2 7/2011 Schott et al.
7,987,176 B2 7/2011 Latzina et al.
7,987,244 B1 7/2011 Lewis et al.
7,991,614 B2 8/2011 Washio et al.
7,992,085 B2 8/2011 Wang-Aryattanwanich et al.
7,996,228 B2 8/2011 Miller et al.
7,996,589 B2 8/2011 Schultz et al.
7,996,769 B2 8/2011 Fux et al.
7,996,792 B2 8/2011 Anzures et al.
7,999,669 B2 8/2011 Singh et al.
8,000,453 B2 8/2011 Cooper et al.
8,005,664 B2 8/2011 Hanumanthappa
8,005,679 B2 8/2011 Jordan et al.
8,006,180 B2 8/2011 Tunning et al.
8,010,614 B1 8/2011 Musat et al.
8,014,308 B2 9/2011 Gates et al.
8,015,006 B2 9/2011 Kennewick et al.
8,015,011 B2 9/2011 Nagano et al.
8,015,144 B2 9/2011 Zheng et al.
8,018,431 B1 9/2011 Zehr et al.
8,019,271 B1 9/2011 Izdepski
8,019,604 B2 9/2011 Ma
8,020,104 B2 9/2011 Robarts et al.
8,024,195 B2 9/2011 Mozer et al.
8,024,415 B2 9/2011 Horvitz et al.
8,027,836 B2 9/2011 Baker et al.
8,031,943 B2 10/2011 Chen et al.
8,032,383 B1 10/2011 Bhardwaj et al.
8,036,901 B2 10/2011 Mozer
8,037,034 B2 10/2011 Plachta et al.
8,041,557 B2 10/2011 Liu
8,041,570 B2 10/2011 Mirkovic et al.
8,041,611 B2 10/2011 Kleinrock et al.
8,042,053 B2 10/2011 Darwish et al.
8,046,231 B2 10/2011 Hirota et al.
8,046,363 B2 10/2011 Cha et al.
8,046,374 B1 10/2011 Bromwich et al.
8,050,500 B1 11/2011 Batty et al.
8,054,180 B1 11/2011 Scofield et al.
8,055,296 B1 11/2011 Persson et al.
8,055,502 B2 11/2011 Clark et al.
8,055,708 B2 11/2011 Chitsaz et al.
8,056,070 B2 11/2011 Goller et al.
8,060,824 B2 11/2011 Brownrigg, Jr. et al.
8,064,753 B2 11/2011 Freeman
8,065,143 B2 11/2011 Yanagihara
8,065,155 B1 11/2011 Gazdzinski
8,065,156 B2 11/2011 Gazdzinski
8,068,604 B2 11/2011 Leeds et al.
8,069,046 B2 11/2011 Kennewick et al.
8,069,422 B2 11/2011 Sheshagiri et al.
8,073,681 B2 12/2011 Baldwin et al.
8,073,695 B1 12/2011 Hendricks et al.
8,077,153 B2 12/2011 Benko et al.
8,078,473 B1 12/2011 Gazdzinski
8,082,153 B2 12/2011 Coffman et al.
8,082,498 B2 12/2011 Salamon et al.
8,090,571 B2 1/2012 Elshishiny et al.
8,095,364 B2 1/2012 Longe et al.
8,099,289 B2 1/2012 Mozer et al.
8,099,395 B2 1/2012 Pabla et al.
8,099,418 B2 1/2012 Inoue et al.
8,103,510 B2 1/2012 Sato
8,107,401 B2 1/2012 John et al.
8,112,275 B2 2/2012 Kennewick et al.
8,112,280 B2 2/2012 Lu
8,117,037 B2 2/2012 Gazdzinski
8,117,542 B2 2/2012 Radtke et al.
8,121,413 B2 2/2012 Hwang et al.
8,121,837 B2 2/2012 Agapi et al.
8,122,094 B1 2/2012 Kotab
8,122,353 B2 2/2012 Bouta
8,130,929 B2 3/2012 Wilkes et al.
8,131,557 B2 3/2012 Davis et al.
8,135,115 B1 3/2012 Hogg, Jr. et al.
8,138,912 B2 3/2012 Singh et al.
8,140,330 B2 3/2012 Cevik et al.
8,140,335 B2 3/2012 Kennewick et al.
8,140,368 B2 3/2012 Eggenberger et al.
8,140,567 B2 3/2012 Padovitz et al.
8,145,489 B2 3/2012 Freeman et al.
8,150,694 B2 4/2012 Kennewick et al.
8,150,700 B2 4/2012 Shin et al.
8,155,956 B2 4/2012 Cho et al.
8,156,005 B2 4/2012 Vieri
8,160,877 B1 4/2012 Nucci et al.
8,160,883 B2 4/2012 Lecoeuche
8,165,321 B2 4/2012 Paquier et al.
8,165,886 B1 4/2012 Gagnon et al.
8,166,019 B1 4/2012 Lee et al.
8,166,032 B2 4/2012 Sommer et al.
8,170,790 B2 5/2012 Lee et al.
8,170,966 B1 5/2012 Musat et al.
8,175,872 B2 5/2012 Kristjansson et al.
8,175,876 B2 5/2012 Bou-Ghazale et al.
8,179,370 B1 5/2012 Yamasani et al.
8,188,856 B2 5/2012 Singh et al.
8,190,359 B2 5/2012 Bourne
8,190,596 B2 5/2012 Nambiar et al.
8,194,827 B2 6/2012 Jaiswal et al.
8,195,467 B2 6/2012 Mozer et al.
8,195,468 B2 6/2012 Kennewick et al.
8,200,489 B1 6/2012 Baggenstoss
8,200,495 B2 6/2012 Braho et al.
8,201,109 B2 6/2012 Van Os et al.
8,204,238 B2 6/2012 Mozer
8,205,788 B1 6/2012 Gazdzinski et al.
8,209,183 B1 6/2012 Patel et al.
8,213,911 B2 7/2012 Williams et al.
8,219,115 B1 7/2012 Nelissen
8,219,406 B2 7/2012 Yu et al.
8,219,407 B1 7/2012 Roy et al.
8,219,608 B2 7/2012 alSafadi et al.
8,224,649 B2 7/2012 Chaudhari et al.
8,224,757 B2 7/2012 Bohle
8,228,299 B1 7/2012 Maloney et al.
8,233,919 B2 7/2012 Haag et al.
8,234,111 B2 7/2012 Lloyd et al.
8,239,206 B1 8/2012 LeBeau et al.

(56) References Cited

U.S. PATENT DOCUMENTS 8,239,207 B2 8/2012 Seligman et al.
8,244,712 B2 8/2012 Serlet et al.
8,250,071 B1 8/2012 Killalea et al.
8,254,829 B1 8/2012 Kindred et al.
8,255,216 B2 8/2012 White
8,255,217 B2 8/2012 Stent et al.
8,260,247 B2 9/2012 Lazaridis et al.
8,260,617 B2 9/2012 Dhanakshirur et al.
8,260,619 B1 9/2012 Bansai et al.
8,270,933 B2 9/2012 Riemer et al.
8,271,287 B1 9/2012 Kermani
8,275,621 B2 9/2012 Alewine et al.
8,279,171 B2 10/2012 Hirai et al.
8,280,438 B2 10/2012 Barbera
8,285,546 B2 10/2012 Reich
8,285,551 B2 10/2012 Gazdzinski
8,285,553 B2 10/2012 Gazdzinski
8,285,737 B1 10/2012 Lynn et al.
8,290,777 B1 10/2012 Nguyen et al.
8,290,778 B2 10/2012 Gazdzinski
8,290,781 B2 10/2012 Gazdzinski
8,296,124 B1 10/2012 Holsztynska et al.
8,296,145 B2 10/2012 Clark et al.
8,296,146 B2 10/2012 Gazdzinski
8,296,153 B2 10/2012 Gazdzinski
8,296,380 B1 10/2012 Kelly et al.
8,296,383 B2 10/2012 Lindahl
8,300,776 B2 10/2012 Davies et al.
8,300,801 B2 10/2012 Sweeney et al.
8,301,456 B2 10/2012 Gazdzinski
8,311,189 B2 11/2012 Champlin et al.
8,311,834 B1 11/2012 Gazdzinski
8,311,835 B2 11/2012 Lecoeuche
8,311,838 B2 11/2012 Lindahl et al.
8,312,017 B2 11/2012 Martin et al.
8,321,786 B2 11/2012 Lunati et al.
8,326,627 B2 12/2012 Kennewick et al.
8,332,205 B2 12/2012 Krishnan et al.
8,332,218 B2 12/2012 Cross et al.
8,332,224 B2 12/2012 Di Cristo et al.
8,332,748 B1 12/2012 Karam
8,335,689 B2 12/2012 Wittenstein et al.
8,340,975 B1 12/2012 Rosenberger
8,345,665 B2 1/2013 Vieri et al.
8,346,563 B1 1/2013 Hjelm et al.
8,346,757 B1 1/2013 Lamping et al.
8,352,183 B2 1/2013 Thota et al.
8,352,268 B2 1/2013 Naik et al.
8,352,272 B2 1/2013 Rogers et al.
8,355,919 B2 1/2013 Silverman et al.
8,359,234 B2 1/2013 Vieri
8,370,145 B2 2/2013 Endo et al.
8,370,158 B2 2/2013 Gazdzinski
8,371,503 B2 2/2013 Gazdzinski
8,374,871 B2 2/2013 Ehsani et al.
8,375,320 B2 2/2013 Kotler et al.
8,380,504 B1 2/2013 Peden et al.
8,380,507 B2 2/2013 Herman et al.
8,381,107 B2 2/2013 Rottier et al.
8,381,135 B2 2/2013 Hotelling et al.
8,386,485 B2 2/2013 Kerschberg et al.
8,386,926 B1 2/2013 Matsuoka
8,391,844 B2 3/2013 Lamiraux et al.
8,396,714 B2 3/2013 Rogers et al.
8,396,715 B2 3/2013 Odell et al.
8,401,163 B1 3/2013 Kirchhoff et al.
8,406,745 B1 3/2013 Upadhyay et al.
8,407,239 B2 3/2013 Dean et al.
8,423,288 B2 4/2013 Stahl et al.
8,428,758 B2 4/2013 Naik et al.
8,433,572 B2 4/2013 Caskey et al.
8,433,778 B1 4/2013 Shreesha et al.
8,434,133 B2 4/2013 Kulkarni et al.
8,442,821 B1 5/2013 Vanhoucke
8,447,612 B2 5/2013 Gazdzinski
8,452,597 B2 5/2013 Bringert et al.
8,452,602 B1 5/2013 Bringert et al.
8,457,959 B2 6/2013 Kaiser
8,458,115 B2 6/2013 Cai et al.
8,458,278 B2 6/2013 Christie et al.
8,464,150 B2 6/2013 Davidson et al.
8,473,289 B2 6/2013 Jitkoff et al.
8,479,122 B2 7/2013 Hotelling et al.
8,484,027 B1 7/2013 Murphy
8,489,599 B2 7/2013 Bellotti
8,498,857 B2 7/2013 Kopparapu et al.
8,514,197 B2 8/2013 Shahraray et al.
8,515,736 B1 8/2013 Duta
8,515,750 B1 8/2013 Lei et al.
8,521,513 B2 8/2013 Millett et al.
8,521,531 B1 8/2013 Kim
8,527,276 B1 9/2013 Senior et al.
8,537,033 B2 9/2013 Gueziec
8,539,342 B1 9/2013 Lewis
8,543,375 B2 9/2013 Hong
8,543,397 B1 9/2013 Nguyen
8,543,398 B1 9/2013 Strope et al.
8,560,229 B1 10/2013 Park et al.
8,571,851 B1 10/2013 Tickner et al.
8,577,683 B2 11/2013 DeWitt
8,583,416 B2 11/2013 Huang et al.
8,583,511 B2 11/2013 Hendrickson
8,589,156 B2 11/2013 Burke et al.
8,589,869 B2 11/2013 Wolfram
8,589,911 B1 11/2013 Sharkey et al.
8,595,004 B2 11/2013 Koshinaka
8,595,642 B1 11/2013 Lagassey
8,600,743 B2 12/2013 Lindahl et al.
8,600,746 B1 12/2013 Lei et al.
8,600,930 B2 12/2013 Sata et al.
8,606,090 B2 12/2013 Eyer
8,606,568 B1 12/2013 Tickner et al.
8,606,576 B1 12/2013 Barr et al.
8,606,577 B1 12/2013 Stewart et al.
8,615,221 B1 12/2013 Cosenza et al.
8,620,659 B2 12/2013 Di Cristo et al.
8,620,662 B2 12/2013 Bellegarda
8,626,681 B1 1/2014 Jurca et al.
8,630,841 B2 1/2014 Van Caldwell et al.
8,638,363 B2 1/2014 King et al.
8,639,516 B2 1/2014 Lindahl et al.
8,645,137 B2 2/2014 Bellegarda et al.
8,645,138 B1 2/2014 Weinstein et al.
8,654,936 B1 2/2014 Tofighbakhsh et al.
8,655,646 B2 2/2014 Lee et al.
8,655,901 B1 2/2014 Li et al.
8,660,843 B2 2/2014 Falcon et al.
8,660,849 B2 2/2014 Gruber et al.
8,660,970 B1 2/2014 Fiedorowicz
8,661,112 B2 2/2014 Creamer et al.
8,661,340 B2 2/2014 Goldsmith et al.
8,670,979 B2 3/2014 Gruber et al.
8,675,084 B2 3/2014 Bolton et al.
8,676,904 B2 3/2014 Lindahl et al.
8,677,377 B2 3/2014 Cheyer et al.
8,681,950 B2 3/2014 Vlack et al.
8,682,667 B2 3/2014 Haughay et al.
8,687,777 B1 4/2014 Lavian et al.
8,688,446 B2 4/2014 Yanagihara et al.
8,688,453 B1 4/2014 Joshi et al.
8,689,135 B2 4/2014 Portele et al.
8,694,322 B2 4/2014 Snitkovskiy et al.
8,695,074 B2 4/2014 Saraf et al.
8,696,364 B2 4/2014 Cohen
8,706,472 B2 4/2014 Ramerth et al.
8,706,474 B2 4/2014 Blume et al.
8,706,503 B2 4/2014 Cheyer et al.
8,707,195 B2 4/2014 Fieizach et al.
8,713,119 B2 4/2014 Lindahl et al.
8,713,418 B2 4/2014 King et al.
8,719,006 B2 5/2014 Bellegarda et al.
8,719,014 B2 5/2014 Wagner et al.
8,719,039 B1 5/2014 Sharifi
8,731,610 B2 5/2014 Appaji

(56) References Cited

U.S. PATENT DOCUMENTS 8,731,912 B1 5/2014 Tickner et al.
8,731,942 B2 5/2014 Cheyer et al.
8,739,208 B2 5/2014 Rodriguez et al.
8,744,852 B1 6/2014 Seymour et al.
8,751,971 B2 6/2014 Fleizach
8,760,537 B2 6/2014 Johnson et al.
8,762,145 B2 6/2014 Ouchi et al.
8,762,156 B2 6/2014 Chen et al.
8,762,469 B2 6/2014 Lindahl et al.
8,768,693 B2 7/2014 Lempel et al.
8,768,702 B2 7/2014 Boettcher et al.
8,775,154 B2 7/2014 Clinchant et al.
8,775,177 B1 7/2014 Heigold et al.
8,775,931 B2 7/2014 Fux et al.
8,781,456 B2 7/2014 Prociw
8,781,841 B1 7/2014 Wang
8,793,301 B2 7/2014 Wegenkittl et al.
8,798,255 B2 8/2014 Lubowich et al.
8,798,995 B1 8/2014 Edara et al.
8,799,000 B2 8/2014 Guzzoni et al.
8,805,690 B1 8/2014 LeBeau et al.
8,812,299 B1 8/2014 Su
8,812,302 B2 8/2014 Xiao et al.
8,823,507 B1 9/2014 Touloumtzis
8,831,947 B2 9/2014 Wasserblat et al.
8,838,457 B2 9/2014 Cerra et al.
8,855,915 B2 10/2014 Furuhata et al.
8,861,925 B1 10/2014 Ohme
8,862,252 B2 10/2014 Rottier et al.
8,868,111 B1 10/2014 Kahn et al.
8,868,409 B1 10/2014 Mengibar et al.
8,868,469 B2 10/2014 Xu et al.
8,880,405 B2 11/2014 Cerra et al.
8,886,534 B2 11/2014 Nakano et al.
8,886,540 B2 11/2014 Cerra et al.
8,886,541 B2 11/2014 Friedlander
8,892,446 B2 11/2014 Cheyer et al.
8,893,023 B2 11/2014 Perry et al.
8,898,064 B1 11/2014 Thomas et al.
8,898,568 B2 11/2014 Bull et al.
8,903,716 B2 12/2014 Chen et al.
8,909,693 B2 12/2014 Frissora et al.
8,918,321 B2 12/2014 Czahor
8,922,485 B1 12/2014 Lloyd
8,930,176 B2 1/2015 Li et al.
8,930,191 B2 1/2015 Gruber et al.
8,938,394 B1 1/2015 Faaborg et al.
8,938,450 B2 1/2015 Spivack et al.
8,938,688 B2 1/2015 Bradford et al.
8,942,986 B2 1/2015 Cheyer et al.
8,943,423 B2 1/2015 Merrill et al.
8,972,240 B2 3/2015 Brockett et al.
8,972,432 B2 3/2015 Shaw et al.
8,972,878 B2 3/2015 Mohler et al.
8,983,383 B1 3/2015 Haskin
8,989,713 B2 3/2015 Doulton
8,990,235 B2 3/2015 King et al.
8,994,660 B2 3/2015 Neels et al.
8,996,350 B1 3/2015 Dub et al.
8,996,376 B2 3/2015 Fleizach et al.
8,996,381 B2 3/2015 Mozer et al.
8,996,639 B1 3/2015 Faaborg et al.
9,009,046 B1 4/2015 Stewart
9,020,804 B2 4/2015 Barbaiani et al.
9,026,425 B2 5/2015 Nikoulina et al.
9,031,834 B2 5/2015 Coorman et al.
9,031,970 B1 5/2015 Das et al.
9,037,967 B1 5/2015 Al-Jefri et al.
9,043,208 B2 5/2015 Koch et al.
9,043,211 B2 5/2015 Haiut et al.
9,049,255 B2 6/2015 MacFarlane et al.
9,049,295 B1 6/2015 Cooper et al.
9,053,706 B2 6/2015 Jitkoff et al.
9,058,811 B2 6/2015 Wang et al.
9,063,979 B2 6/2015 Chiu et al.
9,064,495 B1 6/2015 Torok et al.
9,070,366 B1 6/2015 Mathias et al.
9,071,701 B2 6/2015 Donaldson et al.
9,075,435 B1 7/2015 Nobel et al.
9,076,448 B2 7/2015 Bennett et al.
9,076,450 B1 7/2015 Sadek et al.
9,081,411 B2 7/2015 Kalns et al.
9,081,482 B1 7/2015 Zhai et al.
9,082,402 B2 7/2015 Yadgar et al.
9,083,581 B1 7/2015 Addepalli et al.
9,098,467 B1 8/2015 Blanksteen et al.
9,101,279 B2 8/2015 Ritchey et al.
9,112,984 B2 8/2015 Sejnoha et al.
9,117,447 B2 8/2015 Gruber et al.
9,123,338 B1 9/2015 Sanders et al.
9,143,907 B1 9/2015 Caldwell et al.
9,159,319 B1 10/2015 Hoffmeister
9,164,983 B2 10/2015 Liu et al.
9,171,541 B2 10/2015 Kennewick et al.
9,171,546 B1 10/2015 Pike
9,183,845 B1 11/2015 Gopalakrishnan et al.
9,190,062 B2 11/2015 Haughay
9,208,153 B1 12/2015 Zaveri et al.
9,213,754 B1 12/2015 Zhang et al.
9,218,809 B2 12/2015 Bellegarda
9,218,819 B1 12/2015 Stekkelpak et al.
9,223,537 B2 12/2015 Brown et al.
9,241,073 B1 1/2016 Van Rensburg et al.
9,255,812 B2 2/2016 Maeoka et al.
9,258,604 B1 2/2016 Bilobrov et al.
9,262,612 B2 2/2016 Cheyer
9,280,535 B2 3/2016 Varma et al.
9,286,910 B1 3/2016 Li et al.
9,292,487 B1 3/2016 Weber
9,292,489 B1 3/2016 Sak et al.
9,299,344 B2 3/2016 Braho et al.
9,300,718 B2 3/2016 Khanna
9,305,543 B2 4/2016 Fleizach et al.
9,305,548 B2 4/2016 Kennewick et al.
9,311,912 B1 4/2016 Swietlinski et al.
9,313,317 B1 4/2016 LeBeau et al.
9,318,108 B2 4/2016 Gruber et al.
9,325,809 B1 4/2016 Barros et al.
9,330,659 B2 5/2016 Ju et al.
9,330,668 B2 5/2016 Nanavati et al.
9,330,720 B2 5/2016 Lee
9,338,493 B2 * 5/2016 Van Os .................. G10L 15/26
9,349,368 B1 5/2016 LeBeau et al.
9,355,472 B2 5/2016 Kocienda et al.
9,361,084 B1 6/2016 Costa
9,367,541 B1 6/2016 Servan et al.
9,377,871 B2 6/2016 Waddell et al.
9,378,740 B1 6/2016 Rosen et al.
9,380,155 B1 6/2016 Reding et al.
9,383,827 B1 7/2016 Faaborg et al.
9,390,726 B1 7/2016 Smus et al.
9,396,722 B2 7/2016 Chung et al.
9,401,147 B2 7/2016 Jitkoff et al.
9,406,224 B1 8/2016 Sanders et al.
9,406,299 B2 8/2016 Gollan et al.
9,412,392 B2 8/2016 Lindahl
9,418,650 B2 8/2016 Bharadwaj et al.
9,423,266 B2 8/2016 Clark et al.
9,424,840 B1 8/2016 Hart et al.
9,436,918 B2 9/2016 Pantel et al.
9,437,186 B1 9/2016 Liu et al.
9,437,189 B2 9/2016 Epstein et al.
9,443,527 B1 9/2016 Watanabe et al.
9,454,599 B2 9/2016 Golden et al.
9,454,957 B1 9/2016 Mathias et al.
9,465,833 B2 10/2016 Aravamudan et al.
9,465,864 B2 10/2016 Hu et al.
9,466,027 B2 10/2016 Byrne et al.
9,471,566 B1 10/2016 Zhang et al.
9,483,461 B2 11/2016 Fleizach et al.
9,484,021 B1 11/2016 Mairesse et al.
9,495,129 B2 11/2016 Fleizach et al.
9,501,741 B2 11/2016 Cheyer et al.
9,502,025 B2 11/2016 Kennewick et al.

(56) References Cited

U.S. PATENT DOCUMENTS 9,508,028 B2 11/2016 Bannister et al.
9,510,044 B1 11/2016 Pereira et al.
9,514,470 B2 12/2016 Topatan et al.
9,519,453 B2 12/2016 Perkuhn et al.
9,524,355 B2 12/2016 Forbes et al.
9,535,906 B2 1/2017 Lee et al.
9,536,527 B1 1/2017 Carlson
9,547,647 B2 1/2017 Badaskar
9,548,050 B2 1/2017 Gruber et al.
9,569,549 B1 2/2017 Jenkins et al.
9,575,964 B2 2/2017 Yadgar et al.
9,578,173 B2 2/2017 Sanghavi et al.
9,607,612 B2 3/2017 Deleeuw
9,620,113 B2 4/2017 Kennewick et al.
9,620,126 B2 4/2017 Chiba
9,626,955 B2 4/2017 Fleizach et al.
9,633,004 B2 4/2017 Giuli et al.
9,633,191 B2 4/2017 Fieizach et al.
9,633,660 B2 4/2017 Haughay
9,652,453 B2 5/2017 Mathur et al.
9,658,746 B2 5/2017 Cohn et al.
9,659,298 B2 * 5/2017 Lynch ................ H04M 3/4938
9,665,567 B2 5/2017 Liu et al.
9,668,121 B2 5/2017 Naik et al.
9,672,725 B2 6/2017 Dotan-Cohen et al.
9,691,378 B1 6/2017 Meyers et al.
9,697,822 B1 7/2017 Naik et al.
9,697,827 B1 7/2017 Lilly et al.
9,698,999 B2 7/2017 Mutagi
9,720,907 B2 8/2017 Bangalore
9,721,566 B2 8/2017 Newendorp et al.
9,734,817 B1 8/2017 Putrycz
9,734,839 B1 8/2017 Adams
9,741,343 B1 8/2017 Miles et al.
9,747,083 B1 8/2017 Roman et al.
9,755,605 B1 9/2017 Li et al.
9,813,882 B1 11/2017 Masterman
9,818,400 B2 11/2017 Paulik et al.
9,823,811 B2 11/2017 Brown et al.
9,823,828 B2 11/2017 Zambetti et al.
9,830,044 B2 11/2017 Brown et al.
9,842,584 B1 12/2017 Hart et al.
9,858,927 B2 1/2018 Williams et al.
9,886,953 B2 2/2018 Lemay et al.
9,887,949 B2 2/2018 Shepherd
9,934,777 B1 4/2018 Joseph et al.
9,934,785 B1 4/2018 Hulaud
9,948,728 B2 4/2018 Linn et al.
9,966,065 B2 5/2018 Gruber et al.
9,966,068 B2 5/2018 Cash et al.
9,967,381 B1 5/2018 Kashimba et al.
9,971,495 B2 5/2018 Shetty et al.
9,984,686 B1 5/2018 Mutagi et al.
9,986,419 B2 5/2018 Naik et al.
9,990,176 B1 6/2018 Gray
10,001,817 B2 6/2018 Zambetti et al.
10,013,416 B1 7/2018 Bhardwaj et al.
10,032,455 B2 7/2018 Newman et al.
10,037,758 B2 7/2018 Jing et al.
10,049,663 B2 8/2018 Orr et al.
10,049,668 B2 8/2018 Huang et al.
10,055,681 B2 8/2018 Brown et al.
10,074,360 B2 9/2018 Kim
10,074,371 B1 9/2018 Wang et al.
10,083,690 B2 9/2018 Giuli et al.
10,088,972 B2 10/2018 Brown et al.
10,096,319 B1 10/2018 Jin et al.
10,101,887 B2 10/2018 Bernstein et al.
10,102,359 B2 10/2018 Cheyer
10,127,901 B2 11/2018 Zhao et al.
10,127,908 B1 11/2018 Deller et al.
10,135,965 B2 11/2018 Woolsey et al.
10,169,329 B2 1/2019 Futrell et al.
10,170,123 B2 1/2019 Orr et al.
10,175,879 B2 1/2019 Missig et al.
10,176,808 B1 1/2019 Lovitt et al.
10,186,254 B2 1/2019 Williams et al.
10,186,266 B1 1/2019 Devaraj et al.
10,191,627 B2 1/2019 Cieplinski et al.
10,191,646 B2 1/2019 Zambetti et al.
10,191,718 B2 1/2019 Rhee et al.
10,192,546 B1 1/2019 Piersol et al.
10,192,557 B2 1/2019 Lee et al.
10,200,824 B2 2/2019 Gross et al.
10,216,351 B2 2/2019 Yang
10,223,066 B2 3/2019 Martel et al.
10,248,308 B2 4/2019 Karunamuni et al.
10,255,922 B1 4/2019 Sharifi et al.
10,296,160 B2 5/2019 Shah et al.
10,297,253 B2 5/2019 Walker et al.
10,325,598 B2 6/2019 Basye et al.
10,355,243 B2 7/2019 Sanghavi et al.
10,403,283 B1 9/2019 Schramm et al.
2009/0003115 A1 1/2009 Lindahl et al.
2009/0005012 A1 1/2009 Van Heugten
2009/0005891 A1 1/2009 Batson et al.
2009/0006096 A1 1/2009 Li et al.
2009/0006097 A1 1/2009 Etezadi et al.
2009/0006099 A1 1/2009 Sharpe et al.
2009/0006100 A1 1/2009 Badger et al.
2009/0006343 A1 1/2009 Platt et al.
2009/0006345 A1 1/2009 Platt et al.
2009/0006488 A1 1/2009 Lindahl et al.
2009/0006671 A1 1/2009 Batson et al.
2009/0007001 A1 1/2009 Morin et al.
2009/0007188 A1 1/2009 Omernick
2009/0011709 A1 1/2009 Akasaka et al.
2009/0012748 A1 1/2009 Beish et al.
2009/0012775 A1 1/2009 El Hady et al.
2009/0018828 A1 1/2009 Nakadai et al.
2009/0018829 A1 1/2009 Kuperstein
2009/0018834 A1 1/2009 Cooper et al.
2009/0018835 A1 1/2009 Cooper et al.
2009/0018839 A1 1/2009 Cooper et al.
2009/0018840 A1 1/2009 Lutz et al.
2009/0019061 A1 1/2009 Scannell, Jr.
2009/0022329 A1 1/2009 Mahowald
2009/0024595 A1 1/2009 Chen
2009/0027334 A1 1/2009 Foulk et al.
2009/0028435 A1 1/2009 Wu et al.
2009/0030685 A1 1/2009 Cerra et al.
2009/0030800 A1 1/2009 Grois
2009/0030978 A1 1/2009 Johnson et al.
2009/0031236 A1 1/2009 Robertson et al.
2009/0043502 A1 2/2009 Shaffer et al.
2009/0043580 A1 2/2009 Mozer et al.
2009/0043583 A1 2/2009 Agapi et al.
2009/0043763 A1 2/2009 Peng
2009/0044094 A1 2/2009 Rapp et al.
2009/0048821 A1 2/2009 Yam et al.
2009/0048841 A1 2/2009 Pollet et al.
2009/0048845 A1 2/2009 Burckart et al.
2009/0049067 A1 2/2009 Murray
2009/0051649 A1 2/2009 Rondel et al.
2009/0054046 A1 2/2009 Whittington et al.
2009/0055088 A1 2/2009 Zhang et al.
2009/0055168 A1 2/2009 Wu et al.
2009/0055175 A1 2/2009 Terrell et al.
2009/0055179 A1 2/2009 Cho et al.
2009/0055186 A1 2/2009 Lance et al.
2009/0055187 A1 2/2009 Leventhal et al.
2009/0055380 A1 2/2009 Peng et al.
2009/0055381 A1 2/2009 Wu et al.
2009/0055648 A1 2/2009 Kirn et al.
2009/0058823 A1 3/2009 Kocienda
2009/0058860 A1 3/2009 Fong et al.
2009/0060351 A1 3/2009 Li et al.
2009/0060472 A1 3/2009 Bull et al.
2009/0063974 A1 3/2009 Bull et al.
2009/0064031 A1 3/2009 Bull et al.
2009/0070097 A1 3/2009 Wu et al.
2009/0070102 A1 3/2009 Maegawa
2009/0070109 A1 3/2009 Didcock et al.
2009/0070114 A1 3/2009 Staszak

(56) References Cited

U.S. PATENT DOCUMENTS

2009/0074214 A1 3/2009 Bradford et al.
2009/0076792 A1 3/2009 Lawson-Tancred
2009/0076796 A1 3/2009 Daraselia
2009/0076798 A1 3/2009 Oh et al.
2009/0076819 A1 3/2009 Wouters et al.
2009/0076821 A1 3/2009 Brenner et al.
2009/0076825 A1 3/2009 Bradford et al.
2009/0077047 A1 3/2009 Cooper et al.
2009/0077165 A1 3/2009 Rhodes et al.
2009/0077464 A1 3/2009 Goldsmith et al.
2009/0079622 A1 3/2009 Seshadri et al.
2009/0083034 A1 3/2009 Hernandez et al.
2009/0083035 A1 3/2009 Huang et al.
2009/0083036 A1 3/2009 Zhao et al.
2009/0083037 A1 3/2009 Gleason et al.
2009/0083047 A1 3/2009 Lindahl et al.
2009/0083249 A1 3/2009 Basson et al.
2009/0089058 A1 4/2009 Bellegarda
2009/0091537 A1 4/2009 Huang et al.
2009/0092239 A1 4/2009 Macwan et al.
2009/0092260 A1 4/2009 Powers
2009/0092261 A1 4/2009 Bard
2009/0092262 A1 4/2009 Costa et al.
2009/0094029 A1 4/2009 Koch et al.
2009/0094033 A1 4/2009 Mozer et al.
2009/0097634 A1 4/2009 Nambiar et al.
2009/0097637 A1 4/2009 Boscher et al.
2009/0098903 A1 4/2009 Donaldson et al.
2009/0100049 A1 4/2009 Cao
2009/0100454 A1 4/2009 Weber
2009/0104898 A1 4/2009 Harris
2009/0106026 A1 4/2009 Ferrieux
2009/0106376 A1 4/2009 Tom et al.
2009/0106397 A1 4/2009 O'Keefe
2009/0109019 A1 4/2009 Peterson et al.
2009/0112572 A1 4/2009 Thorn
2009/0112576 A1 4/2009 Jackson et al.
2009/0112592 A1 4/2009 Candelore et al.
2009/0112596 A1 4/2009 Syrdal et al.
2009/0112600 A1 4/2009 Gilbert et al.
2009/0112677 A1 4/2009 Rhett
2009/0112892 A1 4/2009 Cardie et al.
2009/0119108 A1 5/2009 Noh et al.
2009/0119587 A1 5/2009 Alien et al.
2009/0123021 A1 5/2009 Jung et al.
2009/0123071 A1 5/2009 Iwasaki
2009/0125299 A1 5/2009 Wang
2009/0125477 A1 5/2009 Lu et al.
2009/0125602 A1 5/2009 Bhatia et al.
2009/0125813 A1 5/2009 Shen et al.
2009/0125947 A1 5/2009 Ibaraki
2009/0128505 A1 5/2009 Partridge et al.
2009/0132253 A1 5/2009 Bellegarda
2009/0132255 A1 5/2009 Lu
2009/0132378 A1 5/2009 Othmer et al.
2009/0137286 A1 5/2009 Luke et al.
2009/0138263 A1 5/2009 Shozakai et al.
2009/0138430 A1 5/2009 Nambiar et al.
2009/0138736 A1 5/2009 Chin
2009/0138828 A1 5/2009 Schultz et al.
2009/0144036 A1 6/2009 Jorgensen et al.
2009/0144049 A1 6/2009 Haddad et al.
2009/0144428 A1 6/2009 Bowater et al.
2009/0144609 A1 6/2009 Liang et al.
2009/0146848 A1 6/2009 Ghassabian
2009/0150147 A1 6/2009 Jacoby et al.
2009/0150156 A1 6/2009 Kennewick et al.
2009/0150553 A1 6/2009 Collart et al.
2009/0152349 A1 6/2009 Bonev et al.
2009/0153288 A1 6/2009 Hope et al.
2009/0154669 A1 6/2009 Wood et al.
2009/0157382 A1 6/2009 Bar
2009/0157384 A1 6/2009 Toutanova et al.
2009/0157401 A1 6/2009 Bennett
2009/0157513 A1 6/2009 Bonev et al.
2009/0158200 A1 6/2009 Palahnuk et al.
2009/0158323 A1 6/2009 Bober et al.
2009/0158423 A1 6/2009 Orlassino et al.
2009/0160761 A1 6/2009 Moosavi et al.
2009/0160803 A1 6/2009 Hashimoto
2009/0163243 A1 6/2009 Barbera
2009/0164219 A1 6/2009 Yeung et al.
2009/0164301 A1 6/2009 O'Sullivan et al.
2009/0164441 A1 6/2009 Cheyer
2009/0164450 A1 6/2009 Martinez et al.
2009/0164655 A1 6/2009 Pettersson et al.
2009/0164937 A1 6/2009 Alviar et al.
2009/0167508 A1 7/2009 Fadell et al.
2009/0167509 A1 7/2009 Fadell et al.
2009/0171578 A1 7/2009 Kim et al.
2009/0171662 A1 7/2009 Huang et al.
2009/0171664 A1 7/2009 Kennewick et al.
2009/0172108 A1 7/2009 Singh
2009/0172542 A1 7/2009 Girish et al.
2009/0174667 A1 7/2009 Kocienda et al.
2009/0174677 A1 7/2009 Gehani et al.
2009/0177300 A1 7/2009 Lee
2009/0177461 A1 7/2009 Ehsani et al.
2009/0177966 A1 7/2009 Chaudhri
2009/0182445 A1 7/2009 Girish et al.
2009/0182549 A1 7/2009 Anisimovich et al.
2009/0182702 A1 7/2009 Miller
2009/0183070 A1 7/2009 Robbins
2009/0187402 A1 7/2009 Scholl
2009/0187577 A1 7/2009 Reznik et al.
2009/0187950 A1 7/2009 Nicas et al.
2009/0190774 A1 7/2009 Wang et al.
2009/0191895 A1 7/2009 Singh et al.
2009/0192782 A1 7/2009 Drewes
2009/0192787 A1 7/2009 Roon
2009/0192798 A1 7/2009 Basson et al.
2009/0197619 A1 8/2009 Colligan et al.
2009/0198497 A1 8/2009 Kwon
2009/0204402 A1 8/2009 Marhawa et al.
2009/0204409 A1 8/2009 Mozer et al.
2009/0204478 A1 8/2009 Kalb et al.
2009/0204596 A1 8/2009 Brun et al.
2009/0204601 A1 8/2009 Grasset
2009/0204620 A1 8/2009 Thione et al.
2009/0210230 A1 8/2009 Schwarz et al.
2009/0210232 A1 8/2009 Sanchez et al.
2009/0213134 A1 8/2009 Stephanick et al.
2009/0215466 A1 8/2009 Ahl et al.
2009/0215503 A1 8/2009 Zhang et al.
2009/0216396 A1 8/2009 Yamagata
2009/0216528 A1 8/2009 Gemello et al.
2009/0216540 A1 8/2009 Tessel et al.
2009/0216704 A1 8/2009 Zheng et al.
2009/0219166 A1 9/2009 MacFarlane et al.
2009/0221274 A1 9/2009 Venkatakrishnan
2009/0222257 A1 9/2009 Sumita et al.
2009/0222270 A2 9/2009 Likens et al.
2009/0222488 A1 9/2009 Boerries et al.
2009/0224867 A1 9/2009 O'Shaughnessy et al.
2009/0225041 A1 9/2009 Kida et al.
2009/0228126 A1 9/2009 Spielberg et al.
2009/0228273 A1 9/2009 Wang et al.
2009/0228277 A1 9/2009 Bonforte et al.
2009/0228281 A1 9/2009 Singleton et al.
2009/0228439 A1 9/2009 Manolescu et al.
2009/0228792 A1 9/2009 Van Os et al.
2009/0228842 A1 9/2009 Westerman et al.
2009/0228897 A1 9/2009 Murray et al.
2009/0233264 A1 9/2009 Rogers et al.
2009/0234638 A1 9/2009 Ranjan et al.
2009/0234651 A1 9/2009 Basir et al.
2009/0234655 A1 9/2009 Kwon
2009/0235280 A1 9/2009 Tannier et al.
2009/0239202 A1 9/2009 Stone
2009/0239552 A1 9/2009 Churchill et al.
2009/0240485 A1 9/2009 Dalal et al.
2009/0241054 A1 9/2009 Hendricks
2009/0241760 A1 10/2009 Georges
2009/0247237 A1 10/2009 Mittleman et al.

(56) References Cited

U.S. PATENT DOCUMENTS

2009/0248182 A1 10/2009 Logan et al.
2009/0248395 A1 10/2009 Alewine et al.
2009/0248402 A1 10/2009 Ito et al.
2009/0248420 A1 10/2009 Basir et al.
2009/0248422 A1 10/2009 Li et al.
2009/0248456 A1 10/2009 Fahmy et al.
2009/0249198 A1 10/2009 Davis et al.
2009/0249247 A1 10/2009 Tseng et al.
2009/0252350 A1 10/2009 Seguin
2009/0253457 A1 10/2009 Seguin
2009/0253463 A1 10/2009 Shin et al.
2009/0254339 A1 10/2009 Seguin
2009/0254345 A1 10/2009 Fleizach et al.
2009/0254819 A1 10/2009 Song et al.
2009/0254823 A1 10/2009 Barrett
2009/0259472 A1 10/2009 Schroeter
2009/0259475 A1 10/2009 Yamagami et al.
2009/0259969 A1 10/2009 Pallakoff
2009/0265171 A1 10/2009 Davis
2009/0265175 A1 10/2009 Fang
2009/0265368 A1 10/2009 Crider et al.
2009/0271109 A1 10/2009 Lee et al.
2009/0271175 A1 10/2009 Bodin et al.
2009/0271176 A1 10/2009 Bodin et al.
2009/0271178 A1 10/2009 Bodin et al.
2009/0271188 A1 10/2009 Agapi et al.
2009/0271189 A1 10/2009 Agapi et al.
2009/0274315 A1 11/2009 Carnes et al.
2009/0274376 A1 11/2009 Selvaraj et al.
2009/0276215 A1 11/2009 Hager
2009/0278804 A1 11/2009 Rubanovich et al.
2009/0281789 A1 11/2009 Waibel et al.
2009/0284471 A1 11/2009 Longe et al.
2009/0284482 A1 11/2009 Chin
2009/0286514 A1 11/2009 Lichorowic et al.
2009/0287583 A1 11/2009 Holmes
2009/0290718 A1 11/2009 Kahn et al.
2009/0292674 A1 11/2009 Dasdan et al.
2009/0292987 A1 11/2009 Sorenson
2009/0296552 A1 12/2009 Hicks et al.
2009/0298474 A1 12/2009 George
2009/0298529 A1 12/2009 Mahajan
2009/0299730 A1 12/2009 Joh et al.
2009/0299745 A1 12/2009 Kennewick et al.
2009/0299751 A1 12/2009 Jung
2009/0299849 A1 12/2009 Cao et al.
2009/0300391 A1 12/2009 Jessup et al.
2009/0300488 A1 12/2009 Salamon et al.
2009/0304198 A1 12/2009 Herre et al.
2009/0305203 A1 12/2009 Okumura et al.
2009/0306967 A1 12/2009 Nicolov et al.
2009/0306969 A1 12/2009 Goud et al.
2009/0306979 A1 12/2009 Jaiswal et al.
2009/0306980 A1 12/2009 Shin
2009/0306981 A1 12/2009 Cromack et al.
2009/0306985 A1 12/2009 Roberts et al.
2009/0306988 A1 12/2009 Chen et al.
2009/0306989 A1 12/2009 Kaji
2009/0307162 A1 12/2009 Bui et al.
2009/0307201 A1 12/2009 Dunning et al.
2009/0307584 A1 12/2009 Davidson et al.
2009/0307594 A1 12/2009 Kosonen et al.
2009/0309352 A1 12/2009 Walker et al.
2009/0313014 A1 12/2009 Shin et al.
2009/0313020 A1 12/2009 Koivunen
2009/0313023 A1 12/2009 Jones
2009/0313026 A1 12/2009 Coffman et al.
2009/0313544 A1 12/2009 Wood et al.
2009/0313564 A1 12/2009 Rottler et al.
2009/0316943 A1 12/2009 Frigola Munoz et al.
2009/0318119 A1 12/2009 Basir et al.
2009/0318198 A1 12/2009 Carroll
2009/0319257 A1 12/2009 Blume et al.
2009/0319266 A1 12/2009 Brown et al.
2009/0319272 A1 12/2009 Coulomb et al.
2009/0319342 A1 12/2009 Shilman et al.
2009/0326923 A1 12/2009 Yan et al.
2009/0326936 A1 12/2009 Nagashima
2009/0326938 A1 12/2009 Marila et al.
2009/0326949 A1 12/2009 Douthitt et al.
2009/0327977 A1 12/2009 Bachfischer et al.
2010/0004918 A1 1/2010 Lee et al.
2010/0004930 A1 1/2010 Strope et al.
2010/0004931 A1 1/2010 Ma et al.
2010/0005081 A1 1/2010 Bennett
2010/0010803 A1 1/2010 Ishikawa et al.
2010/0010814 A1 1/2010 Patel
2010/0010948 A1 1/2010 Ito et al.
2010/0013760 A1 1/2010 Hirai et al.
2010/0013796 A1 1/2010 Abileah et al.
2010/0017212 A1 1/2010 Attwater et al.
2010/0017382 A1 1/2010 Katragadda et al.
2010/0019834 A1 1/2010 Zerbe et al.
2010/0020035 A1 1/2010 Ryu et al.
2010/0023318 A1 1/2010 Lemoine
2010/0023320 A1 1/2010 Di Cristo et al.
2010/0023331 A1 1/2010 Duta et al.
2010/0026526 A1 2/2010 Yokota
2010/0030549 A1 2/2010 Lee et al.
2010/0030562 A1 2/2010 Yoshizawa et al.
2010/0030928 A1 2/2010 Conroy et al.
2010/0031143 A1 2/2010 Rao et al.
2010/0031150 A1 2/2010 Andrew
2010/0036653 A1 2/2010 Kim et al.
2010/0036655 A1 2/2010 Cecil et al.
2010/0036660 A1 2/2010 Bennett
2010/0036829 A1 2/2010 Leyba
2010/0036928 A1 2/2010 Granito et al.
2010/0037183 A1 2/2010 Miyashita et al.
2010/0037187 A1 2/2010 Kondziela
2010/0042400 A1 2/2010 Block et al.
2010/0042576 A1 2/2010 Roettger et al.
2010/0046842 A1 2/2010 Conwell et al.
2010/0049498 A1 2/2010 Cao et al.
2010/0049514 A1 2/2010 Kennewick et al.
2010/0050064 A1 2/2010 Liu et al.
2010/0054512 A1 3/2010 Solum
2010/0054601 A1 3/2010 Anbalagan et al.
2010/0057435 A1 3/2010 Kent et al.
2010/0057443 A1 3/2010 Di Cristo et al.
2010/0057457 A1 3/2010 Ogata et al.
2010/0057461 A1 3/2010 Neubacher et al.
2010/0057643 A1 3/2010 Yang
2010/0058200 A1 3/2010 Jablokov et al.
2010/0060646 A1 3/2010 Unsal et al.
2010/0063804 A1 3/2010 Sato et al.
2010/0063825 A1 3/2010 Williams et al.
2010/0063961 A1 3/2010 Guiheneuf et al.
2010/0064113 A1 3/2010 Lindahl et al.
2010/0064218 A1 3/2010 Bull et al.
2010/0064226 A1 3/2010 Stefaniak et al.
2010/0066546 A1 3/2010 Aaron
2010/0066684 A1 3/2010 Shahraray et al.
2010/0067723 A1 3/2010 Bergmann et al.
2010/0067867 A1 3/2010 Lin et al.
2010/0070281 A1 3/2010 Conkie et al.
2010/0070517 A1 3/2010 Ghosh et al.
2010/0070521 A1 3/2010 Clinchant et al.
2010/0070899 A1 3/2010 Hunt et al.
2010/0071003 A1 3/2010 Bychkov et al.
2010/0076760 A1 3/2010 Kraenzel et al.
2010/0076968 A1 3/2010 Boyns et al.
2010/0076993 A1 3/2010 Klawitter et al.
2010/0077350 A1 3/2010 Lim et al.
2010/0079501 A1 4/2010 Ikeda et al.
2010/0079508 A1 4/2010 Hodge et al.
2010/0080398 A1 4/2010 Waldmann
2010/0080470 A1 4/2010 Deluca et al.
2010/0081456 A1 4/2010 Singh et al.
2010/0081487 A1 4/2010 Chen et al.
2010/0082286 A1 4/2010 Leung
2010/0082327 A1 4/2010 Rogers et al.
2010/0082328 A1 4/2010 Rogers et al.
2010/0082329 A1 4/2010 Silverman et al.

(56) References Cited

U.S. PATENT DOCUMENTS

2010/0082333 A1 4/2010 Al-Shammari
2010/0082343 A1 4/2010 Levit et al.
2010/0082346 A1 4/2010 Rogers et al.
2010/0082347 A1 4/2010 Rogers et al.
2010/0082348 A1 4/2010 Silverman et al.
2010/0082349 A1 4/2010 Bellegarda et al.
2010/0082376 A1 4/2010 Levitt
2010/0082567 A1 4/2010 Rosenblatt et al.
2010/0082970 A1 4/2010 Lindahl et al.
2010/0086152 A1 4/2010 Rank et al.
2010/0086153 A1 4/2010 Hagen et al.
2010/0086156 A1 4/2010 Rank et al.
2010/0088020 A1 4/2010 Sano et al.
2010/0088093 A1 4/2010 Lee et al.
2010/0088100 A1 4/2010 Lindahl
2010/0094632 A1 4/2010 Davis et al.
2010/0098231 A1 4/2010 Wohlert et al.
2010/0100080 A1 4/2010 Huculak et al.
2010/0100212 A1 4/2010 Lindahl et al.
2010/0100384 A1 4/2010 Ju et al.
2010/0100385 A1 4/2010 Davis et al.
2010/0100515 A1 4/2010 Bangalore et al.
2010/0100816 A1 4/2010 Mccloskey et al.
2010/0103776 A1 4/2010 Chan
2010/0106486 A1 4/2010 Hua et al.
2010/0106498 A1 4/2010 Morrison et al.
2010/0106500 A1 4/2010 McKee et al.
2010/0106503 A1 4/2010 Farrell et al.
2010/0114856 A1 5/2010 Kuboyama
2010/0114887 A1 5/2010 Conway et al.
2010/0121637 A1 5/2010 Roy et al.
2010/0125456 A1 5/2010 Weng et al.
2010/0125458 A1 5/2010 Franco et al.
2010/0125460 A1 5/2010 Mellott et al.
2010/0125811 A1 5/2010 Moore et al.
2010/0127854 A1 5/2010 Helvick et al.
2010/0128701 A1 5/2010 Nagaraja
2010/0131265 A1 5/2010 Boda et al.
2010/0131269 A1 5/2010 Park et al.
2010/0131273 A1 5/2010 Aley-Raz et al.
2010/0131498 A1 5/2010 Linthicum et al.
2010/0131899 A1 5/2010 Hubert
2010/0138215 A1 6/2010 Williams
2010/0138224 A1 6/2010 Bedingfield, Sr.
2010/0138416 A1 6/2010 Bellotti
2010/0138680 A1 6/2010 Brisebois et al.
2010/0138759 A1 6/2010 Roy
2010/0138798 A1 6/2010 Wilson et al.
2010/0142740 A1 6/2010 Roerup
2010/0145694 A1 6/2010 Ju et al.
2010/0145700 A1 6/2010 Kennewick et al.
2010/0145707 A1 6/2010 Ljolje et al.
2010/0146442 A1 6/2010 Nagasaka et al.
2010/0150321 A1 6/2010 Harris et al.
2010/0153114 A1 6/2010 Shih et al.
2010/0153115 A1 6/2010 Klee et al.
2010/0153448 A1 6/2010 Harpur et al.
2010/0153576 A1 6/2010 Wohlert et al.
2010/0158207 A1 6/2010 Dhawan et al.
2010/0161311 A1 6/2010 Massuh
2010/0161313 A1 6/2010 Karttunen
2010/0161337 A1 6/2010 Pulz et al.
2010/0161554 A1 6/2010 Datuashvili et al.
2010/0164897 A1 7/2010 Morin et al.
2010/0169075 A1 7/2010 Raffa et al.
2010/0169093 A1 7/2010 Washio
2010/0169097 A1 7/2010 Nachman et al.
2010/0169098 A1 7/2010 Patch
2010/0171713 A1 7/2010 Kwok et al.
2010/0174544 A1 7/2010 Heifets
2010/0175066 A1 7/2010 Paik
2010/0179932 A1 7/2010 Yoon et al.
2010/0179991 A1 7/2010 Lorch et al.
2010/0180218 A1 7/2010 Boston et al.
2010/0185434 A1 7/2010 Burvall et al.
2010/0185448 A1 7/2010 Meisel
2010/0185949 A1 7/2010 Jaeger
2010/0191520 A1 7/2010 Gruhn et al.
2010/0197359 A1 8/2010 Harris
2010/0198821 A1 8/2010 Loritz et al.
2010/0199180 A1 8/2010 Brichter et al.
2010/0199215 A1 8/2010 Seymour et al.
2010/0199340 A1 8/2010 Jonas et al.
2010/0204986 A1 8/2010 Kennewick et al.
2010/0211199 A1 8/2010 Naik et al.
2010/0211379 A1 8/2010 Gorman et al.
2010/0211644 A1 8/2010 Lavoie et al.
2010/0216509 A1 8/2010 Riemer et al.
2010/0217581 A1 8/2010 Hong
2010/0217604 A1 8/2010 Baldwin et al.
2010/0222033 A1 9/2010 Scott et al.
2010/0222098 A1 9/2010 Garg
2010/0223055 A1 9/2010 Mclean
2010/0223056 A1 9/2010 Kadirkamanathan et al.
2010/0223131 A1 9/2010 Scott et al.
2010/0225599 A1 9/2010 Danielsson et al.
2010/0225809 A1 9/2010 Connors et al.
2010/0227642 A1 9/2010 Kim et al.
2010/0228540 A1 9/2010 Bennett
2010/0228549 A1 9/2010 Herman et al.
2010/0228691 A1 9/2010 Yang et al.
2010/0229082 A1 9/2010 Karmarkar et al.
2010/0229100 A1 9/2010 Miller et al.
2010/0231474 A1 9/2010 Yamagajo et al.
2010/0235167 A1 9/2010 Bourdon
2010/0235341 A1 9/2010 Bennett
2010/0235729 A1 9/2010 Kocienda et al.
2010/0235732 A1 9/2010 Bergman
2010/0235770 A1 9/2010 Ording et al.
2010/0235780 A1 9/2010 Westerman et al.
2010/0235793 A1 9/2010 Ording et al.
2010/0241418 A1 9/2010 Maeda et al.
2010/0250542 A1 9/2010 Fujimaki
2010/0250599 A1 9/2010 Schmidt et al.
2010/0255858 A1 10/2010 Juhasz
2010/0257160 A1 10/2010 Cao
2010/0257478 A1 10/2010 Longe et al.
2010/0257490 A1 10/2010 Lyon et al.
2010/0262599 A1 10/2010 Nitz
2010/0263015 A1 10/2010 Pandey et al.
2010/0268537 A1 10/2010 Al-Telmissani
2010/0268539 A1 10/2010 Xu et al.
2010/0269040 A1 10/2010 Lee
2010/0274753 A1 10/2010 Liberty et al.
2010/0277579 A1 11/2010 Cho et al.
2010/0278320 A1 11/2010 Arsenault et al.
2010/0278391 A1 11/2010 Hsu et al.
2010/0278453 A1 11/2010 King
2010/0280983 A1 11/2010 Cho et al.
2010/0281034 A1 11/2010 Petrou et al.
2010/0286984 A1 11/2010 Wandinger et al.
2010/0286985 A1 11/2010 Kennewick et al.
2010/0287514 A1 11/2010 Cragun et al.
2010/0290632 A1 11/2010 Lin
2010/0293460 A1 11/2010 Budelli
2010/0295645 A1 11/2010 Falldin et al.
2010/0299133 A1 11/2010 Kopparapu et al.
2010/0299138 A1 11/2010 Kim
2010/0299142 A1 11/2010 Freeman et al.
2010/0302056 A1 12/2010 Dutton et al.
2010/0303254 A1 12/2010 Yoshizawa et al.
2010/0304342 A1 12/2010 Zilber
2010/0304705 A1 12/2010 Hursey et al.
2010/0305807 A1 12/2010 Basir et al.
2010/0305947 A1 12/2010 Schwarz et al.
2010/0312547 A1 12/2010 Van Os et al.
2010/0312566 A1 12/2010 Odinak et al.
2010/0318366 A1 12/2010 Sullivan et al.
2010/0318576 A1 12/2010 Kim
2010/0322438 A1 12/2010 Siotis
2010/0324709 A1 12/2010 Starmen
2010/0324895 A1 12/2010 Kurzweil et al.
2010/0324896 A1 12/2010 Attwater et al.
2010/0324905 A1 12/2010 Kurzweil et al.

(56) References Cited

U.S. PATENT DOCUMENTS

2010/0325131 A1 12/2010 Dumais et al.
2010/0325158 A1 12/2010 Oral et al.
2010/0325573 A1 12/2010 Estrada et al.
2010/0325588 A1 12/2010 Reddy et al.
2010/0330908 A1 12/2010 Maddern et al.
2010/0332003 A1 12/2010 Yaguez
2010/0332220 A1 12/2010 Hursey et al.
2010/0332224 A1 12/2010 Mäkelä et al.
2010/0332235 A1 12/2010 David
2010/0332236 A1 12/2010 Tan
2010/0332280 A1 12/2010 Bradley et al.
2010/0332348 A1 12/2010 Cao
2010/0332428 A1 12/2010 Mchenry et al.
2010/0332976 A1 12/2010 Fux et al.
2010/0333030 A1 12/2010 Johns
2010/0333163 A1 12/2010 Daly
2011/0002487 A1 1/2011 Panther et al.
2011/0004475 A1 1/2011 Bellegarda
2011/0006876 A1 1/2011 Moberg et al.
2011/0009107 A1 1/2011 Guba et al.
2011/0010178 A1 1/2011 Lee et al.
2011/0010644 A1 1/2011 Merrill et al.
2011/0015928 A1 1/2011 Odell et al.
2011/0016150 A1 1/2011 Engstrom et al.
2011/0016421 A1 1/2011 Krupka et al.
2011/0018695 A1 1/2011 Bells et al.
2011/0021211 A1 1/2011 Ohki
2011/0021213 A1 1/2011 Carr
2011/0022292 A1 1/2011 Shen et al.
2011/0022388 A1 1/2011 Wu et al.
2011/0022393 A1 1/2011 Waller et al.
2011/0022394 A1 1/2011 Wide et al.
2011/0022472 A1 1/2011 Zon et al.
2011/0022952 A1 1/2011 Wu et al.
2011/0288917 A1 1/2011 Wanek et al.
2011/0029616 A1 2/2011 Wang et al.
2011/0030067 A1 2/2011 Wilson
2011/0033064 A1 2/2011 Johnson et al.
2011/0034183 A1 2/2011 Haag et al.
2011/0035144 A1 2/2011 Okamoto et al.
2011/0035434 A1 2/2011 Lockwood
2011/0038489 A1 2/2011 Visser et al.
2011/0039584 A1 2/2011 Merrett
2011/0040707 A1 2/2011 Theisen et al.
2011/0045841 A1 2/2011 Kuhlke et al.
2011/0047072 A1 2/2011 Ciurea
2011/0047149 A1 2/2011 Vaananen
2011/0047161 A1 2/2011 Myaeng et al.
2011/0047266 A1 2/2011 Yu et al.
2011/0047605 A1 2/2011 Sontag et al.
2011/0050591 A1 3/2011 Kim et al.
2011/0050592 A1 3/2011 Kim et al.
2011/0054647 A1 3/2011 Chipchase
2011/0054894 A1 3/2011 Phillips et al.
2011/0054901 A1 3/2011 Qin et al.
2011/0055256 A1 3/2011 Phillips et al.
2011/0060584 A1 3/2011 Ferrucci et al.
2011/0060587 A1 3/2011 Phillips et al.
2011/0060589 A1 3/2011 Weinberg et al.
2011/0060807 A1 3/2011 Martin et al.
2011/0060812 A1 3/2011 Middleton
2011/0064378 A1 3/2011 Gharaat et al.
2011/0064387 A1 3/2011 Mendeioff et al.
2011/0065456 A1 3/2011 Brennan et al.
2011/0066366 A1 3/2011 Ellanti et al.
2011/0066436 A1 3/2011 Bezar
2011/0066468 A1 3/2011 Huang et al.
2011/0066602 A1 3/2011 Studer et al.
2011/0066634 A1 3/2011 Phillips et al.
2011/0072033 A1 3/2011 White et al.
2011/0072492 A1 3/2011 Mohler et al.
2011/0075818 A1 3/2011 Vance et al.
2011/0076994 A1 3/2011 Kim et al.
2011/0077943 A1 3/2011 Miki et al.
2011/0080260 A1 4/2011 Wang et al.
2011/0081889 A1 4/2011 Gao et al.
2011/0082688 A1 4/2011 Kim et al.
2011/0083079 A1 4/2011 Farrell et al.
2011/0087491 A1 4/2011 Wittenstein et al.
2011/0087685 A1 4/2011 Lin et al.
2011/0090078 A1 4/2011 Kim et al.
2011/0092187 A1 4/2011 Miller
2011/0093261 A1 4/2011 Angott
2011/0093265 A1 4/2011 Stent et al.
2011/0093271 A1 4/2011 Bernard et al.
2011/0093272 A1 4/2011 Isobe et al.
2011/0099000 A1 4/2011 Rai et al.
2011/0099157 A1 4/2011 Lebeau et al.
2011/0102161 A1 5/2011 Heubel et al.
2011/0103682 A1 5/2011 Chidlovskii et al.
2011/0105097 A1 5/2011 Tadayon et al.
2011/0106736 A1 5/2011 Aharonson et al.
2011/0106878 A1 5/2011 Cho et al.
2011/0106892 A1 5/2011 Nelson et al.
2011/0110502 A1 5/2011 Daye et al.
2011/0111724 A1 5/2011 Baptiste
2011/0112825 A1 5/2011 Bellegarda
2011/0112827 A1 5/2011 Kennewick et al.
2011/0112837 A1 5/2011 Kurki-Suonio et al.
2011/0112838 A1 5/2011 Adibi
2011/0112921 A1 5/2011 Kennewick et al.
2011/0116610 A1 5/2011 Shaw et al.
2011/0119049 A1 5/2011 Ylonen
2011/0119051 A1 5/2011 Li et al.
2011/0119623 A1 5/2011 Kim
2011/0119715 A1 5/2011 Chang et al.
2011/0123004 A1 5/2011 Chang et al.
2011/0125498 A1 5/2011 Pickering et al.
2011/0125540 A1 5/2011 Jang et al.
2011/0125701 A1 5/2011 Nair et al.
2011/0130958 A1 6/2011 Stahl et al.
2011/0131036 A1 6/2011 DiCristo et al.
2011/0131038 A1 6/2011 Oyaizu et al.
2011/0131045 A1 6/2011 Cristo et al.
2011/0137636 A1 6/2011 Srihari et al.
2011/0137664 A1 6/2011 Kho et al.
2011/0141141 A1 6/2011 Kankainen
2011/0143718 A1 6/2011 Engelhart, Sr.
2011/0143726 A1 6/2011 de Silva
2011/0143811 A1 6/2011 Rodriguez
2011/0144857 A1 6/2011 Wingrove et al.
2011/0144901 A1 6/2011 Wang
2011/0144973 A1 6/2011 Bocchieri et al.
2011/0144999 A1 6/2011 Jang et al.
2011/0145718 A1 6/2011 Ketola et al.
2011/0151830 A1 6/2011 Blanda et al.
2011/0153209 A1 6/2011 Geelen
2011/0153322 A1 6/2011 Kwak et al.
2011/0153324 A1 6/2011 Ballinger et al.
2011/0153329 A1 6/2011 Moorer
2011/0153330 A1 6/2011 Yazdani et al.
2011/0153373 A1 6/2011 Dantzig et al.
2011/0154193 A1 6/2011 Creutz et al.
2011/0157029 A1 6/2011 Tseng
2011/0161072 A1 6/2011 Terao et al.
2011/0161076 A1 6/2011 Davis et al.
2011/0161079 A1 6/2011 Gruhn et al.
2011/0161309 A1 6/2011 Lung et al.
2011/0161852 A1 6/2011 Vainio et al.
2011/0166851 A1 7/2011 LeBeau et al.
2011/0166855 A1 7/2011 Vermeulen et al.
2011/0167350 A1 7/2011 Hoellwarth
2011/0175810 A1 7/2011 Markovic et al.
2011/0178804 A1 7/2011 Inoue et al.
2011/0179002 A1 7/2011 Dumitru et al.
2011/0179372 A1 7/2011 Moore et al.
2011/0183627 A1 7/2011 Ueda et al.
2011/0183650 A1 7/2011 Mckee et al.
2011/0184721 A1 7/2011 Subramanian et al.
2011/0184730 A1 7/2011 LeBeau et al.
2011/0184736 A1 7/2011 Slotznick
2011/0184737 A1 7/2011 Nakano et al.
2011/0184768 A1 7/2011 Norton et al.
2011/0184789 A1 7/2011 Kirsch

(56) References Cited

U.S. PATENT DOCUMENTS

2011/0185288 A1 7/2011 Gupta et al.
2011/0191108 A1 8/2011 Friedlander
2011/0191271 A1 8/2011 Baker et al.
2011/0191344 A1 8/2011 Jin et al.
2011/0195758 A1 8/2011 Damale et al.
2011/0196670 A1 8/2011 Dang et al.
2011/0197128 A1 8/2011 Assadollahi et al.
2011/0199312 A1 8/2011 Okuta
2011/0201385 A1 8/2011 Higginbotham et al.
2011/0201387 A1 8/2011 Paek et al.
2011/0202526 A1 8/2011 Lee et al.
2011/0202594 A1* 8/2011 Ricci ...................... H04M 3/44 455/414.1
2011/0202874 A1 8/2011 Ramer et al.
2011/0205149 A1 8/2011 Tom et al.
2011/0208511 A1 8/2011 Sikstrom et al.
2011/0208524 A1 8/2011 Haughay
2011/0209088 A1 8/2011 Hinckley et al.
2011/0212717 A1 9/2011 Rhoads et al.
2011/0216093 A1 9/2011 Griffin
2011/0218806 A1 9/2011 Alewine et al.
2011/0218855 A1 9/2011 Cao et al.
2011/0219018 A1 9/2011 Bailey et al.
2011/0223893 A1 9/2011 Lau et al.
2011/0224972 A1 9/2011 Millett et al.
2011/0228913 A1 9/2011 Cochinwaia et al.
2011/0231182 A1 9/2011 Weider et al.
2011/0231184 A1 9/2011 Kerr
2011/0231188 A1 9/2011 Kennewick et al.
2011/0231218 A1 9/2011 Tovar
2011/0231432 A1 9/2011 Sata et al.
2011/0231474 A1 9/2011 Locker et al.
2011/0238191 A1 9/2011 Kristjansson et al.
2011/0238407 A1 9/2011 Kent
2011/0238408 A1 9/2011 Larcheveque et al.
2011/0238676 A1 9/2011 Liu et al.
2011/0239111 A1 9/2011 Grover
2011/0242007 A1 10/2011 Gray et al.
2011/0244888 A1 10/2011 Ohki
2011/0246471 A1 10/2011 Rakib et al.
2011/0249144 A1 10/2011 Chang
2011/0250570 A1 10/2011 Mack et al.
2011/0257966 A1 10/2011 Rychlik
2011/0258188 A1 10/2011 Abdalmageed et al.
2011/0260829 A1 10/2011 Lee
2011/0260861 A1 10/2011 Singh et al.
2011/0264643 A1 10/2011 Cao
2011/0264999 A1 10/2011 Bells et al.
2011/0274303 A1 11/2011 Filson et al.
2011/0276595 A1 11/2011 Kirkland et al.
2011/0276598 A1 11/2011 Kozempel
2011/0276944 A1 11/2011 Bergman et al.
2011/0279368 A1 11/2011 Klein et al.
2011/0280143 A1 11/2011 Li et al.
2011/0282663 A1 11/2011 Talwar et al.
2011/0282888 A1 11/2011 Koperski et al.
2011/0282903 A1 11/2011 Zhang
2011/0282906 A1 11/2011 Wong
2011/0283189 A1 11/2011 McCarty
2011/0283190 A1 11/2011 Poltorak
2011/0288852 A1 11/2011 Dymetman et al.
2011/0288855 A1 11/2011 Roy
2011/0288861 A1 11/2011 Kurzweil et al.
2011/0288863 A1 11/2011 Rasmussen
2011/0288866 A1 11/2011 Rasmussen
2011/0298585 A1 12/2011 Barry
2011/0301943 A1 12/2011 Patch
2011/0302162 A1 12/2011 Xiao et al.
2011/0302645 A1 12/2011 Headley
2011/0306426 A1 12/2011 Novak et al.
2011/0307241 A1 12/2011 Waibel et al.
2011/0307254 A1 12/2011 Hunt et al.
2011/0307491 A1 12/2011 Fisk et al.
2011/0307810 A1 12/2011 Hilerio et al.
2011/0313775 A1 12/2011 Laligand et al.
2011/0313803 A1 12/2011 Friend et al.
2011/0314003 A1 12/2011 Ju et al.
2011/0314032 A1 12/2011 Bennett et al.
2011/0314404 A1 12/2011 Kotler et al.
2011/0314539 A1 12/2011 Horton
2011/0320187 A1 12/2011 Motik et al.
2012/0002820 A1 1/2012 Leichter
2012/0005602 A1 1/2012 Anttila et al.
2012/0008754 A1 1/2012 Mukherjee et al.
2012/0010886 A1 1/2012 Razavilar
2012/0011138 A1 1/2012 Dunning et al.
2012/0013609 A1 1/2012 Reponen et al.
2012/0015629 A1 1/2012 Olsen et al.
2012/0016658 A1 1/2012 Wu et al.
2012/0016678 A1 1/2012 Gruber et al.
2012/0019400 A1 1/2012 Patel et al.
2012/0020490 A1 1/2012 Leichter
2012/0020503 A1 1/2012 Endo et al.
2012/0022787 A1 1/2012 LeBeau et al.
2012/0022857 A1 1/2012 Baldwin et al.
2012/0022860 A1 1/2012 Lloyd et al.
2012/0022868 A1 1/2012 LeBeau et al.
2012/0022869 A1 1/2012 Lloyd et al.
2012/0022870 A1 1/2012 Kristjansson et al.
2012/0022872 A1 1/2012 Gruber et al.
2012/0022874 A1 1/2012 Lloyd et al.
2012/0022876 A1 1/2012 LeBeau et al.
2012/0022967 A1 1/2012 Bachman et al.
2012/0023088 A1 1/2012 Cheng et al.
2012/0023095 A1 1/2012 Wadycki et al.
2012/0023462 A1 1/2012 Rosing et al.
2012/0029661 A1 2/2012 Jones et al.
2012/0029910 A1 2/2012 Medlock et al.
2012/0034904 A1 2/2012 LeBeau et al.
2012/0035907 A1 2/2012 Lebeau et al.
2012/0035908 A1 2/2012 Lebeau et al.
2012/0035924 A1 2/2012 Jitkoff et al.
2012/0035925 A1 2/2012 Friend et al.
2012/0035926 A1 2/2012 Ambler
2012/0035931 A1 2/2012 LeBeau et al.
2012/0035932 A1 2/2012 Jitkoff et al.
2012/0035935 A1 2/2012 Park et al.
2012/0036556 A1 2/2012 LeBeau et al.
2012/0039539 A1 2/2012 Boiman et al.
2012/0041752 A1 2/2012 Wang et al.
2012/0041756 A1 2/2012 Hanazawa et al.
2012/0041759 A1 2/2012 Barker et al.
2012/0042014 A1 2/2012 Desai et al.
2012/0042343 A1 2/2012 Laligand et al.
2012/0053815 A1 3/2012 Montanari et al.
2012/0053829 A1 3/2012 Agarwal et al.
2012/0053945 A1 3/2012 Gupta et al.
2012/0056815 A1 3/2012 Mehra
2012/0059655 A1 3/2012 Cartales
2012/0059813 A1 3/2012 Sejnoha et al.
2012/0060052 A1 3/2012 White et al.
2012/0062473 A1 3/2012 Xiao et al.
2012/0066212 A1 3/2012 Jennings
2012/0066581 A1 3/2012 Spalink
2012/0075054 A1 3/2012 Ge et al.
2012/0075184 A1 3/2012 Madhvanath
2012/0077479 A1 3/2012 Sabotta et al.
2012/0078611 A1 3/2012 Soltani et al.
2012/0078624 A1 3/2012 Yook et al.
2012/0078627 A1 3/2012 Wagner
2012/0078635 A1 3/2012 Rothkopf et al.
2012/0078747 A1 3/2012 Chakrabarti et al.
2012/0082317 A1 4/2012 Pance et al.
2012/0083286 A1 4/2012 Kim et al.
2012/0084086 A1 4/2012 Gilbert et al.
2012/0084089 A1 4/2012 Lloyd et al.
2012/0084634 A1 4/2012 Wong et al.
2012/0088219 A1 4/2012 Briscoe et al.
2012/0089331 A1 4/2012 Schmidt et al.
2012/0101823 A1 4/2012 Weng et al.
2012/0105257 A1 5/2012 Murillo et al.
2012/0108166 A1 5/2012 Hymel
2012/0108221 A1 5/2012 Thomas et al.
2012/0109632 A1 5/2012 Sugiura et al.

(56) References Cited

U.S. PATENT DOCUMENTS

2012/0109753 A1 5/2012 Kennewick et al.
2012/0109997 A1 5/2012 Sparks et al.
2012/0110456 A1 5/2012 Larco et al.
2012/0114108 A1 5/2012 Kalis et al.
2012/0116770 A1 5/2012 Chen et al.
2012/0117499 A1 5/2012 Mori et al.
2012/0124126 A1 5/2012 Alcazar et al.
2012/0124177 A1 5/2012 Sparks
2012/0124178 A1 5/2012 Sparks
2012/0128322 A1 5/2012 Shaffer et al.
2012/0130709 A1 5/2012 Bocchieri et al.
2012/0130995 A1 5/2012 Risvik et al.
2012/0136572 A1 5/2012 Norton
2012/0136649 A1 5/2012 Freising et al.
2012/0136855 A1 5/2012 Ni et al.
2012/0136985 A1 5/2012 Popescu et al.
2012/0137367 A1 5/2012 Dupont et al.
2012/0149342 A1 6/2012 Cohen et al.
2012/0149394 A1 6/2012 Singh et al.
2012/0150532 A1 6/2012 Mirowski et al.
2012/0150544 A1 6/2012 McLoughlin et al.
2012/0150580 A1 6/2012 Norton
2012/0158293 A1 6/2012 Burnham
2012/0158399 A1 6/2012 Tremblay et al.
2012/0158422 A1 6/2012 Burnham et al.
2012/0159380 A1 6/2012 Kocienda et al.
2012/0163710 A1 6/2012 Skaff et al.
2012/0166196 A1 6/2012 Ju et al.
2012/0166429 A1 6/2012 Moore et al.
2012/0166942 A1 6/2012 Ramerth et al.
2012/0166959 A1 6/2012 Hilerio et al.
2012/0166998 A1 6/2012 Cotterill et al.
2012/0173222 A1 7/2012 Wang et al.
2012/0173244 A1 7/2012 Kwak et al.
2012/0173464 A1 7/2012 Tur et al.
2012/0174121 A1 7/2012 Treat et al.
2012/0179457 A1 7/2012 Newman et al.
2012/0179467 A1 7/2012 Williams
2012/0185237 A1 7/2012 Gajic et al.
2012/0185480 A1 7/2012 Ni et al.
2012/0185781 A1 7/2012 Guzman et al.
2012/0191461 A1 7/2012 Lin et al.
2012/0192096 A1 7/2012 Bowman et al.
2012/0197743 A1 8/2012 Grigg et al.
2012/0197995 A1 8/2012 Caruso
2012/0197998 A1 8/2012 Kessel et al.
2012/0201362 A1 8/2012 Crossan et al.
2012/0209454 A1 8/2012 Miller et al.
2012/0209654 A1 8/2012 Romagnino et al.
2012/0209853 A1 8/2012 Desai et al.
2012/0209874 A1 8/2012 Wong et al.
2012/0210266 A1 8/2012 Jiang et al.
2012/0214141 A1 8/2012 Raya et al.
2012/0214517 A1 8/2012 Singh et al.
2012/0215762 A1 8/2012 Hall et al.
2012/0221339 A1 8/2012 Wang et al.
2012/0221552 A1 8/2012 Reponen et al.
2012/0223889 A1 9/2012 Medlock et al.
2012/0223936 A1 9/2012 Aughey et al.
2012/0232885 A1 9/2012 Barbosa et al.
2012/0232886 A1 9/2012 Capuozzo et al.
2012/0232906 A1 9/2012 Lindahl et al.
2012/0233207 A1 9/2012 Mohajer
2012/0233266 A1 9/2012 Hassan et al.
2012/0233280 A1 9/2012 Ebara
2012/0239661 A1 9/2012 Giblin
2012/0239761 A1 9/2012 Linner et al.
2012/0242482 A1 9/2012 Elumalai et al.
2012/0245719 A1 9/2012 Story, Jr. et al.
2012/0245939 A1 9/2012 Braho et al.
2012/0245941 A1 9/2012 Cheyer
2012/0245944 A1* 9/2012 Gruber .................. G06N 5/022 704/270.1
2012/0246064 A1 9/2012 Baikow
2012/0250858 A1 10/2012 Iqbal et al.
2012/0252367 A1 10/2012 Gaglio et al.
2012/0252540 A1 10/2012 Kirigaya
2012/0253785 A1 10/2012 Hamid et al.
2012/0253791 A1 10/2012 Heck et al.
2012/0254143 A1 10/2012 Varma et al.
2012/0254152 A1 10/2012 Park et al.
2012/0254290 A1 10/2012 Naaman
2012/0259615 A1 10/2012 Morin et al.
2012/0262296 A1 10/2012 Bezar
2012/0265482 A1 10/2012 Grokop et al.
2012/0265528 A1 10/2012 Gruber et al.
2012/0265535 A1 10/2012 Bryant-Rich et al.
2012/0265806 A1 10/2012 Blanchflower et al.
2012/0271625 A1 10/2012 Bernard
2012/0271634 A1 10/2012 Lenke
2012/0271635 A1 10/2012 Ljolje
2012/0271640 A1 10/2012 Basir
2012/0271676 A1 10/2012 Aravamudan et al.
2012/0275377 A1 11/2012 Lehane et al.
2012/0278744 A1 11/2012 Kozitsyn et al.
2012/0278812 A1 11/2012 Wang
2012/0284015 A1 11/2012 Drewes
2012/0284027 A1 11/2012 Mallett et al.
2012/0290291 A1 11/2012 Shelley et al.
2012/0290300 A1 11/2012 Lee et al.
2012/0295708 A1 11/2012 Hernandez-Abrego et al.
2012/0296638 A1 11/2012 Patwa
2012/0296649 A1 11/2012 Bansal et al.
2012/0296654 A1 11/2012 Hendrickson et al.
2012/0296891 A1 11/2012 Rangan
2012/0297348 A1 11/2012 Santoro
2012/0303369 A1 11/2012 Brush et al.
2012/0303371 A1 11/2012 Labsky et al.
2012/0304124 A1 11/2012 Chen et al.
2012/0309363 A1 12/2012 Gruber et al.
2012/0310642 A1 12/2012 Cao et al.
2012/0310649 A1 12/2012 Cannistraro et al.
2012/0310652 A1 12/2012 O'Sullivan
2012/0310922 A1 12/2012 Johnson et al.
2012/0311478 A1 12/2012 Van Os et al.
2012/0311583 A1 12/2012 Gruber et al.
2012/0311584 A1 12/2012 Gruber et al.
2012/0311585 A1 12/2012 Gruber et al.
2012/0316862 A1 12/2012 Sultan et al.
2012/0316875 A1 12/2012 Nyquist et al.
2012/0316878 A1 12/2012 Singleton et al.
2012/0317194 A1 12/2012 Tian
2012/0317498 A1 12/2012 Logan et al.
2012/0321112 A1 12/2012 Schubert et al.
2012/0323560 A1 12/2012 Perez et al.
2012/0324391 A1 12/2012 Tocci et al.
2012/0327009 A1 12/2012 Fleizach
2012/0329529 A1 12/2012 van der Raadt
2012/0330660 A1 12/2012 Jaiswal
2012/0330661 A1 12/2012 Lindahl
2012/0330990 A1 12/2012 Chen et al.
2013/0002716 A1 1/2013 Walker et al.
2013/0005405 A1 1/2013 Prociw
2013/0006633 A1 1/2013 Grokop et al.
2013/0006637 A1 1/2013 Kanevsky et al.
2013/0006638 A1 1/2013 Lindahl
2013/0007240 A1 1/2013 Qiu et al.
2013/0007648 A1 1/2013 Gamon et al.
2013/0009858 A1 1/2013 Lacey
2013/0010575 A1 1/2013 He et al.
2013/0013313 A1 1/2013 Shechtman et al.
2013/0013319 A1 1/2013 Grant et al.
2013/0014026 A1 1/2013 Beringer et al.
2013/0018659 A1 1/2013 Chi
2013/0018863 A1 1/2013 Regan et al.
2013/0024576 A1 1/2013 Dishneau et al.
2013/0027875 A1 1/2013 Zhu et al.
2013/0030787 A1 1/2013 Cancedda et al.
2013/0030789 A1 1/2013 Dalce
2013/0030804 A1 1/2013 Zavaliagko et al.
2013/0030815 A1 1/2013 Madhvanath et al.
2013/0030904 A1 1/2013 Aidasani et al.
2013/0030913 A1 1/2013 Zhu et al.
2013/0030955 A1 1/2013 David

(56) References Cited

U.S. PATENT DOCUMENTS

2013/0031162 A1 1/2013 Willis et al.
2013/0031476 A1 1/2013 Coin et al.
2013/0033643 A1 2/2013 Kim et al.
2013/0035086 A1 2/2013 Chardon et al.
2013/0035942 A1 2/2013 Kim et al.
2013/0035961 A1 2/2013 Yegnanarayanan
2013/0041647 A1 2/2013 Ramerth et al.
2013/0041654 A1 2/2013 Walker et al.
2013/0041661 A1 2/2013 Lee et al.
2013/0041665 A1 2/2013 Jang et al.
2013/0041667 A1 2/2013 Longe et al.
2013/0041968 A1 2/2013 Cohen et al.
2013/0046544 A1 2/2013 Kay et al.
2013/0050089 A1 2/2013 Neels et al.
2013/0054550 A1 2/2013 Bolohan
2013/0054609 A1 2/2013 Rajput et al.
2013/0054613 A1 2/2013 Bishop
2013/0054631 A1 2/2013 Govani et al.
2013/0054675 A1 2/2013 Jenkins et al.
2013/0054706 A1 2/2013 Graham et al.
2013/0055099 A1 2/2013 Yao et al.
2013/0055147 A1 2/2013 Vasudev et al.
2013/0063611 A1 3/2013 Papakipos et al.
2013/0066832 A1 3/2013 Sheehan et al.
2013/0067307 A1 3/2013 Tian et al.
2013/0069769 A1 3/2013 Pennington et al.
2013/0073286 A1 3/2013 Bastea-Forte et al.
2013/0073293 A1 3/2013 Jang et al.
2013/0073346 A1 3/2013 Chun et al.
2013/0078930 A1 3/2013 Chen et al.
2013/0080152 A1 3/2013 Brun et al.
2013/0080162 A1 3/2013 Chang et al.
2013/0080167 A1 3/2013 Mozer
2013/0080177 A1 3/2013 Chen
2013/0080178 A1 3/2013 Kang et al.
2013/0080251 A1 3/2013 Dempski
2013/0082967 A1 4/2013 Hillis et al.
2013/0085755 A1 4/2013 Bringert et al.
2013/0085761 A1 4/2013 Bringert et al.
2013/0086609 A1 4/2013 Levy et al.
2013/0090921 A1 4/2013 Liu et al.
2013/0091090 A1 4/2013 Spivack et al.
2013/0095805 A1 4/2013 Lebeau et al.
2013/0096909 A1 4/2013 Brun et al.
2013/0096911 A1 4/2013 Beaufort et al.
2013/0096917 A1 4/2013 Edgar et al.
2013/0097566 A1 4/2013 Berglund
2013/0097682 A1 4/2013 Zeljkovic et al.
2013/0100268 A1 4/2013 Mihailidis et al.
2013/0103391 A1 4/2013 Millrnore et al.
2013/0103405 A1 4/2013 Namba et al.
2013/0106742 A1 5/2013 Lee et al.
2013/0110505 A1 5/2013 Gruber et al.
2013/0110515 A1 5/2013 Guzzoni et al.
2013/0110518 A1 5/2013 Gruber et al.
2013/0110519 A1 5/2013 Cheyer et al.
2013/0110520 A1 5/2013 Cheyer et al.
2013/0110943 A1 5/2013 Menon et al.
2013/0111330 A1 5/2013 Staikos et al.
2013/0111348 A1 5/2013 Gruber et al.
2013/0111365 A1 5/2013 Chen et al.
2013/0111487 A1 5/2013 Cheyer et al.
2013/0111581 A1 5/2013 Griffin et al.
2013/0115927 A1 5/2013 Gruber et al.
2013/0117022 A1 5/2013 Chen et al.
2013/0124189 A1 5/2013 Baldwin et al.
2013/0124672 A1 5/2013 Pan
2013/0125168 A1 5/2013 Agnihotri et al.
2013/0132081 A1 5/2013 Ryu et al.
2013/0132084 A1 5/2013 Stonehocker et al.
2013/0132089 A1 5/2013 Fanty et al.
2013/0132871 A1 5/2013 Zeng et al.
2013/0138440 A1 5/2013 Strope et al.
2013/0141551 A1 6/2013 Kim
2013/0142317 A1 6/2013 Reynolds
2013/0142345 A1 6/2013 Waldmann
2013/0144594 A1 6/2013 Bangalore et al.
2013/0144616 A1 6/2013 Bangalore et al.
2013/0151339 A1 6/2013 Kim et al.
2013/0152092 A1 6/2013 Yadgar et al.
2013/0154811 A1 6/2013 Ferren et al.
2013/0156198 A1 6/2013 Kim et al.
2013/0157629 A1 6/2013 Lee et al.
2013/0158977 A1 6/2013 Senior
2013/0159847 A1 6/2013 Banke et al.
2013/0159861 A1 6/2013 Rottler et al.
2013/0165232 A1 6/2013 Nelson et al.
2013/0166278 A1 6/2013 James et al.
2013/0166303 A1 6/2013 Chang et al.
2013/0166332 A1 6/2013 Hammad
2013/0166442 A1 6/2013 Nakajima et al.
2013/0170738 A1 7/2013 Capuozzo et al.
2013/0172022 A1 7/2013 Seymour et al.
2013/0173258 A1 7/2013 Liu et al.
2013/0173268 A1 7/2013 Weng et al.
2013/0174034 A1 7/2013 Brown et al.
2013/0176244 A1 7/2013 Yamamoto et al.
2013/0176592 A1 7/2013 Sasaki
2013/0179172 A1 7/2013 Nakamura et al.
2013/0179440 A1 7/2013 Gordon
2013/0183942 A1 7/2013 Novick et al.
2013/0183944 A1 7/2013 Mozer et al.
2013/0185059 A1 7/2013 Riccardi et al.
2013/0185066 A1 7/2013 Tzirkel-Hancock et al.
2013/0185074 A1 7/2013 Gruber et al.
2013/0185081 A1 7/2013 Cheyer et al.
2013/0185336 A1 7/2013 Singh et al.
2013/0187850 A1 7/2013 Schulz et al.
2013/0187857 A1 7/2013 Griffin et al.
2013/0190021 A1 7/2013 Vieri et al.
2013/0191117 A1 7/2013 Atti et al.
2013/0197911 A1 8/2013 Wei et al.
2013/0198159 A1 8/2013 Hendry
2013/0198841 A1 8/2013 Poulson
2013/0204813 A1 8/2013 Master et al.
2013/0204897 A1 8/2013 McDougall
2013/0204967 A1 8/2013 Seo et al.
2013/0207898 A1 8/2013 Sullivan et al.
2013/0218553 A1 8/2013 Fujii et al.
2013/0218560 A1 8/2013 Hsiao et al.
2013/0218899 A1 8/2013 Raghavan et al.
2013/0219333 A1 8/2013 Palwe et al.
2013/0222249 A1 8/2013 Pasquero et al.
2013/0225128 A1 8/2013 Gomar
2013/0226935 A1 8/2013 Bai et al.
2013/0231917 A1 9/2013 Naik
2013/0234947 A1 9/2013 Kristensson et al.
2013/0235987 A1 9/2013 Arroniz-Escobar et al.
2013/0238326 A1 9/2013 Kim et al.
2013/0238647 A1 9/2013 Thompson
2013/0244615 A1 9/2013 Miller et al.
2013/0246048 A1 9/2013 Nagase et al.
2013/0246050 A1 9/2013 Yu et al.
2013/0246329 A1 9/2013 Pasquero et al.
2013/0253911 A1 9/2013 Petri et al.
2013/0253912 A1 9/2013 Medlock et al.
2013/0268263 A1 10/2013 Park et al.
2013/0268956 A1 10/2013 Recco
2013/0275117 A1 10/2013 Winer
2013/0275138 A1 10/2013 Gruber et al.
2013/0275164 A1 10/2013 Gruber et al.
2013/0275199 A1 10/2013 Proctor, Jr. et al.
2013/0275625 A1 10/2013 Taivalsaari et al.
2013/0275875 A1 10/2013 Gruber et al.
2013/0275899 A1 10/2013 Schubert et al.
2013/0282709 A1 10/2013 Zhu et al.
2013/0283168 A1 10/2013 Brown et al.
2013/0285913 A1 10/2013 Griffin et al.
2013/0289991 A1 10/2013 Eshwar et al.
2013/0289993 A1 10/2013 Rao et al.
2013/0289994 A1 10/2013 Newman et al.
2013/0291015 A1 10/2013 Pan
2013/0297317 A1 11/2013 Lee et al.
2013/0297319 A1 11/2013 Kim

(56) References Cited

U.S. PATENT DOCUMENTS

2013/0297348 A1 11/2013 Cardoza et al.
2013/0300645 A1 11/2013 Fedorov
2013/0300648 A1 11/2013 Kim et al.
2013/0303106 A1 11/2013 Martin
2013/0304479 A1 11/2013 Teller et al.
2013/0304758 A1 11/2013 Gruber et al.
2013/0304815 A1 11/2013 Puente et al.
2013/0305119 A1 11/2013 Kern et al.
2013/0307855 A1 11/2013 Lamb et al.
2013/0307997 A1 11/2013 O'Keefe et al.
2013/0308922 A1 11/2013 Sano et al.
2013/0311179 A1 11/2013 Wagner
2013/0311184 A1 11/2013 Badavne et al.
2013/0311487 A1 11/2013 Moore et al.
2013/0311997 A1 11/2013 Gruber et al.
2013/0315038 A1 11/2013 Ferren et al.
2013/0316679 A1 11/2013 Miller et al.
2013/0316746 A1 11/2013 Miller et al.
2013/0321267 A1 12/2013 Bhatti et al.
2013/0322634 A1 12/2013 Bennett et al.
2013/0325436 A1 12/2013 Wang et al.
2013/0325443 A1 12/2013 Begeja et al.
2013/0325447 A1 12/2013 Levien et al.
2013/0325448 A1 12/2013 Levien et al.
2013/0325481 A1 12/2013 Van Os et al.
2013/0325484 A1 12/2013 Chakladar et al.
2013/0325967 A1 12/2013 Parks et al.
2013/0325970 A1 12/2013 Roberts et al.
2013/0325979 A1 12/2013 Mansfield et al.
2013/0328809 A1 12/2013 Smith
2013/0329023 A1 12/2013 Suplee, III et al.
2013/0331127 A1 12/2013 Sabatelli et al.
2013/0332159 A1 12/2013 Federighi et al.
2013/0332162 A1 12/2013 Keen
2013/0332164 A1 12/2013 Naik
2013/0332168 A1 12/2013 Kim et al.
2013/0332172 A1 12/2013 Prakash et al.
2013/0332400 A1 12/2013 González
2013/0332538 A1 12/2013 Clark et al.
2013/0339256 A1 12/2013 Shroff
2013/0343721 A1 12/2013 Abecassis
2013/0346065 A1 12/2013 Davidson et al.
2013/0346068 A1 12/2013 Solem et al.
2013/0346347 A1 12/2013 Patterson et al.
2013/0347102 A1 12/2013 Shi
2013/0347117 A1 12/2013 Parks et al.
2014/0006012 A1 1/2014 Zhou et al.
2014/0006025 A1 1/2014 Krishnan et al.
2014/0006027 A1 1/2014 Kim et al.
2014/0006030 A1 1/2014 Fieizach et al.
2014/0006153 A1 1/2014 Thangam et al.
2014/0006483 A1 1/2014 Garmark et al.
2014/0006496 A1 1/2014 Dearman et al.
2014/0006562 A1 1/2014 Handa et al.
2014/0006947 A1 1/2014 Garmark et al.
2014/0006955 A1* 1/2014 Greenzeiger ............ G06F 3/14
715/733
2014/0012574 A1 1/2014 Pasupalak et al.
2014/0012580 A1 1/2014 Ganong et al.
2014/0012586 A1 1/2014 Rubin et al.
2014/0012587 A1 1/2014 Park
2014/0019116 A1 1/2014 Lundberg et al.
2014/0019133 A1 1/2014 Bao et al.
2014/0019460 A1 1/2014 Sambrani et al.
2014/0028735 A1 1/2014 Williams et al.
2014/0032453 A1 1/2014 Eustice et al.
2014/0033071 A1 1/2014 Gruber et al.
2014/0035823 A1 2/2014 Khoe et al.
2014/0039888 A1 2/2014 Taubman et al.
2014/0039893 A1 2/2014 Weiner
2014/0039894 A1 2/2014 Shostak
2014/0040274 A1 2/2014 Aravamudan et al.
2014/0040748 A1 2/2014 Lemay et al.
2014/0040801 A1 2/2014 Patel et al.
2014/0040918 A1 2/2014 Li et al.
2014/0040961 A1 2/2014 Green, Sr. et al.
2014/0046934 A1 2/2014 Zhou et al.
2014/0047001 A1 2/2014 Phillips et al.
2014/0052451 A1 2/2014 Cheong et al.
2014/0052680 A1 2/2014 Nitz et al.
2014/0052791 A1 2/2014 Chakra et al.
2014/0053082 A1 2/2014 Park et al.
2014/0053210 A1 2/2014 Cheong et al.
2014/0057610 A1 2/2014 Olincy et al.
2014/0059030 A1 2/2014 Hakkani-Tur et al.
2014/0067361 A1 3/2014 Nikoulina et al.
2014/0067371 A1 3/2014 Liensberger
2014/0067402 A1 3/2014 Kim
2014/0067738 A1 3/2014 Kingsbury
2014/0068751 A1 3/2014 Last et al.
2014/0074454 A1 3/2014 Brown et al.
2014/0074466 A1 3/2014 Sharifi et al.
2014/0074470 A1 3/2014 Jansche et al.
2014/0074472 A1 3/2014 Lin et al.
2014/0074483 A1 3/2014 Van Os
2014/0074815 A1 3/2014 Plimton
2014/0078065 A1 3/2014 Akkok et al.
2014/0079195 A1 3/2014 Srivastava et al.
2014/0080428 A1 3/2014 Rhoads et al.
2014/0081619 A1 3/2014 Solntseva et al.
2014/0081633 A1 3/2014 Badaskar et al.
2014/0081635 A1 3/2014 Yanagihara
2014/0081829 A1 3/2014 Milne
2014/0081941 A1 3/2014 Bai et al.
2014/0082501 A1 3/2014 Bae et al.
2014/0082715 A1 3/2014 Grajek et al.
2014/0086458 A1 3/2014 Rogers et al.
2014/0087711 A1 3/2014 Geyer et al.
2014/0088961 A1 3/2014 Woodward et al.
2014/0088964 A1 3/2014 Bellegarda
2014/0095171 A1 4/2014 Lynch et al.
2014/0095172 A1 4/2014 Cabaco et al.
2014/0095173 A1 4/2014 Lynch et al.
2014/0095601 A1 4/2014 Abuelsaad et al.
2014/0096209 A1 4/2014 Saraf et al.
2014/0098247 A1 4/2014 Rao et al.
2014/0100847 A1 4/2014 Ishii et al.
2014/0108017 A1 4/2014 Mason et al.
2014/0114554 A1 4/2014 Lagassey
2014/0115062 A1 4/2014 Liu et al.
2014/0115114 A1 4/2014 Garmark et al.
2014/0118155 A1 5/2014 Bowers
2014/0118624 A1 5/2014 Jang et al.
2014/0122059 A1 5/2014 Patel et al.
2014/0122085 A1 5/2014 Piety et al.
2014/0122086 A1 5/2014 Kapur et al.
2014/0122136 A1 5/2014 Jayanthi
2014/0122153 A1 5/2014 Truitt
2014/0132935 A1 5/2014 Kim et al.
2014/0134983 A1 5/2014 Jung et al.
2014/0135036 A1 5/2014 Bonanni et al.
2014/0136013 A1 5/2014 Wolverton et al.
2014/0136187 A1 5/2014 Wolverton et al.
2014/0136195 A1 5/2014 Abdossaiami et al.
2014/0136212 A1 5/2014 Kwon et al.
2014/0136946 A1 5/2014 Matas
2014/0136987 A1 5/2014 Rodriguez
2014/0142922 A1 5/2014 Liang et al.
2014/0142923 A1 5/2014 Jones et al.
2014/0142935 A1 5/2014 Lindahl et al.
2014/0142953 A1 5/2014 Kim et al.
2014/0143550 A1 5/2014 Ganong, III et al.
2014/0143721 A1 5/2014 Suzuki et al.
2014/0146200 A1 5/2014 Scott et al.
2014/0152577 A1 6/2014 Yuen et al.
2014/0153709 A1 6/2014 Byrd et al.
2014/0155031 A1 6/2014 Lee et al.
2014/0156262 A1 6/2014 Yuen et al.
2014/0156279 A1 6/2014 Okamoto et al.
2014/0157422 A1 6/2014 Livshits et al.
2014/0163951 A1 6/2014 Nikoulina et al.
2014/0163953 A1 6/2014 Parikh
2014/0163954 A1 6/2014 Joshi et al.
2014/0163962 A1 6/2014 Castelli et al.

(56) References Cited

U.S. PATENT DOCUMENTS

2014/0163976 A1 6/2014 Park et al.
2014/0163977 A1 6/2014 Hoffmeister et al.
2014/0163981 A1 6/2014 Cook et al.
2014/0163995 A1 6/2014 Burns et al.
2014/0164305 A1 6/2014 Lynch et al.
2014/0164312 A1 6/2014 Lynch et al.
2014/0164476 A1 6/2014 Thomson
2014/0164508 A1 6/2014 Lynch et al.
2014/0164532 A1* 6/2014 Lynch ................ H04L 12/1818 709/206
2014/0164533 A1* 6/2014 Lynch .................. H04L 51/046 709/206
2014/0164953 A1 6/2014 Lynch et al.
2014/0169795 A1 6/2014 Clough
2014/0172878 A1 6/2014 Clark et al.
2014/0173460 A1 6/2014 Kim
2014/0176814 A1 6/2014 Ahn
2014/0180499 A1 6/2014 Cooper et al.
2014/0180689 A1 6/2014 Kim et al.
2014/0180697 A1 6/2014 Torok et al.
2014/0181865 A1 6/2014 Koganei
2014/0188477 A1 7/2014 Zhang
2014/0195226 A1 7/2014 Yun et al.
2014/0195230 A1 7/2014 Han et al.
2014/0195233 A1 7/2014 Bapat
2014/0195244 A1 7/2014 Cha et al.
2014/0195251 A1 7/2014 Zeinstra et al.
2014/0195252 A1 7/2014 Gruber et al.
2014/0198048 A1 7/2014 Unruh et al.
2014/0203939 A1 7/2014 Harrington et al.
2014/0205076 A1 7/2014 Kumar et al.
2014/0207439 A1 7/2014 Venkatapathy et al.
2014/0207446 A1 7/2014 Klein et al.
2014/0207466 A1 7/2014 Smadi et al.
2014/0207468 A1 7/2014 Bartnik
2014/0207582 A1 7/2014 Flinn et al.
2014/0214429 A1 7/2014 Pantel
2014/0214537 A1 7/2014 Yoo et al.
2014/0215513 A1 7/2014 Ramer et al.
2014/0218372 A1 8/2014 Missig et al.
2014/0222436 A1 8/2014 Binder et al.
2014/0222678 A1 8/2014 Sheets et al.
2014/0222967 A1 8/2014 Harrang et al.
2014/0223377 A1 8/2014 Shaw et al.
2014/0223481 A1 8/2014 Fundament
2014/0226503 A1 8/2014 Cooper et al.
2014/0229184 A1 8/2014 Shires
2014/0230055 A1 8/2014 Boehl
2014/0232656 A1 8/2014 Pasquero et al.
2014/0236595 A1 8/2014 Gray
2014/0236986 A1 8/2014 Guzman
2014/0237042 A1 8/2014 Ahmed et al.
2014/0237366 A1 8/2014 Poulos et al.
2014/0244248 A1 8/2014 Arisoy et al.
2014/0244249 A1 8/2014 Mohamed et al.
2014/0244254 A1 8/2014 Ju et al.
2014/0244257 A1 8/2014 Colibro et al.
2014/0244258 A1 8/2014 Song et al.
2014/0244263 A1 8/2014 Pontual et al.
2014/0244266 A1 8/2014 Brown et al.
2014/0244268 A1 8/2014 Abdelsamie et al.
2014/0244271 A1 8/2014 Lindahl
2014/0244712 A1 8/2014 Walters et al.
2014/0245140 A1 8/2014 Brown et al.
2014/0247383 A1 9/2014 Dave et al.
2014/0247926 A1 9/2014 Gainsboro et al.
2014/0249812 A1 9/2014 Bou-ghazale et al.
2014/0249817 A1 9/2014 Hatt et al.
2014/0249820 A1 9/2014 Hsu et al.
2014/0249821 A1 9/2014 Kennewick et al.
2014/0250046 A1 9/2014 Winn et al.
2014/0257809 A1 9/2014 Goel et al.
2014/0257815 A1 9/2014 Zhao et al.
2014/0257902 A1 9/2014 Moore et al.
2014/0258857 A1 9/2014 Dykstra-Erickson et al.
2014/0267022 A1 9/2014 Kim
2014/0267599 A1 9/2014 Drouin et al.
2014/0272821 A1 9/2014 Pitschel et al.
2014/0273979 A1 9/2014 Van os et al.
2014/0274005 A1 9/2014 Luna et al.
2014/0274203 A1 9/2014 Ganong et al.
2014/0274211 A1 9/2014 Sejnoha et al.
2014/0278343 A1* 9/2014 Tran ........................ G06F 40/30 704/9
2014/0278349 A1 9/2014 Grieves et al.
2014/0278379 A1 9/2014 Coccaro et al.
2014/0278390 A1 9/2014 Kingsbury et al.
2014/0278391 A1 9/2014 Braho et al.
2014/0278394 A1 9/2014 Bastyr et al.
2014/0278406 A1 9/2014 Tsumura et al.
2014/0278413 A1 9/2014 Pitschel et al.
2014/0278429 A1 9/2014 Ganong, III
2014/0278435 A1 9/2014 Ganong et al.
2014/0278436 A1 9/2014 Khanna et al.
2014/0278438 A1 9/2014 Hart et al.
2014/0278443 A1 9/2014 Gunn et al.
2014/0278444 A1 9/2014 Larson et al.
2014/0278513 A1 9/2014 Prakash et al.
2014/0279622 A1 9/2014 Lamoureux et al.
2014/0279739 A1 9/2014 Elkington et al.
2014/0280107 A1 9/2014 Heymans et al.
2014/0280138 A1 9/2014 Li et al.
2014/0280292 A1 9/2014 Skinder
2014/0280353 A1 9/2014 Delaney et al.
2014/0280450 A1 9/2014 Luna
2014/0281944 A1 9/2014 Winer
2014/0281983 A1 9/2014 Xian et al.
2014/0281997 A1 9/2014 Fleizach et al.
2014/0282003 A1 9/2014 Gruber et al.
2014/0282007 A1 9/2014 Fleizach
2014/0282045 A1 9/2014 Ayanam et al.
2014/0282201 A1 9/2014 Pasquero et al.
2014/0282203 A1 9/2014 Pasquero et al.
2014/0282586 A1 9/2014 Shear et al.
2014/0282743 A1 9/2014 Howard et al.
2014/0288990 A1 9/2014 Moore et al.
2014/0289508 A1 9/2014 Wang
2014/0297267 A1 10/2014 Spencer et al.
2014/0297281 A1 10/2014 Togawa et al.
2014/0297284 A1* 10/2014 Gruber .................. G10L 15/183 704/257
2014/0297288 A1 10/2014 Yu et al.
2014/0304605 A1 10/2014 Ohmura et al.
2014/0309990 A1 10/2014 Gandrabur et al.
2014/0309996 A1 10/2014 Zhang
2014/0310001 A1 10/2014 Kains et al.
2014/0310002 A1 10/2014 Nitz et al.
2014/0310348 A1 10/2014 Keskitalo et al.
2014/0313007 A1 10/2014 Harding
2014/0315492 A1 10/2014 Woods
2014/0316585 A1 10/2014 Boesveld et al.
2014/0317030 A1 10/2014 Shen et al.
2014/0317502 A1 10/2014 Brown et al.
2014/0324884 A1 10/2014 Lindahl et al.
2014/0330569 A1 11/2014 Kolavennu et al.
2014/0330951 A1 11/2014 Sukoff et al.
2014/0337037 A1 11/2014 Chi
2014/0337048 A1 11/2014 Brown et al.
2014/0337266 A1 11/2014 Wolverton et al.
2014/0337371 A1 11/2014 Li
2014/0337438 A1 11/2014 Govande et al.
2014/0337751 A1 11/2014 Lim et al.
2014/0337814 A1 11/2014 Kalns et al.
2014/0342762 A1 11/2014 Hajdu et al.
2014/0343943 A1 11/2014 Al-telmissani
2014/0343946 A1 11/2014 Torok et al.
2014/0344627 A1 11/2014 Schaub et al.
2014/0344687 A1 11/2014 Durham et al.
2014/0350924 A1 11/2014 Zurek et al.
2014/0350933 A1 11/2014 Bak et al.
2014/0351741 A1 11/2014 Medlock et al.
2014/0351760 A1 11/2014 Skory et al.
2014/0358519 A1 12/2014 Mirkin et al.
2014/0358523 A1 12/2014 Sheth et al.

(56) References Cited

U.S. PATENT DOCUMENTS

2014/0358549 A1 12/2014 O'Connor et al.
2014/0359709 A1 12/2014 Nassar et al.
2014/0361973 A1 12/2014 Raux et al.
2014/0363074 A1 12/2014 Dolfing et al.
2014/0364149 A1 12/2014 Marti et al.
2014/0365209 A1 12/2014 Evermann
2014/0365214 A1 12/2014 Bayley
2014/0365216 A1 12/2014 Gruber et al.
2014/0365226 A1 12/2014 Sinha
2014/0365227 A1 12/2014 Cash et al.
2014/0365407 A1 12/2014 Brown et al.
2014/0365880 A1 12/2014 Bellegarda
2014/0365885 A1 12/2014 Carson et al.
2014/0365895 A1 12/2014 Paulson et al.
2014/0365922 A1 12/2014 Yang
2014/0365945 A1 12/2014 Karunamuni et al.
2014/0370817 A1 12/2014 Luna
2014/0370841 A1 12/2014 Roberts et al.
2014/0372112 A1 12/2014 Xue et al.
2014/0372356 A1 12/2014 Bilal et al.
2014/0372931 A1 12/2014 Zhai et al.
2014/0379334 A1 12/2014 Fry
2014/0379341 A1 12/2014 Seo et al.
2014/0379798 A1 12/2014 Bunner et al.
2014/0380285 A1 12/2014 Gabel et al.
2015/0003797 A1 1/2015 Schmidt
2015/0006148 A1 1/2015 Goldszmit et al.
2015/0006157 A1 1/2015 Andrade Silva et al.
2015/0006167 A1 1/2015 Kato et al.
2015/0006176 A1 1/2015 Pogue et al.
2015/0006178 A1 1/2015 Peng et al.
2015/0006184 A1 1/2015 Marti et al.
2015/0006199 A1 1/2015 Snider et al.
2015/0012271 A1 1/2015 Peng et al.
2015/0019219 A1 1/2015 Tzirkel-hancock et al.
2015/0019221 A1 1/2015 Lee et al.
2015/0019974 A1 1/2015 Doi et al.
2015/0031416 A1 1/2015 Wells et al.
2015/0032443 A1 1/2015 Karov et al.
2015/0033219 A1 1/2015 Breiner et al.
2015/0033275 A1 1/2015 Natani et al.
2015/0039292 A1 2/2015 Suleman et al.
2015/0039295 A1 2/2015 Soschen
2015/0039299 A1 2/2015 Weinstein et al.
2015/0039305 A1 2/2015 Huang
2015/0039606 A1 2/2015 Salaka et al.
2015/0040012 A1 2/2015 Faaborg et al.
2015/0045003 A1 2/2015 Vora et al.
2015/0045007 A1 2/2015 Cash
2015/0045068 A1 2/2015 Soffer et al.
2015/0046537 A1 2/2015 Rakib
2015/0046828 A1 2/2015 Desai et al.
2015/0050633 A1 2/2015 Christmas et al.
2015/0051754 A1 2/2015 Kwon et al.
2015/0053779 A1 2/2015 Adamek et al.
2015/0053781 A1 2/2015 Nelson et al.
2015/0058013 A1 2/2015 Pakhomov et al.
2015/0058018 A1 2/2015 Georges et al.
2015/0058785 A1 2/2015 Ookawara
2015/0065200 A1 3/2015 Namgung et al.
2015/0066494 A1 3/2015 Salvador et al.
2015/0066496 A1 3/2015 Deoras et al.
2015/0066506 A1 3/2015 Romano et al.
2015/0066516 A1 3/2015 Nishikawa et al.
2015/0066817 A1* 3/2015 Slayton .................... G06N 5/04 706/11
2015/0067485 A1 3/2015 Kim et al.
2015/0067822 A1 3/2015 Randall
2015/0071121 A1 3/2015 Patil et al.
2015/0073788 A1 3/2015 Allauzen et al.
2015/0073804 A1 3/2015 Senior et al.
2015/0074524 A1 3/2015 Nicholson et al.
2015/0074615 A1 3/2015 Han et al.
2015/0082229 A1 3/2015 Ouyang et al.
2015/0088511 A1 3/2015 Bharadwaj et al.
2015/0088514 A1* 3/2015 Typrin .................... G10L 15/22 704/231
2015/0088518 A1 3/2015 Kim et al.
2015/0088522 A1 3/2015 Hendrickson et al.
2015/0088523 A1 3/2015 Schuster
2015/0094834 A1 4/2015 Vega et al.
2015/0095031 A1 4/2015 Conkie et al.
2015/0095268 A1* 4/2015 Greenzeiger .... G06Q 10/06311 706/11
2015/0095278 A1 4/2015 Flinn et al.
2015/0100144 A1 4/2015 Lee et al.
2015/0100313 A1 4/2015 Sharma
2015/0100316 A1 4/2015 Williams et al.
2015/0100537 A1 4/2015 Grieves et al.
2015/0100983 A1 4/2015 Pan
2015/0106093 A1 4/2015 Weeks et al.
2015/0113407 A1 4/2015 Hoffert et al.
2015/0120296 A1 4/2015 Stern et al.
2015/0120723 A1 4/2015 Deshmukh et al.
2015/0121216 A1 4/2015 Brown et al.
2015/0123898 A1 5/2015 Kim et al.
2015/0127337 A1 5/2015 Heigold et al.
2015/0127348 A1 5/2015 Follis
2015/0127350 A1 5/2015 Agiomyrgiannakis
2015/0133049 A1 5/2015 Lee et al.
2015/0133109 A1 5/2015 Freeman et al.
2015/0134318 A1 5/2015 Cuthbert et al.
2015/0134322 A1 5/2015 Cuthbert et al.
2015/0134334 A1 5/2015 Sachidanandam et al.
2015/0135085 A1 5/2015 Shoham et al.
2015/0135123 A1 5/2015 Carr et al.
2015/0142420 A1 5/2015 Sarikaya et al.
2015/0142438 A1 5/2015 Dai et al.
2015/0142447 A1 5/2015 Kennewick et al.
2015/0142851 A1 5/2015 Gupta et al.
2015/0143419 A1 5/2015 Bhagwat et al.
2015/0148013 A1 5/2015 Baldwin et al.
2015/0149177 A1 5/2015 Kains et al.
2015/0149182 A1 5/2015 Kains et al.
2015/0149354 A1 5/2015 Mccoy
2015/0149469 A1 5/2015 Xu et al.
2015/0149899 A1 5/2015 Bernstein et al.
2015/0149964 A1 5/2015 Bernstein et al.
2015/0154185 A1 6/2015 Waibel
2015/0154976 A1 6/2015 Mutagi
2015/0160855 A1 6/2015 Bi
2015/0161370 A1 6/2015 North et al.
2015/0161521 A1 6/2015 Shah et al.
2015/0161989 A1 6/2015 Hsu et al.
2015/0162001 A1 6/2015 Kar et al.
2015/0162006 A1 6/2015 Kummer
2015/0163558 A1 6/2015 Wheatley
2015/0169081 A1 6/2015 Neels et al.
2015/0169284 A1 6/2015 Quast et al.
2015/0169336 A1 6/2015 Harper et al.
2015/0169696 A1 6/2015 Krishnappa et al.
2015/0170664 A1 6/2015 Doherty et al.
2015/0172262 A1 6/2015 Ortiz, Jr. et al.
2015/0172463 A1 6/2015 Quast et al.
2015/0178388 A1 6/2015 Winnemoeller et al.
2015/0179176 A1 6/2015 Ryu et al.
2015/0185964 A1 7/2015 Stout
2015/0185996 A1 7/2015 Brown et al.
2015/0186012 A1 7/2015 Coleman et al.
2015/0186110 A1 7/2015 Kannan
2015/0186154 A1 7/2015 Brown et al.
2015/0186155 A1 7/2015 Brown et al.
2015/0186156 A1 7/2015 Brown et al.
2015/0186351 A1 7/2015 Hicks et al.
2015/0186783 A1 7/2015 Byrne et al.
2015/0187355 A1 7/2015 Parkinson et al.
2015/0187369 A1 7/2015 Dadu et al.
2015/0189362 A1 7/2015 Lee et al.
2015/0193379 A1 7/2015 Mehta
2015/0193391 A1 7/2015 Khvostichenko et al.
2015/0193392 A1 7/2015 Greenblatt
2015/0194152 A1 7/2015 Katuri et al.
2015/0194165 A1 7/2015 Faaborg et al.
2015/0195379 A1 7/2015 Zhang et al.

(56) References Cited

U.S. PATENT DOCUMENTS

2015/0195606 A1 7/2015 McDevitt
2015/0199077 A1 7/2015 Zuger et al.
2015/0199960 A1 7/2015 Huo et al.
2015/0199965 A1 7/2015 Leak et al.
2015/0199967 A1 7/2015 Reddy et al.
2015/0201064 A1 7/2015 Bells et al.
2015/0201077 A1 7/2015 Konig et al.
2015/0205858 A1 7/2015 Xie et al.
2015/0208226 A1 7/2015 Kuusilinna et al.
2015/0212791 A1 7/2015 Kumar et al.
2015/0213796 A1 7/2015 Waltermann et al.
2015/0215258 A1 7/2015 Nowakowski et al.
2015/0220507 A1 8/2015 Mohajer et al.
2015/0221304 A1 8/2015 Stewart
2015/0221307 A1 8/2015 Shah et al.
2015/0227505 A1 8/2015 Morimoto
2015/0227633 A1 8/2015 Shapira
2015/0228274 A1 8/2015 Leppnen et al.
2015/0228275 A1 8/2015 Watanabe et al.
2015/0228281 A1 8/2015 Raniere
2015/0230095 A1 8/2015 Smith et al.
2015/0234636 A1 8/2015 Barnes, Jr.
2015/0234800 A1 8/2015 Patrick et al.
2015/0242091 A1 8/2015 Lu et al.
2015/0243278 A1 8/2015 Kibre et al.
2015/0243283 A1 8/2015 Halash et al.
2015/0244665 A1 8/2015 Choi et al.
2015/0245154 A1 8/2015 Dadu et al.
2015/0248651 A1 9/2015 Akutagawa et al.
2015/0248886 A1 9/2015 Sarikaya et al.
2015/0253146 A1 9/2015 Annapureddy et al.
2015/0254057 A1 9/2015 Klein et al.
2015/0254058 A1 9/2015 Klein et al.
2015/0254333 A1 9/2015 Fife et al.
2015/0255071 A1 9/2015 Chiba
2015/0256873 A1 9/2015 Klein et al.
2015/0261298 A1 9/2015 Li
2015/0261496 A1 9/2015 Faaborg et al.
2015/0261850 A1 9/2015 Mittal
2015/0269139 A1 9/2015 McAteer et al.
2015/0269677 A1 9/2015 Milne
2015/0269943 A1 9/2015 VanBlon et al.
2015/0277574 A1 10/2015 Jain et al.
2015/0278348 A1 10/2015 Paruchuri et al.
2015/0278370 A1 10/2015 Stratvert et al.
2015/0278737 A1 10/2015 Chen Huebscher et al.
2015/0279358 A1 10/2015 Kingsbury et al.
2015/0279360 A1 10/2015 Mengibar et al.
2015/0279366 A1 10/2015 Krestnikov et al.
2015/0281380 A1 10/2015 Wang et al.
2015/0281401 A1 10/2015 Le et al.
2015/0286627 A1 10/2015 Chang et al.
2015/0286716 A1 10/2015 Snibbe et al.
2015/0287401 A1 10/2015 Lee et al.
2015/0287409 A1 10/2015 Jang
2015/0288629 A1 10/2015 Choi et al.
2015/0294086 A1 10/2015 Kare et al.
2015/0294377 A1 10/2015 Chow
2015/0294516 A1 10/2015 Chiang
2015/0295915 A1 10/2015 Xiu
2015/0302855 A1 10/2015 Kim et al.
2015/0302856 A1 10/2015 Kim et al.
2015/0302857 A1 10/2015 Yamada
2015/0309997 A1 10/2015 Lee et al.
2015/0310114 A1 10/2015 Ryger et al.
2015/0310858 A1 10/2015 Li et al.
2015/0310862 A1 10/2015 Dauphin et al.
2015/0310879 A1 10/2015 Buchanan et al.
2015/0312182 A1 10/2015 Langholz
2015/0314454 A1 11/2015 Breazeal et al.
2015/0317069 A1 11/2015 Clements et al.
2015/0317310 A1 11/2015 Eiche et al.
2015/0324041 A1 11/2015 Varley et al.
2015/0324334 A1 11/2015 Lee et al.
2015/0331664 A1 11/2015 Osawa et al.
2015/0331711 A1 11/2015 Huang et al.
2015/0332667 A1 11/2015 Mason
2015/0334346 A1 11/2015 Cheatham, III et al.
2015/0339049 A1 11/2015 Kasemset et al.
2015/0339391 A1 11/2015 Kang et al.
2015/0340033 A1 11/2015 Di Fabbrizio et al.
2015/0340040 A1 11/2015 Mun et al.
2015/0340042 A1 11/2015 Sejnoha et al.
2015/0341717 A1 11/2015 Song et al.
2015/0347086 A1 12/2015 Liedholm et al.
2015/0347381 A1 12/2015 Bellegarda
2015/0347382 A1 12/2015 Dolfing et al.
2015/0347383 A1 12/2015 Willmore et al.
2015/0347385 A1 12/2015 Flor et al.
2015/0347393 A1 12/2015 Futrell et al.
2015/0347552 A1 12/2015 Habouzit et al.
2015/0347733 A1 12/2015 Tsou et al.
2015/0347985 A1 12/2015 Gross et al.
2015/0348533 A1 12/2015 Saddler et al.
2015/0348547 A1 12/2015 Paulik et al.
2015/0348548 A1 12/2015 Piernot et al.
2015/0348549 A1 12/2015 Giuli et al.
2015/0348551 A1 12/2015 Gruber et al.
2015/0348554 A1 12/2015 Orr et al.
2015/0348555 A1 12/2015 Sugita
2015/0348565 A1 12/2015 Rhoten et al.
2015/0349934 A1 12/2015 Pollack et al.
2015/0350031 A1 12/2015 Burks et al.
2015/0350342 A1 12/2015 Thorpe et al.
2015/0350594 A1 12/2015 Mate et al.
2015/0352999 A1 12/2015 Bando et al.
2015/0355879 A1 12/2015 Beckhardt et al.
2015/0356410 A1 12/2015 Faith et al.
2015/0363587 A1 12/2015 Ahn et al.
2015/0364128 A1 12/2015 Zhao et al.
2015/0364140 A1 12/2015 Thorn
2015/0370531 A1 12/2015 Faaborg
2015/0370780 A1 12/2015 Wang et al.
2015/0370787 A1 12/2015 Akbacak et al.
2015/0371215 A1 12/2015 Zhou et al.
2015/0371529 A1 12/2015 Doiecki
2015/0371639 A1 12/2015 Foerster et al.
2015/0371663 A1 12/2015 Gustafson et al.
2015/0371665 A1 12/2015 Naik et al.
2015/0373183 A1 12/2015 Woolsey et al.
2015/0379414 A1 12/2015 Yeh et al.
2015/0379993 A1 12/2015 Subhojit et al.
2015/0382047 A1 12/2015 Napolitano et al.
2015/0382079 A1 12/2015 Lister et al.
2015/0382147 A1 12/2015 Clark et al.
2016/0004690 A1 1/2016 Bangalore et al.
2016/0005320 A1 1/2016 deCharms et al.
2016/0012038 A1 1/2016 Edwards et al.
2016/0014476 A1 1/2016 Caliendo, Jr. et al.
2016/0018872 A1 1/2016 Tu et al.
2016/0018900 A1 1/2016 Tu et al.
2016/0018959 A1 1/2016 Yamashita et al.
2016/0019886 A1 1/2016 Hong
2016/0026258 A1 1/2016 Ou et al.
2016/0027431 A1 1/2016 Kurzweil et al.
2016/0028666 A1 1/2016 Li
2016/0029316 A1 1/2016 Mohan et al.
2016/0034042 A1 2/2016 Joo
2016/0034811 A1 2/2016 Paulik et al.
2016/0036953 A1 2/2016 Lee et al.
2016/0042735 A1 2/2016 Vibbert et al.
2016/0042748 A1 2/2016 Jain et al.
2016/0048666 A1 2/2016 Dey et al.
2016/0055422 A1 2/2016 Li
2016/0062605 A1 3/2016 Agarwal et al.
2016/0063998 A1 3/2016 Krishnamoorthy et al.
2016/0070581 A1 3/2016 Soon-Shiong
2016/0071516 A1 3/2016 Lee et al.
2016/0071517 A1 3/2016 Beaver et al.
2016/0071521 A1 3/2016 Haughay
2016/0072940 A1 3/2016 Cronin
2016/0077794 A1 3/2016 Kim et al.
2016/0078860 A1 3/2016 Paulik et al.
2016/0080165 A1 3/2016 Ehsani et al.

(56) References Cited

U.S. PATENT DOCUMENTS

2016/0086116 A1 3/2016 Rao et al.
2016/0086599 A1 3/2016 Kurata et al.
2016/0091967 A1 3/2016 Prokofieva et al.
2016/0092434 A1 3/2016 Bellegarda
2016/0092447 A1 3/2016 Venkataraman et al.
2016/0092766 A1 3/2016 Sainath et al.
2016/0093291 A1 3/2016 Kim
2016/0093298 A1 3/2016 Naik et al.
2016/0093301 A1 3/2016 Bellegarda et al.
2016/0093304 A1 3/2016 Kim et al.
2016/0094700 A1 3/2016 Lee et al.
2016/0094979 A1 3/2016 Naik et al.
2016/0098991 A1 4/2016 Luo et al.
2016/0104480 A1 4/2016 Sharifi
2016/0104486 A1 4/2016 Penilia et al.
2016/0111091 A1 4/2016 Bakish
2016/0117386 A1 4/2016 Ajmera et al.
2016/0118048 A1 4/2016 Heide
2016/0119338 A1 4/2016 Cheyer
2016/0125048 A1 5/2016 Hamada
2016/0125071 A1 5/2016 Gabbai
2016/0132046 A1 5/2016 Beoughter et al.
2016/0132484 A1 5/2016 Nauze et al.
2016/0132488 A1 5/2016 Clark et al.
2016/0133254 A1 5/2016 Vogel et al.
2016/0139662 A1 5/2016 Dabhade
2016/0140951 A1 5/2016 Agiomyrgiannakis et al.
2016/0140962 A1 5/2016 Sharifi
2016/0147725 A1 5/2016 Patten et al.
2016/0148610 A1 5/2016 Kennewick, Jr. et al.
2016/0150020 A1 5/2016 Farmer et al.
2016/0154880 A1 6/2016 Hearty
2016/0155442 A1 6/2016 Kannan et al.
2016/0155443 A1 6/2016 Khan et al.
2016/0162456 A1 6/2016 Munro et al.
2016/0163311 A1 6/2016 Crook et al.
2016/0163312 A1 6/2016 Naik et al.
2016/0170966 A1 6/2016 Kolo
2016/0173578 A1 6/2016 Sharma et al.
2016/0173617 A1 6/2016 Allinson
2016/0173960 A1 6/2016 Snibbe et al.
2016/0179462 A1 6/2016 Bjorkengren
2016/0179464 A1 6/2016 Reddy et al.
2016/0179787 A1 6/2016 Deleeuw
2016/0180840 A1 6/2016 Siddiq et al.
2016/0180844 A1 6/2016 Vanblon et al.
2016/0182410 A1 6/2016 Janakiraman et al.
2016/0182709 A1 6/2016 Kim et al.
2016/0188181 A1 6/2016 Smith
2016/0188738 A1 6/2016 Gruber et al.
2016/0189717 A1 6/2016 Kannan et al.
2016/0198319 A1 7/2016 Huang et al.
2016/0210551 A1 7/2016 Lee et al.
2016/0210981 A1 7/2016 Lee
2016/0212488 A1 7/2016 Os et al.
2016/0217784 A1 7/2016 Gelfenbeyn et al.
2016/0224540 A1 8/2016 Stewart et al.
2016/0224774 A1 8/2016 Pender
2016/0225372 A1 8/2016 Cheung et al.
2016/0239645 A1 8/2016 Heo et al.
2016/0240187 A1 8/2016 Fieizach et al.
2016/0240189 A1 8/2016 Lee et al.
2016/0247061 A1 8/2016 Trask et al.
2016/0253312 A1 9/2016 Rhodes
2016/0253528 A1 9/2016 Gao et al.
2016/0259623 A1 9/2016 Sumner et al.
2016/0259656 A1 9/2016 Sumner et al.
2016/0259779 A1 9/2016 Labsk et al.
2016/0260431 A1 9/2016 Newendorp et al.
2016/0260433 A1 9/2016 Sumner et al.
2016/0260434 A1 9/2016 Gelfenbeyn
2016/0260436 A1 9/2016 Lemay et al.
2016/0266871 A1 9/2016 Schmid et al.
2016/0267904 A1 9/2016 Biadsy et al.
2016/0275941 A1 9/2016 Bellegarda et al.
2016/0275947 A1 9/2016 Li et al.
2016/0282824 A1 9/2016 Smallwood et al.
2016/0282956 A1 9/2016 Ouyang et al.
2016/0284005 A1 9/2016 Daniel et al.
2016/0284199 A1 9/2016 Dotan-Cohen et al.
2016/0285808 A1 9/2016 Franklin et al.
2016/0286045 A1 9/2016 Shaltiel et al.
2016/0293168 A1 10/2016 Chen
2016/0299685 A1 10/2016 Zhai et al.
2016/0299882 A1 10/2016 Hegerty et al.
2016/0299883 A1 10/2016 Zhu et al.
2016/0299977 A1 10/2016 Hreha
2016/0301639 A1 10/2016 Liu et al.
2016/0307566 A1 10/2016 Bellegarda
2016/0313906 A1 10/2016 Kilchenko et al.
2016/0314788 A1 10/2016 Jitkoff et al.
2016/0314792 A1 10/2016 Alvarez et al.
2016/0315996 A1 10/2016 Ha et al.
2016/0317924 A1 11/2016 Tanaka et al.
2016/0321239 A1 11/2016 Iso-sipilä et al.
2016/0321261 A1 11/2016 Spasojevic et al.
2016/0321358 A1 11/2016 Kanani et al.
2016/0322043 A1 11/2016 Bellegarda
2016/0322045 A1 11/2016 Hatfeild et al.
2016/0322048 A1 11/2016 Amano et al.
2016/0322050 A1 11/2016 Wang et al.
2016/0328205 A1 11/2016 Agrawal et al.
2016/0328893 A1 11/2016 Cordova et al.
2016/0334973 A1 11/2016 Reckhow et al.
2016/0335532 A1* 11/2016 Sanghavi ................ G06F 40/30
2016/0336007 A1 11/2016 Hanazawa
2016/0336010 A1 11/2016 Lindahl
2016/0336024 A1 11/2016 Choi et al.
2016/0337299 A1 11/2016 Lane et al.
2016/0337301 A1 11/2016 Rollins et al.
2016/0342685 A1 11/2016 Basu et al.
2016/0342781 A1 11/2016 Jeon
2016/0351190 A1 12/2016 Binder et al.
2016/0352567 A1 12/2016 Robbins et al.
2016/0357304 A1 12/2016 Hatori et al.
2016/0357728 A1 12/2016 Bellegarda et al.
2016/0357790 A1 12/2016 Elkington et al.
2016/0357861 A1 12/2016 Carlhian et al.
2016/0357870 A1 12/2016 Hentschel et al.
2016/0358598 A1 12/2016 Williams et al.
2016/0358600 A1 12/2016 Nallasamy et al.
2016/0358619 A1 12/2016 Ramprashad
2016/0359771 A1 12/2016 Sridhar
2016/0360039 A1* 12/2016 Sanghavi ............ H04L 65/1069
2016/0360336 A1 12/2016 Gross et al.
2016/0360382 A1 12/2016 Gross et al.
2016/0364378 A1 12/2016 Futrell et al.
2016/0365101 A1 12/2016 Foy et al.
2016/0371250 A1 12/2016 Rhodes
2016/0372112 A1 12/2016 Miller et al.
2016/0378747 A1 12/2016 Orr et al.
2016/0379091 A1 12/2016 Lin et al.
2016/0379626 A1 12/2016 Deisher et al.
2016/0379632 A1 12/2016 Hoffmeister et al.
2016/0379633 A1 12/2016 Lehman et al.
2016/0379641 A1 12/2016 Liu et al.
2017/0003931 A1 1/2017 Dvortsov et al.
2017/0004824 A1 1/2017 Yoo et al.
2017/0011091 A1 1/2017 Chehreghani
2017/0011303 A1 1/2017 Annapureddy et al.
2017/0011742 A1 1/2017 Jing et al.
2017/0013124 A1 1/2017 Havelka et al.
2017/0018271 A1 1/2017 Khan et al.
2017/0019987 A1 1/2017 Dragone et al.
2017/0025124 A1 1/2017 Mixter et al.
2017/0026318 A1 1/2017 Daniel et al.
2017/0031576 A1 2/2017 Saoji et al.
2017/0032783 A1 2/2017 Lord et al.
2017/0032791 A1 2/2017 Elson et al.
2017/0039283 A1 2/2017 Bennett et al.
2017/0039475 A1 2/2017 Cheyer et al.
2017/0040002 A1 2/2017 Basson et al.
2017/0053652 A1 2/2017 Choi et al.
2017/0055895 A1 3/2017 Des Jardins et al.

(56) References Cited

U.S. PATENT DOCUMENTS

2017/0060853 A1 3/2017 Lee et al.
2017/0061423 A1 3/2017 Bryant et al.
2017/0068423 A1 3/2017 Napolitano et al.
2017/0068513 A1 3/2017 Stasior et al.
2017/0068550 A1 3/2017 Zeitlin
2017/0068670 A1 3/2017 Orr et al.
2017/0076720 A1 3/2017 Gopalan et al.
2017/0076721 A1 3/2017 Bargetzi et al.
2017/0078490 A1 3/2017 Kaminsky et al.
2017/0083179 A1 3/2017 Gruber et al.
2017/0083285 A1 3/2017 Meyers et al.
2017/0083504 A1 3/2017 Huang
2017/0084277 A1 3/2017 Sharifi
2017/0085547 A1 3/2017 De Aguiar et al.
2017/0090569 A1 3/2017 Levesque
2017/0091168 A1 3/2017 Bellegarda et al.
2017/0091169 A1 3/2017 Bellegarda et al.
2017/0091612 A1 3/2017 Gruber et al.
2017/0092259 A1 3/2017 Jeon
2017/0092270 A1 3/2017 Newendorp et al.
2017/0092278 A1 3/2017 Evermann et al.
2017/0102837 A1 4/2017 Toumpelis
2017/0102915 A1 4/2017 Kuscher et al.
2017/0103749 A1 4/2017 Zhao et al.
2017/0105190 A1 4/2017 Logan et al.
2017/0116177 A1 4/2017 Walia
2017/0116989 A1 4/2017 Yadgar et al.
2017/0124190 A1 5/2017 Wang et al.
2017/0125016 A1 5/2017 Wang
2017/0127124 A9 5/2017 Wilson et al.
2017/0131778 A1 5/2017 Iyer
2017/0132019 A1 5/2017 Karashchuk et al.
2017/0132199 A1 5/2017 Vescovi et al.
2017/0140644 A1 5/2017 Hwang et al.
2017/0147841 A1 5/2017 Stagg et al.
2017/0148044 A1 5/2017 Fukuda et al.
2017/0154033 A1 6/2017 Lee
2017/0154055 A1 6/2017 Dimson et al.
2017/0155940 A1 6/2017 Ji et al.
2017/0161018 A1 6/2017 Lemay et al.
2017/0161268 A1 6/2017 Badaskar
2017/0161293 A1 6/2017 Ionescu et al.
2017/0162203 A1 6/2017 Huang et al.
2017/0169818 A1 6/2017 VanBlon et al.
2017/0169819 A1 6/2017 Mese et al.
2017/0177547 A1 6/2017 Clereszko et al.
2017/0178619 A1 6/2017 Naik et al.
2017/0178620 A1 6/2017 Fleizach et al.
2017/0178626 A1 6/2017 Gruber et al.
2017/0180499 A1 6/2017 Gelfenbeyn et al.
2017/0185375 A1 6/2017 Martel et al.
2017/0185581 A1 6/2017 Bojja et al.
2017/0186429 A1 6/2017 Giuli et al.
2017/0187711 A1 6/2017 Joo et al.
2017/0193083 A1 7/2017 Bhatt et al.
2017/0195493 A1 7/2017 Kasilya Sudarsan et al.
2017/0199870 A1 7/2017 Zheng et al.
2017/0199874 A1 7/2017 Patel et al.
2017/0200066 A1 7/2017 Wang et al.
2017/0201609 A1 7/2017 Salmenkaita et al.
2017/0206899 A1 7/2017 Bryant et al.
2017/0215052 A1 7/2017 Koum et al.
2017/0221486 A1 8/2017 Kurata et al.
2017/0227935 A1 8/2017 Su et al.
2017/0228367 A1 8/2017 Pasupalak et al.
2017/0228382 A1 8/2017 Haviv et al.
2017/0230429 A1 8/2017 Garmark et al.
2017/0230709 A1 8/2017 Van Os et al.
2017/0235721 A1 8/2017 Almosallam et al.
2017/0236512 A1 8/2017 Williams et al.
2017/0236514 A1 8/2017 Nelson
2017/0242653 A1 8/2017 Lang et al.
2017/0242657 A1 8/2017 Jarvis et al.
2017/0243468 A1 8/2017 Dotan-Cohen et al.
2017/0243586 A1 8/2017 Civelli et al.
2017/0256256 A1 9/2017 Wang et al.
2017/0263247 A1 9/2017 Kang et al.
2017/0263248 A1 9/2017 Gruber et al.
2017/0263249 A1 9/2017 Akbacak et al.
2017/0264451 A1 9/2017 Yu et al.
2017/0264711 A1 9/2017 Natarajan et al.
2017/0278514 A1 9/2017 Mathias et al.
2017/0285915 A1 10/2017 Napolitano et al.
2017/0286397 A1 10/2017 Gonzalez
2017/0295446 A1 10/2017 Thagadur Shivappa
2017/0311005 A1 10/2017 Lin
2017/0316775 A1 11/2017 Le et al.
2017/0316782 A1 11/2017 Haughay et al.
2017/0323637 A1 11/2017 Naik
2017/0329490 A1 11/2017 Esinovskaya et al.
2017/0329572 A1 11/2017 Shah et al.
2017/0345411 A1 11/2017 Raitio et al.
2017/0345420 A1 11/2017 Barnett, Jr.
2017/0346949 A1* 11/2017 Sanghavi .............. H04L 51/046
2017/0352346 A1 12/2017 Paulik et al.
2017/0352350 A1 12/2017 Booker et al.
2017/0357478 A1 12/2017 Piersol et al.
2017/0357632 A1 12/2017 Pagallo et al.
2017/0357633 A1 12/2017 Wang et al.
2017/0357637 A1 12/2017 Nell et al.
2017/0357640 A1 12/2017 Bellegarda et al.
2017/0357716 A1 12/2017 Bellegarda et al.
2017/0358300 A1 12/2017 Laurens et al.
2017/0358301 A1 12/2017 Raitio et al.
2017/0358302 A1 12/2017 Orr et al.
2017/0358303 A1 12/2017 Walker, II et al.
2017/0358304 A1 12/2017 Castillo et al.
2017/0358305 A1 12/2017 Kudurshian et al.
2017/0365251 A1 12/2017 Park et al.
2017/0371509 A1 12/2017 Jung et al.
2017/0371885 A1 12/2017 Aggarwal et al.
2017/0374093 A1 12/2017 Dhar et al.
2018/0005112 A1 1/2018 Iso-sipila et al.
2018/0007060 A1 1/2018 Leblang et al.
2018/0007096 A1 1/2018 Levin et al.
2018/0007538 A1 1/2018 Naik et al.
2018/0012596 A1 1/2018 Piernot et al.
2018/0018248 A1 1/2018 Bhargava et al.
2018/0033431 A1 2/2018 Newendorp et al.
2018/0047406 A1 2/2018 Park
2018/0054505 A1 2/2018 Hart et al.
2018/0060032 A1 3/2018 Boesen
2018/0060312 A1 3/2018 Won
2018/0061400 A1 3/2018 Carbune et al.
2018/0061401 A1 3/2018 Sarikaya et al.
2018/0062691 A1 3/2018 Barnett, Jr.
2018/0063308 A1 3/2018 Crystal et al.
2018/0063324 A1 3/2018 Van Meter, II
2018/0063624 A1 3/2018 Boesen
2018/0067914 A1 3/2018 Chen et al.
2018/0067918 A1 3/2018 Bellegarda et al.
2018/0069743 A1 3/2018 Bakken et al.
2018/0075847 A1 3/2018 Lee et al.
2018/0088969 A1 3/2018 Vanblon et al.
2018/0089166 A1 3/2018 Meyer
2018/0090143 A1 3/2018 Saddler et al.
2018/0096683 A1 4/2018 James et al.
2018/0107917 A1 4/2018 Hewavitharana et al.
2018/0107945 A1 4/2018 Gao et al.
2018/0108346 A1 4/2018 Paulik et al.
2018/0122376 A1 5/2018 Kojima
2018/0122378 A1 5/2018 Mixter et al.
2018/0130470 A1 5/2018 Lemay et al.
2018/0130471 A1 5/2018 Trufinescu et al.
2018/0137856 A1 5/2018 Gilbert
2018/0137857 A1 5/2018 Zhou et al.
2018/0143967 A1 5/2018 Anbazhagan et al.
2018/0144615 A1 5/2018 Kinney et al.
2018/0144748 A1 5/2018 Leong
2018/0146089 A1 5/2018 Rauenbuehler et al.
2018/0150744 A1 5/2018 Orr et al.
2018/0157372 A1 6/2018 Kurabayashi
2018/0157992 A1 6/2018 Susskind et al.
2018/0174406 A1 6/2018 Arashi et al.

(56) References Cited

U.S. PATENT DOCUMENTS

2018/0174597 A1 6/2018 Lee et al.
2018/0182376 A1 6/2018 Van Gysel et al.
2018/0190273 A1 7/2018 Karimli et al.
2018/0196683 A1 7/2018 Radebaugh et al.
2018/0213448 A1 7/2018 Segal et al.
2018/0218735 A1 8/2018 Hunt et al.
2018/0232203 A1 8/2018 Gelfenbeyn et al.
2018/0247065 A1 8/2018 Rhee et al.
2018/0253209 A1 9/2018 Jaygarl et al.
2018/0253652 A1 9/2018 Palzer et al.
2018/0270343 A1 9/2018 Rout et al.
2018/0275839 A1 9/2018 Kocienda et al.
2018/0276197 A1 9/2018 Nell et al.
2018/0278740 A1 9/2018 Choi et al.
2018/0293984 A1 10/2018 Lindahl
2018/0293988 A1 10/2018 Huang et al.
2018/0308480 A1 10/2018 Jang et al.
2018/0308485 A1 10/2018 Kudurshian et al.
2018/0308486 A1 10/2018 Saddler et al.
2018/0314552 A1 11/2018 Kim et al.
2018/0322112 A1 11/2018 Bellegarda et al.
2018/0322881 A1 11/2018 Min et al.
2018/0329677 A1 11/2018 Gruber et al.
2018/0329957 A1 11/2018 Frazzingaro et al.
2018/0329982 A1 11/2018 Patel et al.
2018/0329998 A1 11/2018 Thomson et al.
2018/0330714 A1 11/2018 Paulik et al.
2018/0330721 A1 11/2018 Thomson et al.
2018/0330722 A1 11/2018 Newendorp et al.
2018/0330723 A1 11/2018 Acero et al.
2018/0330729 A1 11/2018 Golipour et al.
2018/0330730 A1 11/2018 Garg et al.
2018/0330731 A1 11/2018 Zeitlin et al.
2018/0330733 A1 11/2018 Orr et al.
2018/0330737 A1 11/2018 Paulik et al.
2018/0332118 A1 11/2018 Phipps et al.
2018/0336184 A1 11/2018 Bellegarda et al.
2018/0336197 A1 11/2018 Skilling et al.
2018/0336275 A1 11/2018 Graham et al.
2018/0336449 A1 11/2018 Adan et al.
2018/0336892 A1 11/2018 Kim et al.
2018/0336894 A1 11/2018 Graham et al.
2018/0336904 A1 11/2018 Piercy et al.
2018/0336905 A1 11/2018 Kim et al.
2018/0336920 A1 11/2018 Bastian et al.
2018/0343557 A1 11/2018 Naik et al.
2018/0349084 A1 12/2018 Nagasaka et al.
2018/0349346 A1 12/2018 Hatori et al.
2018/0349349 A1 12/2018 Bellegarda et al.
2018/0349447 A1 12/2018 Maccartney et al.
2018/0349472 A1 12/2018 Kohischuetter et al.
2018/0350345 A1 12/2018 Naik
2018/0350353 A1 12/2018 Gruber et al.
2018/0357308 A1 12/2018 Cheyer
2018/0358015 A1 12/2018 Cash et al.
2018/0358019 A1 12/2018 Mont-Reynaud
2018/0366105 A1 12/2018 Kim
2018/0373487 A1 12/2018 Gruber et al.
2018/0374484 A1 12/2018 Huang et al.
2019/0012141 A1 1/2019 Piersol et al.
2019/0012449 A1 1/2019 Cheyer
2019/0013018 A1 1/2019 Rekstad
2019/0013025 A1 1/2019 Alcorn et al.
2019/0014450 A1 1/2019 Gruber et al.
2019/0034040 A1 1/2019 Shah et al.
2019/0034826 A1 1/2019 Ahmad et al.
2019/0035405 A1 1/2019 Haughay
2019/0045040 A1 2/2019 Lee et al.
2019/0051309 A1 2/2019 Kim et al.
2019/0057697 A1 2/2019 Giuli et al.
2019/0065144 A1 2/2019 Sumner et al.
2019/0074009 A1 3/2019 Kim et al.
2019/0074015 A1 3/2019 Orr et al.
2019/0074016 A1 3/2019 Orr et al.
2019/0080685 A1 3/2019 Johnson, Jr.
2019/0080698 A1 3/2019 Miller
2019/0087412 A1 3/2019 Seyed Ibrahim et al.
2019/0095050 A1 3/2019 Gruber et al.
2019/0095171 A1 3/2019 Carson et al.
2019/0102378 A1 4/2019 Piernot et al.
2019/0102381 A1 4/2019 Futrell et al.
2019/0103112 A1 4/2019 Walker et al.
2019/0116264 A1 4/2019 Sanghavi et al.
2019/0122666 A1 4/2019 Raitio et al.
2019/0122692 A1 4/2019 Binder et al.
2019/0132694 A1 5/2019 Hanes et al.
2019/0147880 A1 5/2019 Booker et al.
2019/0156830 A1 5/2019 Deva et al.
2019/0164546 A1 5/2019 Piernot et al.
2019/0172467 A1 6/2019 Kim et al.
2019/0179607 A1 6/2019 Thangarathnam et al.
2019/0179890 A1 6/2019 Evermann
2019/0189118 A1 6/2019 Piernot et al.
2019/0189125 A1 6/2019 Van Os et al.
2019/0197053 A1 6/2019 Graham et al.
2019/0213999 A1 7/2019 Grupen et al.
2019/0214024 A1 7/2019 Gruber et al.
2019/0220245 A1 7/2019 Martel et al.
2019/0220246 A1 7/2019 Orr et al.
2019/0220247 A1 7/2019 Lemay et al.
2019/0236130 A1 8/2019 Li et al.
2019/0236459 A1 8/2019 Cheyer et al.
2019/0244618 A1 8/2019 Newendorp et al.
2019/0251960 A1 8/2019 Maker et al.
2019/0259386 A1 8/2019 Kudurshian et al.
2019/0272831 A1 9/2019 Kajarekar
2019/0278841 A1 9/2019 Pusateri et al.
2019/0295544 A1 9/2019 Garcia et al.
2019/0303442 A1 10/2019 Peitz et al.
2019/0310765 A1 10/2019 Napolitano et al.
2019/0318739 A1 10/2019 Garg et al.
2019/0339784 A1 11/2019 Lemay et al.
2019/0341027 A1 11/2019 Vescovi et al.
2019/0341056 A1 11/2019 Paulik et al.
2021/0249009 A1 8/2021 Manjunath et al.

FOREIGN PATENT DOCUMENTS

AU 2015101171 A4 10/2015
AU 2018100187 A4 3/2018
CA 2694314 A1 8/2010
CA 2792412 A1 7/2011
CA 2666438 C 6/2013
CN 101388012 A 3/2009
CN 101404665 A 4/2009
CN 101416471 A 4/2009
CN 101427244 A 5/2009
CN 101448340 A 6/2009
CN 101453498 A 6/2009
CN 101459722 A 6/2009
CN 101499156 A 8/2009
CN 101500041 A 8/2009
CN 101515952 A 8/2009
CN 101535983 A 9/2009
CN 101547396 A 9/2009
CN 101557432 A 10/2009
CN 101567167 A 10/2009
CN 101601088 A 12/2009
CN 101604521 A 12/2009
CN 101632316 A 1/2010
CN 101636736 A 1/2010
CN 101667424 A 3/2010
CN 101673544 A 3/2010
CN 101751387 A 6/2010
CN 101833286 A 9/2010
CN 101847405 A 9/2010
CN 101894547 A 11/2010
CN 101930789 A 12/2010
CN 101939740 A 1/2011
CN 101951553 A 1/2011
CN 101971250 A 2/2011
CN 102056026 A 5/2011
CN 102137085 A 7/2011
CN 102137193 A 7/2011

(56) References Cited

FOREIGN PATENT DOCUMENTS

| | | | |
|---|---|---|---|
| CN | 102160043 | A | 8/2011 |
| CN | 102201235 | A | 9/2011 |
| CN | 102214187 | A | 10/2011 |
| CN | 102237088 | A | 11/2011 |
| CN | 102246136 | A | 11/2011 |
| CN | 202035047 | U | 11/2011 |
| CN | 102282609 | A | 12/2011 |
| CN | 202092650 | U | 12/2011 |
| CN | 102340590 | A | 2/2012 |
| CN | 102368256 | A | 3/2012 |
| CN | 102405463 | A | 4/2012 |
| CN | 102498457 | A | 6/2012 |
| CN | 102510426 | A | 6/2012 |
| CN | 102629246 | A | 8/2012 |
| CN | 102651217 | A | 8/2012 |
| CN | 102682769 | A | 9/2012 |
| CN | 102682771 | A | 9/2012 |
| CN | 102685295 | A | 9/2012 |
| CN | 102693725 | A | 9/2012 |
| CN | 102694909 | A | 9/2012 |
| CN | 202453859 | U | 9/2012 |
| CN | 102722478 | A | 10/2012 |
| CN | 102750087 | A | 10/2012 |
| CN | 102792320 | A | 11/2012 |
| CN | 102801853 | A | 11/2012 |
| CN | 102870065 | A | 1/2013 |
| CN | 102882752 | A | 1/2013 |
| CN | 102917004 | A | 2/2013 |
| CN | 102917271 | A | 2/2013 |
| CN | 102918493 | A | 2/2013 |
| CN | 103035240 | A | 4/2013 |
| CN | 103035251 | A | 4/2013 |
| CN | 103038728 | A | 4/2013 |
| CN | 103093334 | A | 5/2013 |
| CN | 103135916 | A | 6/2013 |
| CN | 103198831 | A | 7/2013 |
| CN | 103209369 | A | 7/2013 |
| CN | 103226949 | A | 7/2013 |
| CN | 103236260 | A | 8/2013 |
| CN | 103292437 | A | 9/2013 |
| CN | 103365279 | A | 10/2013 |
| CN | 103390016 | A | 11/2013 |
| CN | 103455234 | A | 12/2013 |
| CN | 103562863 | A | 2/2014 |
| CN | 103744761 | A | 4/2014 |
| CN | 103760984 | A | 4/2014 |
| CN | 103792985 | A | 5/2014 |
| CN | 103795850 | A | 5/2014 |
| CN | 103841268 | A | 6/2014 |
| CN | 103930945 | A | 7/2014 |
| CN | 104038621 | A | 9/2014 |
| CN | 104090652 | A | 10/2014 |
| CN | 104113471 | A | 10/2014 |
| CN | 104144377 | A | 11/2014 |
| CN | 104281259 | A | 1/2015 |
| CN | 104284257 | A | 1/2015 |
| CN | 104335234 | A | 2/2015 |
| CN | 104423625 | A | 3/2015 |
| CN | 104427104 | A | 3/2015 |
| CN | 104463552 | A | 3/2015 |
| CN | 104516522 | A | 4/2015 |
| CN | 104854583 | A | 8/2015 |
| CN | 104951077 | A | 9/2015 |
| CN | 105100356 | A | 11/2015 |
| CN | 105190607 | A | 12/2015 |
| CN | 105247511 | A | 1/2016 |
| CN | 105264524 | A | 1/2016 |
| CN | 105471705 | A | 4/2016 |
| CN | 105556592 | A | 5/2016 |
| CN | 105830048 | A | 8/2016 |
| CN | 105869641 | A | 8/2016 |
| CN | 106030699 | A | 10/2016 |
| CN | 106062734 | A | 10/2016 |
| CN | 106415412 | A | 2/2017 |
| CN | 106462383 | A | 2/2017 |
| CN | 106534469 | A | 3/2017 |
| CN | 107919123 | A | 4/2018 |
| CN | 107978313 | A | 5/2018 |
| DE | 102008024258 | A1 | 11/2009 |
| DE | 202016008226 | U1 | 5/2017 |
| EP | 1909263 | B1 | 1/2009 |
| EP | 1335620 | B1 | 3/2009 |
| EP | 2069895 | A1 | 6/2009 |
| EP | 2081185 | A1 | 7/2009 |
| EP | 2094032 | A1 | 8/2009 |
| EP | 2096840 | A1 | 9/2009 |
| EP | 2107553 | A1 | 10/2009 |
| EP | 2109295 | A1 | 10/2009 |
| EP | 2168399 | A1 | 3/2010 |
| EP | 1720375 | B1 | 7/2010 |
| EP | 2205010 | A1 | 7/2010 |
| EP | 2309491 | A1 | 4/2011 |
| EP | 2329348 | | 6/2011 |
| EP | 2339576 | A2 | 6/2011 |
| EP | 2355093 | A2 | 8/2011 |
| EP | 2400373 | A1 | 12/2011 |
| EP | 2431842 | A2 | 3/2012 |
| EP | 2523188 | A1 | 11/2012 |
| EP | 2551784 | A1 | 1/2013 |
| EP | 2555536 | A1 | 2/2013 |
| EP | 2575128 | A2 | 4/2013 |
| EP | 2632129 | A1 | 8/2013 |
| EP | 2669889 | A2 | 12/2013 |
| EP | 2683175 | A1 | 1/2014 |
| EP | 2733598 | A2 | 5/2014 |
| EP | 2760015 | A1 | 7/2014 |
| EP | 2781883 | A2 | 9/2014 |
| EP | 2787683 | A1 | 10/2014 |
| EP | 2801890 | A1 | 11/2014 |
| EP | 2801972 | A1 | 11/2014 |
| EP | 2824564 | A1 | 1/2015 |
| EP | 2849177 | A1 | 3/2015 |
| EP | 2879402 | A1 | 6/2015 |
| EP | 2881939 | A1 | 6/2015 |
| EP | 2930715 | A1 | 10/2015 |
| EP | 2938022 | A1 | 10/2015 |
| EP | 2940556 | A1 | 11/2015 |
| EP | 2950307 | A1 | 12/2015 |
| EP | 2957986 | A1 | 12/2015 |
| EP | 2985984 | A2 | 2/2016 |
| EP | 3035329 | A1 | 6/2016 |
| EP | 3115905 | A1 | 1/2017 |
| EP | 3125097 | A2 | 2/2017 |
| EP | 3224708 | A1 | 10/2017 |
| EP | 3246916 | A1 | 11/2017 |
| EP | 3300074 | A1 | 3/2018 |
| EP | 2983065 | B1 | 8/2018 |
| JP | 2009-2850 | A | 1/2009 |
| JP | 2009-503623 | A | 1/2009 |
| JP | 2009-36999 | A | 2/2009 |
| JP | 2009-505142 | A | 2/2009 |
| JP | 2009-47920 | A | 3/2009 |
| JP | 2009-60512 | A | 3/2009 |
| JP | 2009-069062 | A | 4/2009 |
| JP | 2009-98490 | A | 5/2009 |
| JP | 2009-110300 | A | 5/2009 |
| JP | 2009-116841 | A | 5/2009 |
| JP | 2009-134409 | A | 6/2009 |
| JP | 2009-140444 | A | 6/2009 |
| JP | 2009-169470 | A | 7/2009 |
| JP | 2009-177440 | A | 8/2009 |
| JP | 2009-186989 | A | 8/2009 |
| JP | 2009-193448 | A | 8/2009 |
| JP | 2009-193457 | A | 8/2009 |
| JP | 2009-193532 | A | 8/2009 |
| JP | 2009-205367 | A | 9/2009 |
| JP | 2009-223840 | A | 10/2009 |
| JP | 2009-294913 | A | 12/2009 |
| JP | 2009-294946 | A | 12/2009 |
| JP | 2009-543166 | A | 12/2009 |
| JP | 2010-66519 | A | 3/2010 |
| JP | 2010-78979 | A | 4/2010 |
| JP | 2010-108378 | A | 5/2010 |
| JP | 2010-518475 | A | 5/2010 |

(56) References Cited

FOREIGN PATENT DOCUMENTS

| | | | |
|---|---|---|---|
| JP | 2010-518526 | A | 5/2010 |
| JP | 2010-146347 | A | 7/2010 |
| JP | 2010-157207 | A | 7/2010 |
| JP | 2010-166478 | A | 7/2010 |
| JP | 2010-205111 | A | 9/2010 |
| JP | 2010-224236 | A | 10/2010 |
| JP | 4563106 | B2 | 10/2010 |
| JP | 2010-535377 | A | 11/2010 |
| JP | 2010-287063 | A | 12/2010 |
| JP | 2011-33874 | A | 2/2011 |
| JP | 2011-41026 | A | 2/2011 |
| JP | 2011-45005 | A | 3/2011 |
| JP | 2011-59659 | A | 3/2011 |
| JP | 2011-81541 | A | 4/2011 |
| JP | 2011-525045 | A | 9/2011 |
| JP | 2011-238022 | A | 11/2011 |
| JP | 2011-250027 | A | 12/2011 |
| JP | 2012-014394 | A | 1/2012 |
| JP | 2012-502377 | A | 1/2012 |
| JP | 2012-33997 | A | 2/2012 |
| JP | 2012-508530 | A | 4/2012 |
| JP | 2012-089020 | A | 5/2012 |
| JP | 2012-116442 | A | 6/2012 |
| JP | 2012-142744 | A | 7/2012 |
| JP | 2012-147063 | A | 8/2012 |
| JP | 2012-518847 | A | 8/2012 |
| JP | 2013-37688 | A | 2/2013 |
| JP | 2013-511214 | A | 3/2013 |
| JP | 2013-65284 | A | 4/2013 |
| JP | 2013-73240 | A | 4/2013 |
| JP | 2013-513315 | A | 4/2013 |
| JP | 2013-80476 | A | 5/2013 |
| JP | 2013-517566 | A | 5/2013 |
| JP | 2013-134430 | A | 7/2013 |
| JP | 2013-140520 | A | 7/2013 |
| JP | 2013-527947 | A | 7/2013 |
| JP | 2013-528012 | A | 7/2013 |
| JP | 2013-156349 | A | 8/2013 |
| JP | 2013-200423 | A | 10/2013 |
| JP | 2013-205999 | A | 10/2013 |
| JP | 2013-238936 | A | 11/2013 |
| JP | 2013-258600 | A | 12/2013 |
| JP | 2014-2586 | A | 1/2014 |
| JP | 2014-10688 | A | 1/2014 |
| JP | 2014-026629 | A | 2/2014 |
| JP | 2014-60600 | A | 4/2014 |
| JP | 2014-72586 | A | 4/2014 |
| JP | 2014-077969 | A | 5/2014 |
| JP | 2014-89711 | A | 5/2014 |
| JP | 2014-109889 | A | 6/2014 |
| JP | 2014-124332 | A | 7/2014 |
| JP | 2014-126600 | A | 7/2014 |
| JP | 2014-140121 | A | 7/2014 |
| JP | 2014-142566 | A | 8/2014 |
| JP | 2014-145842 | A | 8/2014 |
| JP | 2014-146940 | A | 8/2014 |
| JP | 2014-150323 | A | 8/2014 |
| JP | 2014-219614 | A | 11/2014 |
| JP | 2014-222514 | A | 11/2014 |
| JP | 2015-8001 | A | 1/2015 |
| JP | 2015-18365 | A | 1/2015 |
| JP | 2015-501022 | A | 1/2015 |
| JP | 2015-41845 | A | 3/2015 |
| JP | 2015-60423 | A | 3/2015 |
| JP | 2015-81971 | A | 4/2015 |
| JP | 2015-94848 | A | 5/2015 |
| JP | 2015-514254 | A | 5/2015 |
| JP | 2015-519675 | A | 7/2015 |
| JP | 2015-524974 | A | 8/2015 |
| JP | 2015-526776 | A | 9/2015 |
| JP | 2015-527683 | A | 9/2015 |
| JP | 2015-528140 | A | 9/2015 |
| JP | 2015-528918 | A | 10/2015 |
| JP | 2016-508007 | A | 3/2016 |
| JP | 2016-71247 | A | 5/2016 |
| JP | 2016-119615 | A | 6/2016 |
| JP | 2016-151928 | A | 8/2016 |
| JP | 2016-524193 | A | 8/2016 |
| JP | 2017-19331 | A | 1/2017 |
| JP | 2018-525950 | A | 9/2018 |
| KR | 10-2009-0001716 | A | 1/2009 |
| KR | 10-2009-0028464 | A | 3/2009 |
| KR | 10-2009-0030117 | A | 3/2009 |
| KR | 10-2009-0086805 | A | 8/2009 |
| KR | 10-0920267 | B1 | 10/2009 |
| KR | 10-2009-0122944 | A | 12/2009 |
| KR | 10-2009-0127961 | A | 12/2009 |
| KR | 10-2009-0129192 | A | 12/2009 |
| KR | 10-2010-0015958 | A | 2/2010 |
| KR | 10-2010-0048571 | A | 5/2010 |
| KR | 10-2010-0053149 | A | 5/2010 |
| KR | 10-2010-0119519 | A | 11/2010 |
| KR | 10-2011-0043644 | A | 4/2011 |
| KR | 10-1032792 | B1 | 5/2011 |
| KR | 10-2011-0068490 | A | 6/2011 |
| KR | 10-2011-0072847 | A | 6/2011 |
| KR | 10-2011-0086492 | A | 7/2011 |
| KR | 10-2011-0100620 | A | 9/2011 |
| KR | 10-2011-0113414 | A | 10/2011 |
| KR | 10-2011-0115134 | A | 10/2011 |
| KR | 10-2012-0020164 | A | 3/2012 |
| KR | 10-2012-0031722 | A | 4/2012 |
| KR | 10-2012-0084472 | A | 7/2012 |
| KR | 10-1178310 | B1 | 8/2012 |
| KR | 10-2012-0120316 | A | 11/2012 |
| KR | 10-2012-0137424 | A | 12/2012 |
| KR | 10-2012-0137435 | A | 12/2012 |
| KR | 10-2012-0137440 | A | 12/2012 |
| KR | 10-2012-0138826 | A | 12/2012 |
| KR | 10-2012-0139827 | A | 12/2012 |
| KR | 10-1193668 | B1 | 12/2012 |
| KR | 10-2013-0035983 | A | 4/2013 |
| KR | 10-2013-0090947 | A | 8/2013 |
| KR | 10-2013-0108563 | A | 10/2013 |
| KR | 10-1334342 | B1 | 11/2013 |
| KR | 10-2013-0131252 | A | 12/2013 |
| KR | 10-2013-0133629 | A | 12/2013 |
| KR | 10-2014-0024271 | A | 2/2014 |
| KR | 10-2014-0031283 | A | 3/2014 |
| KR | 10-2014-0033574 | A | 3/2014 |
| KR | 10-2014-0055204 | A | 5/2014 |
| KR | 10-2014-0106715 | A | 9/2014 |
| KR | 10-2014-0147557 | A | 12/2014 |
| KR | 10-2015-0013631 | A | 2/2015 |
| KR | 10-1506510 | B1 | 3/2015 |
| KR | 10-2015-0038375 | A | 4/2015 |
| KR | 10-2015-0043512 | A | 4/2015 |
| KR | 10-2015-0095624 | A | 8/2015 |
| KR | 10-2016-0004351 | A | 1/2016 |
| KR | 10-2016-0010523 | A | 1/2016 |
| KR | 10-2016-0040279 | A | 4/2016 |
| KR | 10-2016-0065503 | A | 6/2016 |
| KR | 10-2016-0101198 | A | 8/2016 |
| KR | 10-2017-0036805 | A | 4/2017 |
| KR | 10-2017-0107058 | A | 9/2017 |
| RU | 2349970 | C2 | 3/2009 |
| RU | 2353068 | C2 | 4/2009 |
| RU | 2364917 | C2 | 8/2009 |
| TW | M348993 | U | 1/2009 |
| TW | 200943903 | A | 10/2009 |
| TW | 201018258 | A | 5/2010 |
| TW | 201027515 | A1 | 7/2010 |
| TW | 201028996 | A1 | 8/2010 |
| TW | 201110108 | A1 | 3/2011 |
| TW | 201142823 | A1 | 12/2011 |
| TW | 201227715 | A1 | 7/2012 |
| TW | 201245989 | A1 | 11/2012 |
| TW | 201312548 | A1 | 3/2013 |
| WO | 2009/009240 | A2 | 1/2009 |
| WO | 2009/016631 | A2 | 2/2009 |
| WO | 2009/017280 | A1 | 2/2009 |
| WO | 2009/034686 | A1 | 3/2009 |
| WO | 2009/075912 | A1 | 6/2009 |
| WO | 2009/104126 | A1 | 8/2009 |

(56) References Cited

FOREIGN PATENT DOCUMENTS

| | | | |
|---|---|---|---|
| WO | 2009/156438 | A1 | 12/2009 |
| WO | 2009/156978 | A1 | 12/2009 |
| WO | 2010/013369 | A1 | 2/2010 |
| WO | 2010/054373 | A2 | 5/2010 |
| WO | 2010/075623 | A1 | 7/2010 |
| WO | 2010/100937 | A1 | 9/2010 |
| WO | 2010/141802 | A1 | 12/2010 |
| WO | 2010/144651 | A2 | 12/2010 |
| WO | 2011/028842 | A2 | 3/2011 |
| WO | 2011/057346 | A1 | 5/2011 |
| WO | 2011/060106 | A1 | 5/2011 |
| WO | 2011/088053 | A2 | 7/2011 |
| WO | 2011/093025 | A1 | 8/2011 |
| WO | 2011/116309 | A1 | 9/2011 |
| WO | 2011/133543 | A1 | 10/2011 |
| WO | 2011/150730 | A1 | 12/2011 |
| WO | 2011/163350 | A1 | 12/2011 |
| WO | 2011/088053 | A3 | 1/2012 |
| WO | 2012/019020 | A1 | 2/2012 |
| WO | 2012/019637 | A1 | 2/2012 |
| WO | 2012/063260 | A2 | 5/2012 |
| WO | 2012/129231 | A1 | 9/2012 |
| WO | 2012/063260 | A3 | 10/2012 |
| WO | 2012/135157 | A2 | 10/2012 |
| WO | 2012/154317 | A1 | 11/2012 |
| WO | 2012/155079 | A2 | 11/2012 |
| WO | 2012/167168 | A2 | 12/2012 |
| WO | 2013/009578 | A2 | 1/2013 |
| WO | 2013/022135 | A1 | 2/2013 |
| WO | 2013/022223 | A2 | 2/2013 |
| WO | 2013/048880 | A1 | 4/2013 |
| WO | 2013/049358 | A1 | 4/2013 |
| WO | 2013/137660 | A1 | 9/2013 |
| WO | 2013/163113 | A1 | 10/2013 |
| WO | 2013/169842 | A2 | 11/2013 |
| WO | 2013/173504 | A1 | 11/2013 |
| WO | 2013/173511 | A2 | 11/2013 |
| WO | 2013/176847 | A1 | 11/2013 |
| WO | 2013/184953 | A1 | 12/2013 |
| WO | 2013/184990 | A1 | 12/2013 |
| WO | 2014/003138 | A1 | 1/2014 |
| WO | 2014/021967 | A1 | 2/2014 |
| WO | 2014/022148 | A1 | 2/2014 |
| WO | 2014/028797 | A1 | 2/2014 |
| WO | 2014/031505 | A1 | 2/2014 |
| WO | 2014/047047 | A1 | 3/2014 |
| WO | 2014/066352 | A1 | 5/2014 |
| WO | 2014/070872 | A2 | 5/2014 |
| WO | 2014/078965 | A1 | 5/2014 |
| WO | 2014/093339 | A1 | 6/2014 |
| WO | 2014/096506 | A1 | 6/2014 |
| WO | 2014/124332 | A2 | 8/2014 |
| WO | 2014/137074 | A1 | 9/2014 |
| WO | 2014/138604 | A1 | 9/2014 |
| WO | 2014/143959 | A2 | 9/2014 |
| WO | 2014/144579 | A1 | 9/2014 |
| WO | 2014/124332 | A3 | 10/2014 |
| WO | 2014/159581 | A1 | 10/2014 |
| WO | 2014/197336 | A1 | 12/2014 |
| WO | 2014/200728 | A1 | 12/2014 |
| WO | 2014/204659 | A2 | 12/2014 |
| WO | 2015/018440 | A1 | 2/2015 |
| WO | 2015/029379 | A1 | 3/2015 |
| WO | 2015/030796 | A1 | 3/2015 |
| WO | 2015/041892 | A1 | 3/2015 |
| WO | 2015/047932 | A1 | 4/2015 |
| WO | 2015/084659 | A1 | 6/2015 |
| WO | 2015/092943 | A1 | 6/2015 |
| WO | 2015/094169 | A1 | 6/2015 |
| WO | 2015/094369 | A1 | 6/2015 |
| WO | 2015/099939 | A1 | 7/2015 |
| WO | 2015/116151 | A1 | 8/2015 |
| WO | 2015/151133 | A1 | 10/2015 |
| WO | 2015/153310 | A1 | 10/2015 |
| WO | 2015/157013 | A1 | 10/2015 |
| WO | 2015/183401 | A1 | 12/2015 |
| WO | 2015/183699 | A1 | 12/2015 |
| WO | 2015/184186 | A1 | 12/2015 |
| WO | 2015/184387 | A1 | 12/2015 |
| WO | 2015/200207 | A1 | 12/2015 |
| WO | 2016/027933 | A1 | 2/2016 |
| WO | 2016/028946 | A1 | 2/2016 |
| WO | 2016/033257 | A1 | 3/2016 |
| WO | 2016/052164 | A1 | 4/2016 |
| WO | 2016/054230 | A1 | 4/2016 |
| WO | 2016/057268 | A1 | 4/2016 |
| WO | 2016/075081 | A1 | 5/2016 |
| WO | 2016/085775 | A2 | 6/2016 |
| WO | 2016/100139 | A1 | 6/2016 |
| WO | 2016/111881 | A1 | 7/2016 |
| WO | 2016/144840 | A1 | 9/2016 |
| WO | 2016/144982 | A1 | 9/2016 |
| WO | 2016/175354 | A1 | 11/2016 |
| WO | 2016/187149 | A1 | 11/2016 |
| WO | 2016/190950 | A1 | 12/2016 |
| WO | 2016/209444 | A1 | 12/2016 |
| WO | 2017/044260 | A1 | 3/2017 |
| WO | 2017/044629 | A1 | 3/2017 |
| WO | 2017/053311 | A1 | 3/2017 |
| WO | 2017/059388 | A1 | 4/2017 |
| WO | 2017/071420 | A1 | 5/2017 |
| WO | 2018/009397 | A1 | 1/2018 |
| WO | 2018/213415 | A1 | 11/2018 |
| WO | 2019/079017 | A1 | 4/2019 |

OTHER PUBLICATIONS

Office Action received for Chinese Patent Application No. 201680027821.1, dated Nov. 3, 2021, 13 pages (5 pages of English Translation and 8 pages of Official Copy).

"Alexa, Turn Up the Heat!", Smartthings Samsung [online], Available online at https://web.archive.org/web/20160329142041/https://blog.smartthings.com/news/smartthingsupdates/alexa-turn-up-the-heat/, Mar. 3, 2016, 3 pages.

"Ask Alexa—Things That are Smart Wiki", Available online at <URL:http://thingsthataresmart.wiki/index.php?title=Ask_Alexa&oldid=4283>, [retrieved from internet on Aug. 2, 2017], Jun. 8, 2016, pp. 1-31.

"DIRECTV™ Voice", Now Part of the DIRECTTV Mobile App for Phones, Sep. 18, 2013, 5 pages.

"Galaxy S7: How to Adjust Screen Timeout & Lock Screen Timeout", Available online at:—"https://www.youtube.com/watch?v=n6e1WKUS2ww", Jun. 9, 2016, 1 page.

"Hey Google: How to Create a Shopping List with Your Google Assistant", Available online at:—https://www.youtube.com/watch?v=w9NCsElax1Y, May 25, 2018, 1 page.

"How to Enable Google Assistant on Galaxy 57 and other Android Phones (No Root)", Available online at:—"https://www.youtube.com/watch?v=HeklQbWyksE", Mar. 20, 2017, 1 page.

"How to Use ok Google Assistant Even Phone is Locked", Available online at:—"https://www.youtube.com/watch?v=9B_gP4j_SP8", Mar. 12, 2018, 1 page.

"Skilled at Playing my iPhone 5", Beijing Hope Electronic Press, Jan. 2013, 6 pages (Official Copy Only) (See Communication under 37 CFR § 1.98(a) (3)).

"SmartThings +Amazon Echo", Smartthings Samsung [online], Available online at <https://web.archive.org/web/20160509231428/https://blog.smartthings.com/featured/alexa-turn-on-my-smartthings/>, Aug. 21, 2015, 3 pages.

"The world of Virtual Assistants—more SemTech . . . ", End of Business as Usual—Glenn's External blog, Online Available at <https://web.archive.org/web/20091101840940/http://glennas.wordpress.com/2009/10/17/the-world-of-virtual-assistants-more-semtech/>, Oct. 17, 2009, 5 pages.

Adium, "AboutAdium—Adium X—Trac", available at <http://web.archive.org/web/20070819113247/http://trac.adiumx.com/wiki/AboutAdium>, retrieved on Nov. 25, 2011, 2 pages.

Alfred App, "Alfred", available at <http://www.alfredapp.com/>, retrieved on Feb. 8, 2012, 5 pages.

(56) References Cited

OTHER PUBLICATIONS

Anania, Peter, "Amazon Echo with Home Automation (Smartthings)", Available online at https://www.youtube.com/watch?v=LMW6aXmsWNE, Dec. 20, 2015, 1 page.
Api.Ai, "Android App Review—Speaktoit Assistant", Available at <https://www.youtube.com/watch?v=myE498nyfGw>, Mar. 30, 2011, 3 pages.
Apple, "VoiceOver", available at <http://www.apple.com/accessibility/voiceover/>, May 19, 2014, 3 pages.
Asakura et al., "What LG thinks; How the TV should be in the Living Room", HiVi, vol. 31, No. 7 (Jul. 2013), Stereo Sound Publishing, Inc., Jun. 17, 2013, pp. 68-71 (Official Copy Only), (See Communication under 37 CFR § 1.98(a) (3)).
Ashbrook, Daniel L.., "Enabling Mobile Microinteractions", Retrieved from the Internet: URL: "http://danielashbrook.com/wp-content/uploads/2012/06/2009-Ashbrook-Thesis.pdf", May 2010, 186 pages.
Ashingtondctech & Gaming, "SwipeStatusBar—Reveal the Status Bar in a Fullscreen App", Online Available at: <https://www.youtube.com/watch?v=wA_tT9IAreQ>, Jul. 1, 2013, 3 pages.
Bellegarda, Jerome R., "Chapter 1: Spoken Language Understanding for Natural Interaction: The Siri Experience", Natural Interaction with Robots, Knowbots and Smartphones, 2014, pp. 3-14.
Bellegarda, Jerome, "Spoken Language Understanding for Natural Interaction: the Siri Experience", Slideshow retrieved from: <https://www.uni-ulm.de/fileadmin/website_uni__ulm/iui.iwsds2012/files/Bellegarda.pdf>, International Workshop on Spoken Dialog Systems (IWSDS) 2012, May 2012, pp. 1-43.
Beointegration.com, "BeoLink Gateway—Programming Example", Online Available at: <https://www.youtube.com/watch7v~TXDaJFm5UH4>, Mar. 4, 2015, 3 pages.
Berry et al., "PTIME: Personalized Assistance for Calendaring", ACM Transactions on Intelligent Systems and Technology, vol. 2, No. 4, Article 40, Jul. 2011, pp. 1-22.
Bertulucci, Jeff, "Google Adds Voice Search to Chrome Browser", PC World, Jun. 14, 2011, 5 pages.
Bocchieri et al., "Use of Geographical Meta-Data in ASR Language and Acoustic Models", IEEE International Conference on Acoustics Speech and Signal Processing, 2010, pp. 5118-5121.
Burgess, Brian, "Amazon Echo Tip: Enable the Wake Up Sound", Available online at:—https://www.groovypost.com/howto/amazon-echo-tip-enable-wake-up-sound/, Jun. 30, 2015, 4 pages.
Butcher, Mike, "Evi Arrives in Town to go Toe-to-Toe with Siri", TechCrunch, Jan. 23, 2012, 2 pages.
Cambria et al., "Jumping NLP Curves: A Review of Natural Language Processing Research", IEEE Computational Intelligence Magazine, 2014, vol. 9, May 2014, pp. 48-57.
Caraballo et al., "Language Identification Based on a Discriminative Text Categorization Technique", Iberspeech 2012—Vii Jornadas En Tecnologia Del Habla and Iii Iberians! Tech Workshop, Nov. 21, 2012, pp. 1-10.
Castleos, "Whole House Voice Control Demonstration", available online at https://www.youtube.com/watch?v=9SRCoxrZ_W4, Jun. 2, 2012, 26 pages.
Chang et al., "Monaural Multi-Talker Speech Recognition with Attention Mechanism and Gated Convolutional Networks", Interspeech 2018, Sep. 2-6, 2018, pp. 1586-1590.
Chen et al., "Progressive Joint Modeling in Unsupervised Single-Channel Overlapped Speech Recognition", IEEE/ACM Transactions on Audio, Speech, and Language Processing, vol. 26, No. 1, Jan. 2018, pp. 184-196.
Chen, Yi, "Multimedia Siri Finds and Plays Whatever You Ask for", PSFK Report, Feb. 9, 2012, 9 pages.
Cheyer, Adam, "About Adam Cheyer", available at <http://www.adam.cheyer.com/about.html>, retrieved on Sep. 17, 2012, 2 pages.
Choi et al., "Acoustic and Visual Signal based Context. Awareness System for Mobile Application", IEEE Transactions on Consumer Electronics, vol. 57, No. 2, May 2011, pp. 738-746.
Colt, Sam, "Here's One Way Apple's Smartwatch Could be Better Than Anything Else", Business Insider, Aug. 21, 2014, pp. 1-4.
Czech, Lucas, "A System for Recognizing Natural Spelling of English Words", Diploma Thesis, Karlsruhe Institute of Technology, May 7, 2014, 107 pages.
Deedeevuu, "Amazon Echo Alarm Feature", Available online at https://www.youtube.com/watch?v=fdjU8eRLk7c, Feb. 16, 2015, 1 page.
Delcroix et al., "Context Adaptive Deep Neural Networks for Fast Acoustic Model Adaptation", ICASSP, 2015, pp. 4535-4539.
Delcroix et al., "Context Adaptive Neural Network for Rapid Adaptation of Deep CNN Based Acoustic Models", Interspeech 2016, Sep. 8-12, 2016, pp. 1573-1577.
Earthling1984, "Samsung Galaxy Smart Stay Feature Explained", Available online at:—"https://www.youtube.com/watch?v=RpjBNtSjupl", May 29, 2013, 1 page.
Evi, "Meet Evi: The One Mobile Application that Provides Solutions for your Everyday Problems", Feb. 2012, 3 pages.
Exhibit 1, "Natural Language Interface Using Constrained Intermediate Dictionary of Results", List of Publications Manually Reviewed for the Search of U.S. Pat. No. 7,177,798, Mar. 22, 2013, 1 page.
Filipowicz, Luke, "How to use the Quick Type Keyboard in iOS 8", available online at <https://www.imore.com/comment/568232>, Oct. 11, 2014, pp. 1-17.
Findlater et al., "Beyond QWERTY: Augmenting Touch-Screen Keyboards with Multi-Touch Gestures for Non-Alphanumeric Input", CHI '12, Austin, Texas, USA, May 5-10, 2012, 4 pages.
Finkel et al., "Joint Parsing and Named Entity Recognition", Human Language Technologies: The 2009 Annual Conference of the North American Chapter of the ACL, Jun. 2009, pp. 326-334.
Gannes, Liz, "Alfred App Gives Personalized Restaurant Recommendations", AllThingsD, Jul. 18, 2011, pp. 1-3.
Gasic et al., "Effective Handling of Dialogue State in the Hidden Information State Pomdp-based Dialogue Manager", ACM Transactions on Speech and Language Processing, May 2011, pp. 1-25.
Gomez et al., "Mouth Gesture and Voice Command Based Robot Command Interface", IEEE International Conference on Robotics and Automation, May 12-17, 2009, pp. 333-338.
Google Developers, "Voice Search in Your App", Available online at:—https://www.youtube.com/watch?v=PS1FbB5qWEI, Nov. 12, 2014, 1 page.
Gruber, Thomas R., et al., U.S. Appl. No. 61/186,414, filed Jun. 12, 2009 titled "System and Method for Semantic Auto-Completion" 13 pages.
Gruber, Tom, "Big Think Small Screen: How Semantic Computing in the Cloud Will Revolutionize the Consumer Experience on the Phone", Keynote Presentation at Web 3.0 Conference, Jan. 2010, 41 pages.
Gruber, Tom, "Siri, A Virtual Personal Assistant-Bringing Intelligence to the Interface", Semantic Technologies Conference, Jun. 16, 2009, 21 pages.
Guay, Matthew, "Location-Driven Productivity with Task Ave", available at Khttp://iphone.appstorm.net/reviews/productivity/location-driven-productivity-with-task-ave/>, Feb. 19, 2011, 7 pages.
Guim, Mark, "Howto Set a Person-Based Reminder with Cortana", available at Khttp://www.wpcentral.com/how-to-person-based-reminder-cortana>, Apr. 26, 2014, 15 pages.
Gupta et al., "I-vector-based Speaker Adaptation of Deep Neural Networks for French Broadcast Audio Transcription", ICASSP, 2014, pp. 6334-6338.
Hardwar, Devindra, "Driving App Waze Builds its own Siri for Hands-Free Voice Control", Available online at <http://venturebeat.eom/2012/02/09/driving-app-waze-builds-its-own-siri-for-hands-free-voice-control/>, retrieved on Feb. 9, 2012, 4 pages.
Hashimoto, Yoshiyuki, "Simple Guide for iPhone Siri, Which Can Be Operated with Your Voice", Shuwa System Co., Ltd., vol. 1, Jul. 5, 2012, pp. 8, 130, 131.
Headset Button Controller 7.3 APK Full APP Download for Android, Blackberry, iPhone, Jan. 27, 2014, 11 pages.
Hear voice from Google translate, Available on URL:https://www.youtube.com/watch?v=18AvMhFqD28, Jan. 28, 2011, 1 page.
Hershey et al., "Deep Clustering: Discriminative Embeddings for Segmentation and Separation", Proc. ICASSP, Mar. 2016, 6 pages.

(56) References Cited

OTHER PUBLICATIONS

IClarified, "How to Use Voice Control on Your iPhone 3GS", Online Available at: <https://www.iclarified.com/4296/how-to-use-voice-control-on-your-iphone-3g-s>, Jun. 19, 2009, 16 pages.
id3.org, "id3v2.4.0—Frames", available at <http://id3.org/id3v2.4.0-frames?action=print>, retrieved on Jan. 22, 2015, 41 pages.
Ikeda, Masaru, "beGLOBAL Seoul 2015 Startup Battle: Talkey", YouTube Publisher, Online Available at: "https://www.youtube.com/watch?v=4Wkp7sAAldg", May 14, 2015, 1 page.
INews and Tech, "How to Use the QuickType Keyboard in iOS 8", Available online at:—"http://www.inewsandtech.com/how-to-use-the-quicktype-keyboard-in-ios-8/", Sep. 17, 2014, 6 pages.
Interactive Voice, available at <http://www.helloivee.com/company/>, retrieved on Feb. 10, 2014, 2 pages.
Internet Services and Social Net, "How to Search for Similar Websites", Retrieved from <https://www.youtube.com/watch?v=nL12uirpt5s>see from 0:17 to 1:06, Jul. 4, 2013, 1 page.
International Preliminary Report on Patentability received for PCT Patent Application No. PCT/US2016/032763, dated Nov. 30, 2017, 10 pages.
IOS 8 Release, "Quick Type Keyboard on iOS 8 Makes Typing Easier", Retrieved from the Internet: URL:https://www.youtube.com/watch?v=0CidLR4fhVU, [Retrieved on Nov. 23, 2018], XP054978896, Jun. 3, 2014, 1 page.
Iowegian International, "FIR Filter Properties, DSPGuru, Digital Signal Processing Central", available at <http://www.dspguru.com/dsp/faq/fir/properties> retrieved on Jul. 28, 2010, 6 pages.
Isik et al., "Single-Channel Multi-Speaker Separation using Deep Clustering", Interspeech 2016, Sep. 8-12, 2016, pp. 545-549.
Jawaid et al., "Machine Translation with Significant Word Reordering and Rich Target-Side Morphology", WDS'11 Proceedings of Contributed Papers, Part I, 2011, pp. 161-166.
Jiang et al., "A Syllable-based Name Transliteration System", Proc. of the 2009 Named Entities Workshop, Aug. 7, 2009, pp. 96-99.
Jonsson et al., "Proximity-based Reminders Using Bluetooth", 2014 IEEE International Conference on Pervasive Computing and Communications Demonstrations, 2014, pp. 151-153.
Jouvet et al., "Evaluating Grapheme-to-phoneme Converters in Automatic Speech Recognition Context", IEEE, 2012, pp. 4821-4824.
Karn, Ujjwal, "An intuitive Explanation of Convolutional Neural Networks", The Data Science Blog, Aug. 11, 2016, 23 pages.
Kazmucha, Allyson, "How to Send Map Locations Using iMessage", iMore.com, Available at <http://www.imore.com/how-use-imessage-share-your-location-your-iphone>, Aug. 2, 2012, 6 pages.
Kickstarter, "Ivee Sleek: Wi-Fi Voice-Activated Assistant", available at <https://www.kickstarter.com/projects/ivee/ivee-sleek-wi-fi-voice-activated-assistant, retrieved on Feb. 10, 2014, 13 pages.
King et al., "Robust Speech Recognition Via Anchor Word Representations", Interspeech 2017, Aug. 20-24, 2017, pp. 2471-2475.
Lee, Sungjin, "Structured Discriminative Model for Dialog State Tracking", Proceedings of the SIGDIAL 2013 Conference, Aug. 2013, pp. 442-451.
Lewis, Cameron, "Task Ave for iPhone Review", Mac Life, Available at <http://www.maclife.com/article/reviews/task_ave_iphone_review>, Mar. 3, 2011, 5 pages.
Liou et al., "Autoencoder for Words", Neurocomputing, vol. 139, Sep. 2014, pp. 84-96.
Liu et al., "Accurate Endpointing with Expected Pause Duration", Retrieved from the Internet "https://www.iscaspeech.org/archive/interspeech_2015/papers/i15_2912.pdf", Sep. 6-10, 2015, pp. 2912-2916.
Luo et al., "Speaker-Independent Speech Separation with Deep Attractor Network", IEEE/ACM Transactions on Audio, Speech, and Language Processing, vol. 26, No. 4, Apr. 2018, pp. 787-796.
Majerus, Wesley, "Cell Phone Accessibility for your Blind Child", Retrieved from the Internet <URL:https://web.archive.org/web/20100210001100/https://nfb.org/images/nfb/publications/fr/fr28/3/fr280314.htm>, 2010, pp. 1-5.
Marketing Land, "Amazon Echo: Play Music", Online Available at: <https://www.youtube.com/watch?v=A7V5NPbsXi4>, Apr. 27, 2015, 3 pages.
Meet Ivee, Your Wi-Fi Voice Activated Assistant, available at <http://www.helloivee.com/>, retrieved on Feb. 10, 2014, 8 pages.
Mel Scale, Wikipedia the Free Encyclopedia, Last modified on Oct. 13, 2009 and retrieved on Jul. 28, 2010, available at <http://en.wikipedia.org/wiki/Mel_scale>, 2 pages.
Mhatre et al., "Donna Interactive Chat-bot acting as a Personal Assistant", International Journal of Computer Applications (0975-8887), vol. 140, No. 10, Apr. 2016, 6 pages.
Microsoft, "Turn on and Use Magnifier", available at Khttp://www.microsoft.com/windowsxp/using/accessibility/magnifiertumon.mspx>, retrieved on Jun. 6, 2009.
Mikolov et al., "Linguistic Regularities in Continuous Space Word Representations", Proceedings of NAACL-HLT, Jun. 9-14, 2013, pp. 746-751.
Miller, Chance, "Google Keyboard Updated with New Personalized Suggestions Feature", available at <http://9to5google.com/2014/03/19/google-keyboard-updated-with-new-personalized-suggestions-feature/>, Mar. 19, 2014, 4 pages.
Minimum Phase, Wikipedia the free Encyclopedia, Last modified on Jan. 12, 2010 and retrieved on Jul. 28, 2010, available at <http://en.wikipedia.org/wiki/Minimum_phase>, 8 pages.
Mobile Speech Solutions, Mobile Accessibility, SVOX AG Product Information Sheet, available at <http://www.svox.com/site/bra840604/con782768/mob965831936.aSQ?osLang=1>, Sep. 27, 2012, 1 page.
Morrison, Jonathan, "iPhone 5 Siri Demo", Online Available at <https://www.youtube.com/watch?v=_wHWwG5lhWc>, Sep. 21, 2012, 3 pages.
My Cool Aids, "What's New", available at <http://www.mycoolaids.com/>, 2012, 1 page.
Myers, Brad A., "Shortcutter for Palm", available at <http://www.cs.cmu.edu/~pebbles/v5/shortcutter/palm/index.html>, retrieved on Jun. 18, 2014, 10 pages.
Nakamura, Satoshi, "Overcoming the Language Barrier with Speech Translation Technology, Science & Technology Trends", Quarterly Review No. 31, Apr. 2009, pp. 36-49.
Nakazawa et al., "Detection and Labeling of Significant Scenes from TV program based on Twitter Analysis", Proceedings of the 3rd Forum on Data Engineering and Information Management (deim 2011 proceedings), IEICE Data Engineering Technical Group. Available online at: http://db-event.jpn.org/deim2011/proceedings/pdf/f5-6.pdf, Feb. 28, 2011, 10 pages (Official Copy Only). (See Communication under 37 CFR § 1.98(a) (3)).
Naone, Erica, "TR10: Intelligent Software Assistant", Technology Review, Mar.-Apr. 2009, 2 pages.
Navigli, Roberto, "Word Sense Disambiguation: A Survey", ACM Computing Surveys, vol. 41, No. 2, Feb. 2009, 69 pages.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Ng, Simon, "Google's Task List Now Comes to iphone", SimonBlog, Available at <http://www.simonblog.com/2009/02/04/googles-task-list-now-comes-to-iphone/>, Feb. 4, 2009, 3 pages.
Nozawa et al., "iPhone 4S Perfect Manual", vol. 1, First Edition, Nov. 11, 2011, 4 pages (Official Copy Only) (See Communication under 37 CFR § 1.98(a) K3)).
Okuno et al., "System for Japanese Input Method based on the Internet", Technical Report of Information Processing Society of Japan, Natural Language Processing, Japan, Information Processing Society of Japan, vol. 2009, No. 36, Mar. 18, 2009, 8 pages (Official Copy Only) (See Communication under 37 CFR § 1.98(a)(3)).
Osxdaily, "Get a List of Siri Commands Directly from Siri", Available at <http://osxdaily.com/2013/02/05/list-siri-commands/>, Feb. 5, 2013, 15 pages.
Pan et al., "Natural Language Aided Visual Query Building for Complex Data Access", In proceeding of: Proceedings of the Twenty-Second Conference on Innovative Applications of Artificial Intelligence, XP055114607, Jul. 11, 2010, pp. 1821-1826.
Pathak et al., "Privacy-preserving Speech Processing: Cryptographic and Stringmatching Frameworks Show Promise", In: IEEE

(56) References Cited

OTHER PUBLICATIONS signal processing magazine, retrieved from <http://www.merl.com/publications/docs/TR2013-063.pdf>, Feb. 13, 2013, 16 pages.
Patra et al., "A Kernel-Based Approach for Biomedical Named Entity Recognition", Scientific World Journal, vol. 2013, 2013, pp. 1-7.
Pennington et al., "GloVe: Global Vectors for Word Representation", Proceedings of the Conference on Empirical Methods Natural Language Processing (EMNLP), Oct. 25-29, 2014, pp. 1532-1543.
Perlow, Jason, "Alexa Loop Mode with Playlist for Sleep Noise", Online Available at: <https://www.youtube.com/watch?v=:nSkSuXziJSg>, Apr. 11, 2016, 3 pages.
Phoenix Solutions, Inc., "Declaration of Christopher Schmandt Regarding the MIT Galaxy System", West Interactive Corp., A Delaware Corporation, Document 40, Jul. 2, 2010, 162 pages.
Powell, Josh, "Now You See Me . . . Show/Hide Performance", available at http://www.learningjquery.com/2010/05/now-you-see-me-showhide-performance, May 4, 2010, 3 pages.
Qian et al., "Single-channel Multi-talker Speech Recognition with Permutation Invariant Training", Speech Communication, issue 104, 2018, pp. 1-11.
Rettinger, Jon, "iPhone 3GS—Voice Controls", Online Available at: "https://www.youtube.com/watch?v=jPecb7R3oY4", Jun. 19, 2009, 6 pages.
Rios, Mafe, "New bar search for Facebook", You Tube, available at "https://www.youtube.com/watch?v=vwgN1WbvCas", Jul. 19, 2013, 2 pages.
Routines, "SmartThings Support", Available online at <https://web.archive.org/web/20151207165701/https://support.smartthings.com/hc/en-US/articles/205380034-Routines>, 2015, 2 pages.
Samsung Support, "Create a Quick Command in Bixby to Launch Custom Settings by at your Command", Retrieved from internet: https://www.facebook.com/samsungsupport/videos/10154746303151213, Nov. 13, 2017, 1 page.
Samsung, "SGH-a885 Series—Portable Quad-Band Mobile Phone-User Manual", Retrieved from the Internet: URL: "http://web.archive.org/web/20100106113758/http://www.comparecellular.com/images/phones/userguide1896.pdf", Jan. 1, 2009, 144 pages.
Sarawagi, Sunita, "CRF Package Page", available at <http://crf.sourceforge.net/>, retrieved on Apr. 6, 2011, 2 pages.
Seehafer, Brent, "Activate google assistant on Galaxy S7 with screen off", Available online at:—"https://productforums.google.com/forum/#!topic/websearch/lp3qlGBHLVI", Mar. 8, 2017, 4 pages.
Selfrifge et al., "Interact: Tightly-coupling Multimodal Dialog with an Interactive Virtual Assistant", International Conference on Multimodal Interaction, ACM, Nov. 9, 2015, pp. 381-382.
Senior et al., "Improving DNN Speaker Independence With I-Vector Inputs", ICASSP, 2014, pp. 225-229.
Settle et al., "End-to-End Multi-Speaker Speech Recognition", Proc. ICASSP, Apr. 2018, 6 pages.
Simonite, Tom, "One Easy Way to Make Siri Smarter", Technology Review, Oct. 18, 2011, 2 pages.
Smith, Jake, "Amazon Alexa Calling: How to Set it up and Use it on Your Echo", iGeneration, May 30, 2017, 5 pages.
Speaker Recognition, Wikipedia, The Free Encyclopedia, Nov. 2, 2010, 4 pages.
Spivack, Nova, "Sneak Preview of Siri—Part Two—Technical Foundations—Interview with Tom Gruber, CTO of Siri", Online Available at <https://web.archive.org/web/20100114234454/http://www.twine.com/item/12vhy39k4-22m/interview-with-tom-gruber-of-siri>, Jan. 14, 2010, 5 pages.
SRI, "SRI Speech: Products: Software Development Kits: EduSpeak", available at <http://web.archive.org/web/20090828084033/http://www.speechatsri.com/products/eduspeak>shtml, retrieved on Jun. 20, 2013, 2 pages.
Stent et al., "Geo-Centric Language Models for Local Business Voice Search", AT&T Labs—Research, 2009, pp. 389-396.
Sullivan, Danny, "How Google Instant's Autocomplete Suggestions Work", available at <http://searchengineland.com/how-google-instant-autocomplete-suggestions-work-62592>, Apr. 6, 2011, 12 pages.
Sundaram et al., "Latent Perceptual Mapping with Data-Driven Variable-Length Acoustic Units for Template-Based Speech Recognition", ICASSP 2012, Mar. 2012, pp. 4125-4128.
Sundermeyer et al., "From Feedforward to Recurrent LSTM Neural Networks for Language Modeling", IEEE Transactions to Audio, Speech, and Language Processing, 2015, vol. 23, Mar. 2015, pp. 517-529.
Sundermeyer et al., "LSTM Neural Networks for Language Modeling", Interspeech 2012, ISCA's 13 Annual Conference, Sep. 9-13, 2012, pp. 194-197.
Tan et al., "Knowledge Transfer in Permutation Invariant Training for Single-channel Multi-talker Speech Recognition", ICASSP 2018, 2018, pp. 5714-5718.
Tanaka, Tatsuo, "Next Generation IT Channel Strategy Through "Experience Technology"", Intellectual Resource Creation, Japan, Nomura Research Institute Ltd. vol. 19, No. 1, Dec. 20, 2010, 17 pages. (Official Copy only) (See Communication under 37 CFR § 1.98(a) (3)).
Textndrive, "Text'nDrive App Demo-Listen and Reply to your Messages by Voice while Driving!", YouTube Video available at <http://www.youtube.com/watch?v=WaGfzoHsAMw>, Apr. 27, 2010, 1 page.
Tofel, Kevin C., "SpeakTolt: A Personal Assistant for Older iPhones, iPads", Apple News, Tips and Reviews, Feb. 9, 2012, 7 pages.
Tucker, Joshua, "Too Lazy to Grab Your TV Remote? Use Siri Instead", Engadget, Nov. 30, 2011, 8 pages.
Tur et al., "The CALO Meeting Assistant System", IEEE Transactions on Audio, Speech and Language Processing, vol. 18, No. 6, Aug. 2010, pp. 1601-1611.
Vaswani et al., "Attention is All You Need", 31st Conference on Neural Information Processing Systems (NIPS 2017), 2017, 11 pages.
Villemure et al., "The Dragon Drive Innovation Showcase: Advancing the state-of-the-art in automotive assistants", Retrieved from the Internet: "http://essv2018.de/wp-content/uploads/2018/03/41_Villemure_ESSV2018.pdf", 2018, 7 pages.
Vlingo Incar, "Distracted Driving Solution with Vlingo InCar", YouTube Video, Available online at <http://www.youtube.com/watch?v=:Vqs8XfXxgz4>, Oct. 2010, 2 pages.
Vodafone Deutschland, "Samsung Galaxy S3 Tastatur Spracheingabe", Available online at—"https://www.youtube.com/watch?v=6kOd6Gr8uFE", Aug. 22, 2012, 1 page.
Voiceassist, "Send Text, Listen to and Send E-Mail by Voice", YouTube Video, Available online at <http://www.youtube.com/watch?v=0tEU61nHHA4>, Jul. 30, 2009, 1 page.
Voiceonthego, "Voice on the Go (BlackBerry)", YouTube Video, available online at <http://www.youtube.com/watch?v=pJqpWgQS98w>, Jul. 27, 2009, 1 page.
Wang et al., "End-to-end Anchored Speech Recognition", Proc. ICASSP2019, May 12-17, 2019, 5 pages.
Weng et al., "Deep Neural Networks for Single-Channel Multi-Talker Speech Recognition", IEEE/ACM Transactions on Audio, Speech, and Language Processing, vol. 23, No. 10, Oct. 2015, pp. 1670-1679.
Wikipedia, "Acoustic Model", available at <http://en.wikipedia.org/wiki/AcousticModel>, retrieved on Sep. 14, 2011, 2 pages.
Wikipedia, "Language Model", available at <http://en.wikipedia.org/wiki/Language_model>, retrieved on Sep. 14, 2011, 4 pages.
Wikipedia, "Siri", Available at: URL: <https://en.wikipedia.orgjwjindex.php?title=Siri&oldid>, Nov. 8, 2015, 13 Pages.
Wikipedia, "Speech Recognition", available at <http://en.wikipedia.org/wiki/Speech_recognition>, retrieved on Sep. 14, 2011, 12 pages.
Wikipedia, "Virtual Assistant", Wikipedia, Online Available at <https://en.wikipedia.orgjwjindex.php?title=Virtual_assistant&oldid=679330666>, Sep. 3, 2015, 4 Pages.
Wikipedia, "Home Automation", Available at: https://en.wikipedia.org/w/index.php?titie= Home_automation&oldid, Oct. 19, 2015, 9 pages.
Wilson, Mark, "New iPod Shuffle Moves Buttons to Headphones, Adds Text to Speech", available at <http://gizmodo.com/5167946/new-ipod-shuffle-moves-buttons-to-headphones-adds-text-to-speech>, Mar. 11, 2009, 12 pages.
X.Ai, "How it Works", May 2016, 6 pages.

(56) References Cited

OTHER PUBLICATIONS

Xiang et al., "Correcting Phoneme Recognition Errors in Learning Word Pronunciation through Speech Interaction", Speech Communication, vol. 55, No. 1, Jan. 1, 2013, pp. 190-203.
Xu et al., "Speech-Based Interactive Games for Language Learning: Reading, Translation, and Question-Answering", Computational Linguistics and Chinese Language Processing, vol. 14, No. 2, Jun. 2009, pp. 133-160.
Xu, Yuhong, "Policy optimization of dialogue management in spoken dialogue system for out-of-domain utterances", 2016 International Conference on Asian Language Processing (IALP), IEEE, Nov. 21, 2016, pp. 10-13.
Yan et al.,, "A Scalable Approach to Using DNN-Derived Features in GMM-HMM Based Acoustic Modeling for LVCSR", In Interspeech, 2013, pp. 104-108.
Yates, Michael C., "How can I exit Google Assistant after i'm finished with it", Available online at:—"https://productforums.google.com/forum/#!msg/phone-by-google/faECnR2RJwA/gKNtOkQgAQAJ", Jan. 11, 2016, 2 pages.
Yeh, Jui-Feng, "Speech Act Identification Using Semantic Dependency Graphs with Probabilistic Context-free Grammars", ACM Transactions on Asian and Low-Resource Language Information Processing 15, No. 1, Article 5, Dec. 2015, pp. 5.1-5.28.
Young et al., "The Hidden Information State model: A practical framework for POMDP-based spoken dialogue management", Computer Speech & Language, vol. 24, Issue 2, 2010, pp. 150-174.
Yu et al., "Permutation Invariant Training of Deep Models for Speaker-independent Multi-talker Speech Separation", Proc. ICASSP, 2017, 5 pages.
Yu et al., "Recognizing Multi-talker Speech with Permutation Invariant Training", Interspeech 2017, Aug. 20-24, 2017, pp. 2456-2460.
Zainab, "Google Input Tools Shows Onscreen Keyboard in Multiple Languages [Chrome]", available at <http://www.addictivetips.com/internet-tips/google-input-tools-shows-multiple-language-onscreen-keyboards-chrome/>, Jan. 3, 2012, 3 pages.
Zangerle et al., "Recommending #Tag in Twitter", Proceedings of the Workshop on Semantic Adaptive Socail Web, 2011, pp. 1-12.
Zhang et al., "Research of Text Classification Model Based on Latent Semantic Analysis and Improved HS-SVM", Intelligent Systems and Applications (ISA), 2010 2nd International Workshop, May 22-23, 2010, 5 pages.
Zhong et al., "JustSpeak: Enabling Universal Voice Control on Android", W4A'14, Proceedings of the 11th Web for All Conference, No. 36, Apr. 7-9, 2014, 8 pages.
Zmolikova et al., "Speaker-aware Neural Network Based Beamformer for Speaker Extraction in Speech Mixtures", Interspeech 2017, Aug. 20-24, 2017, pp. 2655-2659.
Notice of Allowance received for Korean Patent Application No. 10-2017-7033045, dated Mar. 10, 2020, 4 pages (2 pages of English Translation and 2 pages of Official Copy).
Decision to Refuse received for European Patent Application No. 16725334.3, dated Jul. 13, 2021, 13 pages.
Summons to Attend Oral Proceedings received for European Patent Application No. 16725334.3, mailed on Dec. 15, 2020, 12 pages.
Minutes of Oral Proceedings received for European Patent Application No. 16725334.3, mailed on Jul. 9, 2021, 6 pages.
Office Action received for Chinese Patent Application No. 201680027821.1, dated May 31, 2021, 16 pages (7 pages of English Translation and 9 pages of Official Copy).
Result of Consultation received for European Patent Application No. 16725334.3, dated Jun. 28, 2021, 3 pages.
Decision to Grant received for Japanese Patent Application No. 2017-553158, dated Jun. 14, 2019, 5 pages.
Final Office Action received for U.S. Appl. No. 14/713,410, dated Nov. 30, 2018, 11 pages.
International Search Report and Written Opinion received for PCT Patent Application No. PCT/US2016/032763, dated Jun. 27, 2016, 12 pages.
Non-Final Office Action received for U.S. Appl. No. 14/713,410, dated Mar. 28, 2018, 12 pages.
Notice of Acceptance received for Australian Patent Application No. 2016265837, dated Jun. 4, 2019, 3 pages.
Notice of Allowance received for U.S. Appl. No. 14/713,410, dated Jun. 21, 2019, 5 pages.
Office Action received for Australian Patent Application No. 2016265837, dated Nov. 15, 2018, 3 pages.
Office Action received for Japanese Patent Application No. 2017-553158, dated Dec. 3, 2018, 6 pages.
Office Action received European Patent Application No. 16725334.3, dated Dec. 11, 2019, 7 pages.
Decision on Appeal received for Korean Patent Application No. 10-2017-7033045, mailed on Feb. 19, 2020, 32 pages (5 pages of English Translation and 27 pages of Official Copy).
International Search Report and Written Opinion received for PCT Patent Application No. PCT/US2021/015629, dated May 14, 2021, 12 pages.

* cited by examiner

VIRTUAL ASSISTANT IN A COMMUNICATION SESSION

CROSS-REFERENCE TO RELATED APPLICATIONS

This application is a continuation of U.S. application Ser. No. 14/713,410, filed May 15, 2015, entitled "VIRTUAL ASSISTANT IN A COMMUNICATION SESSION," the contents of which are hereby incorporated by reference in their entirety.

TECHNICAL FIELD

The present technology pertains to communication sessions between groups of users, and more specifically pertains to utilizing a virtual assistant to assist one or more users perform tasks during a communication session.

BACKGROUND

Current computing devices can include functionality that enables users to communicate with each other by transmitting and receiving messages. For example, many computing devices include text and/or instant messaging functionality that enable users of the computing devices to transmit text, images, sounds, etc., to the client devices of one or more other users. Users can use this functionality to have conversations, make plans and/or perform any other number of tasks.

While current systems enable users to communicate and perform tasks, users are required to manually perform the tasks. For example, a group of users attempting to schedule lunch needs to determine an available day and time that works for each member of the group. This can require each user to check their calendar and share available times with other users. Likewise, a group of users attempting to perform a financial transaction needs to determine a payment method for performing the transaction. This can require each user to determine the payment methods available to the individual user and then share this data amongst the other members of the group. Accordingly, improvements are needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for utilizing a virtual assistant as part of a communication session. A communication session can one or more communications transmitted amongst a group of participant users using a communication application. For example, a communication session can be a conversation between multiple users using a text and/or instant messaging application such as iMessage® available by Apple Inc., of Cupertino, Calif.

One or more of the participant users can select to utilize a virtual assistant to assist the participant users with tasks during the communication session. A virtual assistant can be an application, module, software, etc., capable of analyzing messages included in the communication session to identify tasks and provide assistance with completing the identified tasks. For example, a virtual assistant can be an application such as Siri® available by Apple Inc., of Cupertino, Calif., that uses semantic recognition to analyze text and interpret the intended meaning.

A task can be any type of action that a virtual assistant can provide assistance with. For example, a task can include scheduling a meeting, performing a financial transaction, determining an estimated time of arrival, providing directions, providing weather information, alerting a user of relevant information, etc.

In some embodiments, a user can communicate with the virtual assistant as part of the communication session. For example, a user can use the communication application to enter a message directed to the virtual assistant. The virtual assistant can analyze the entered message and determine that the message was directed to the virtual assistant rather than to the other participants of the communication session. As a result, the message will not be transmitted to the other participants of the communication session and the virtual assistant will assist the user with the identified task.

A virtual assistant can assist a user with a variety of different tasks. For example, the virtual assistant can gather requested data for the user from one or more web servers, such as weather data, traffic data, etc. Further, the virtual assistant can coordinate performing a task amongst multiple participant users of a communication session. For example, to assist with scheduling a meeting amongst multiple participant users of a communication session, a virtual assistant can gather calendar information for each of the participant users and recommend one or more proposed times for the meeting. Alternatively, to assist with performing a financial transaction amongst multiple participant users of a communication session, a virtual assistant can determine the financial applications available and/or utilized by each of the participant users and recommend a financial application to perform the financial transaction.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Figure 1:
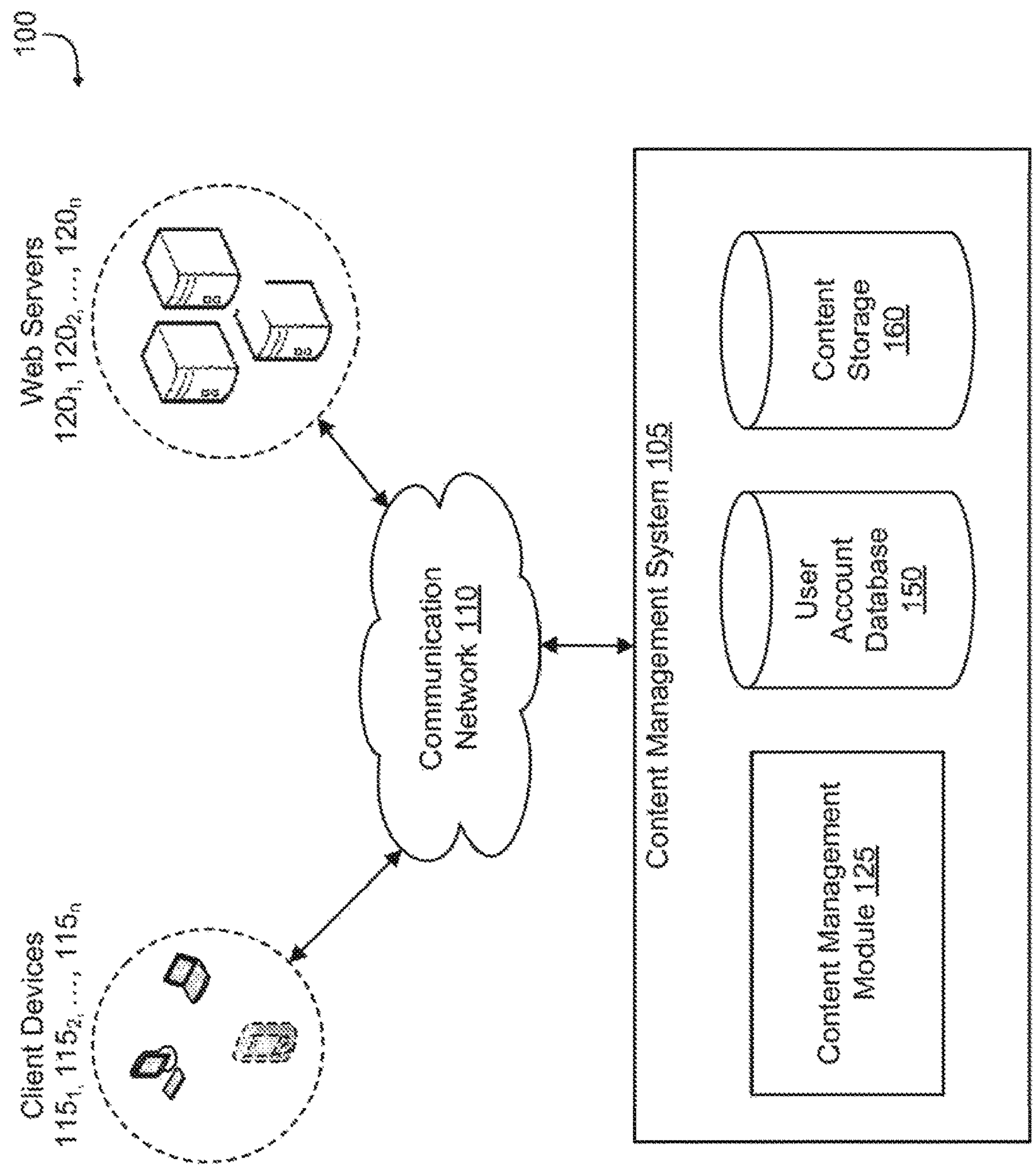
FIG. 1 shows an exemplary configuration of devices and a network in accordance with the invention.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for utilizing a virtual assistant as part of a communication session. A communication session can one or more communications transmitted amongst a group of participant users using a communication application. For example, a communication session can be a conversation between multiple users using a text and/or instant messaging application such as iMessage® available by Apple Inc., of Cupertino, Calif.

One or more of the participant users can select to utilize a virtual assistant to assist the participant users with tasks during the communication session. A virtual assistant can be an application, module, software, etc., capable of analyzing messages included in the communication session to identify tasks and provide assistance with completing the identified tasks. For example, a virtual assistant can be an application such as Siri® available by Apple Inc., of Cupertino, Calif., that uses semantic recognition to analyze text and interpret the intended meaning.

A task can be any type of action that a virtual assistant can provide assistance with. For example, a task can include scheduling a meeting, performing a financial transaction, determining an estimated time of arrival, providing directions, providing weather information, alerting a user of relevant information, etc.

In some embodiments, a user can communicate with the virtual assistant as part of the communication session. For example, a user can use the communication application to enter a message directed to the virtual assistant. The virtual assistant can analyze the entered message and determine that the message was directed to the virtual assistant rather than to the other participants of the communication session. As a result, the message will not be transmitted to the other participants of the communication session and the virtual assistant will assist the user with the identified task.

A virtual assistant can assist a user with a variety of different tasks. For example, the virtual assistant can gather requested data for the user from one or more web servers, such as weather data, traffic data, etc. Further, the virtual assistant can coordinate performing a task amongst multiple participant users of a communication session. For example, to assist with scheduling a meeting amongst multiple participant users of a communication session, a virtual assistant can gather calendar information for each of the participant users and recommend one or more proposed times for the meeting. Alternatively, to assist with performing a financial transaction amongst multiple participant users of a communication session, a virtual assistant can determine the financial applications available and/or utilized by each of the participant users and recommend a financial application to perform the financial transaction.

FIG. 1 illustrates an exemplary system configuration 100, wherein electronic devices communicate via a network for purposes of exchanging content and other data. As illustrated, multiple computing devices can be connected to communication network 110 and be configured to communicate with each other through use of communication network 110. Communication network 110 can be any type of network, including a local area network ("LAN"), such as an intranet, a wide area network ("WAN"), such as the internet, or any combination thereof. Further, communication network 110 can be a public network, a private network, or a combination thereof. Communication network 110 can also be implemented using any number of communication links associated with one or more service providers, including one or more wired communication links, one or more wireless communication links, or any combination thereof. Additionally, communication network 110 can be configured to support the transmission of data formatted using any number of protocols.

Multiple computing devices can be connected to communication network 110. A computing device can be any type of general computing device capable of network communication with other computing devices. For example, a computing device can be a personal computing device such as a desktop or workstation, a business server, or a portable computing device, such as a laptop, smart phone, or a tablet PC. A computing device can include some or all of the features, components, and peripherals of computing device 700 of FIGS. 7A and 7B.

To facilitate communication with other computing devices, a computing device can also include a communication interface configured to receive a communication, such as a request, data, etc., from another computing device in network communication with the computing device and pass the communication along to an appropriate module running on the computing device. The communication interface can also be configured to send a communication to another computing device in network communication with the computing device.

In system 100, a user can communication with other users through use of client devices $\mathbf{115}_1$, $\mathbf{115}_2$, . . . , $\mathbf{115}_n$ (collectively "115") connected to communication network 110. Client devices 115 can be any type of computing device, such as a smart phone, tablet, personal computer, etc. Client devices 115 can include a communication application that enables a user of a client device $\mathbf{115}_i$ to transmit and receive messages to and from other client devices 115. For example, a communication application can be a text and/or instant messaging application such as iMessage® available by Apple Inc., of Cupertino, Calif.

A user can also use client devices 115 to interact with web servers $\mathbf{120}_1$, $\mathbf{120}_2$, . . . , $\mathbf{120}_n$ (collectively "120") connected to communication network 110. Web servers 120 can be any type of computing device and be configured to maintain web data and provide the web data to requesting client devices 115. Web data can be data that can be rendered by client devices 115 to present a webpage, website, etc., to a requesting user. Web servers, 120 can support connections from a variety of different types of client devices 115, such as desktop computers; mobile computers; mobile communications devices (e.g. mobile phones, smart phones, tablets, etc.); smart televisions; set-top boxes; and/or any other network enabled computing devices.

System 100 can also include content management system 105. Content management system 105 can include one or more computing devices configured to manage content items for multiple user accounts. A content item can include any type of digital asset such as an application, audio file, text file, video file, etc.

Content management system 105 can support connections from a variety of different types of client devices 115, such as desktop computers; mobile computers; mobile communications devices (e.g. mobile phones, smart phones, tablets, etc.); smart televisions; set-top boxes; and/or any other network enabled computing devices. Client devices 115 can be of varying type, capabilities, operating systems, etc. Furthermore, content management system 105 can concurrently accept connections from and interact with multiple client devices 115.

A user can interact with content management system 105 via a client-side application installed on client device $\mathbf{115}_i$. In some embodiments, the client-side application can include a content management system specific component. For example, the component can be a stand-alone application, one or more application plug-ins, and/or a browser extension. However, the user can also interact with content management system 105 via a third-party application, such as a web browser, that resides on client device $\mathbf{115}_i$ and is configured to communicate with content management system 105. In either case, the client-side application can present a user interface (UI) for the user to interact with content management system 105. For example, the user can interact with content management system 105 via a client-side application integrated with the file system or via a webpage displayed using a web browser application.

Content management system 105 can be configured to manage content items and data for multiple user accounts. For example, content management system 105 can allow users to purchase, store and access content items, calendar data, contact data, etc. Furthermore, content management system 105 can make it possible for a user to access the stored data, such as content items, calendar data, contact data, etc., from multiple client devices 115. Accessing a content item can include receiving metadata describing the content item, streaming the content item from content management system 105 and/or downloading the content item to one of client devices 115.

To facilitate the various content management services, a user can create a user account with content management system 105. The account information for each created user account can be maintained in user account database 150. User account database 150 can store profile information for each user account, including a unique account identifier identifying the user account, personal information, username, password, email address, home address, credit card information, banking information, calendar data, contact data, etc. User account database 150 can also include account management information, such as content storage locations, security settings, personal configuration settings, client devices authorized to access the user account, etc.

A user account can be used to purchase, manage and store content items, such as digital data, documents, text files, audio files, video files, etc. For example, content management system 105 can provide an online content retailer where users can purchase a variety of content items. Further, in some embodiments, a user can upload content items from one of client devices 115 to content management system 105. The purchased and uploaded content items can be assigned to the user's account and then accessed by the user from any of client devices 115. For example, a content item identifier identifying each content item assigned to a user account can be stored in user account database 150 and associated with the corresponding user account. The content item identifier can be used to identify the content item as well as the location of the content item.

The content items can be stored in content storage 160. Content storage 160 can be a storage device, multiple storage devices, or a server. Alternatively, content storage 160 can be a cloud storage provider or network storage accessible via one or more communications networks. Content management system 105 can hide the complexity and details regarding storage of the content items from client devices 115 such that the location of the content items stored by content management system 105 is not known by client devices 115. Content management system 105 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various user accounts. The metadata for a content item can be stored as part of the content item or can be stored separately. In one variation, each content item stored in content storage 160 can be assigned a system-wide unique identifier.

Content management system 105 can include content management module 125 configured to manage and access each user account and the content items assigned to the user accounts. For example, content management module 125 can be configured to communicate with user account database 150 and content storage 160 to adjust privileges with respect to content items and otherwise manage content items.

Upon a user logging into their user account from one of client devices 115, content management module 125 can access the account information associated with the user account to identify the content items assigned to the user account, as well as account configuration data dictating presentation of the content items. Content management module 125 can then present and/or provide the content items to the user according to the account configuration data. For example, content management module 125 can access a user account to identify the content item identifiers assigned to the user account. The content item identifier can then be used to identify and locate the content items assigned to the user account, which can be presented according to the account configuration data.

Presenting the content items can include transmitting metadata describing the content items to client device $\mathbf{115}_i$ that was used to access the user account. Client device $\mathbf{115}_i$ can then use the received metadata to present the content items that the user account can access. For example, client device $\mathbf{115}_i$ can present information identifying the content items available to the user account in a content item library. This can include presenting the title of the content items, images such as an album or book cover, description of the content item, etc.

Figure 2:
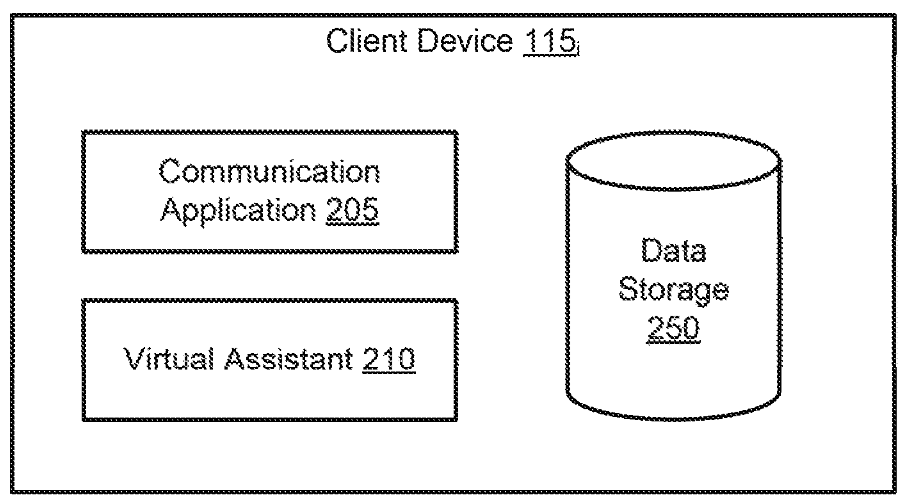
FIG. 2 shows an embodiment of a client device configured to enable a user to utilize a virtual assistant to perform tasks during a communication session.

FIG. 2 shows an embodiment of a client device $\mathbf{115}_i$ configured to enable a user to utilize a virtual assistant to perform tasks during a communication session. FIG. 2 is described in view of the system shown in FIG. 1. As shown, client device 105*i* includes communication application 205. Communication application 205 can be any type of application configured to enable a user to send and receive data messages with one or more other client devices 115. A data message can be any type of data that can be transmitted from one computing device to another, such as text data, image data, sound data, etc. In some embodiments, communication application 205 can be a text and/or instant messaging application such as iMessage® available by Apple Inc., of Cupertino, Calif.

A user of client device 115$_i$ can use communication application 205 to conduct communication sessions with one or more groups of users. A communication session can be a group of messages transmitted between a group of users. For example, a communication session can be an instant messaging conversation between a group of two or more users.

Communication application 205 can provide a user with a messaging interface that enables the user to conduct a communication session. For example, the messaging interface can enable a user to create a new communication session by selecting one or more participant users and entering a message to be transmitted to the participant users. Further, the messaging interface can enable a user to view existing communication session and enter and transmit new messages as part of the existing communication sessions.

Client device 115$_i$ can also include virtual assistant 210 configured to assist the user with tasks during a communication session. Virtual assistant 210 can be an application, module, software, etc., capable of analyzing messages included in a communication session to identify tasks and provide the user with assistance completing the identified tasks. For example, virtual assistant 210 can be an application such as Siri® available by Apple Inc., of Cupertino, Calif., that uses semantic recognition to analyze text and interpret the intended meaning.

A task can be any type of function, actions, etc., with which virtual assistant 210 can assist a user. For example, a task can be retrieving information, such as retrieving the current time, retrieving directions to a specified destination, retrieving sports scores, retrieving weather information, retrieving movie times, etc. Further a task can be coordinating and executing a transaction, such as scheduling a meeting, performing a financial transaction, purchasing tickets, etc.

Client device **105*i* can enable a user to select to utilize virtual assistant 210 in relation to one or more communication sessions. In some embodiments, communication application 205 can be configured to enable a user to select to utilize virtual assistant 210 by adding virtual assistant 210 as a participant of the communication session. For example, the user can add a nickname associated with virtual assistant 210 as a participant to a communication session. In response, communication application 205 can communicate with virtual assistant 210 to utilize virtual assistant 210** to assist with the communication session.

Further, in some embodiments, communication application 205 can transmit a notification message to the other participants of the communication session indicating that the user of client device 115$_i$ has selected to utilize virtual assistant 205. For example, communication application 205 can transmit a message as part of the communication session indicating that the user of client device 115$_i$ is utilizing virtual assistant 205. As another example, the nickname associated with virtual assistant 210 can be presented as a member of the communication session, thereby indicating that at least one participant of the communication session is utilizing the virtual assistant. In some embodiments, the other participants can be prompted regarding whether they would like to utilize the virtual assistant in regards to the communication session.

To assist a user with a communication session, virtual assistant 210 can analyze messages included in the communication session to identify tasks. For example, virtual assistant 210 can use semantic analysis to recognize terms, sets of terms, etc., indicating a task that the user may need assistance with.

In some embodiments, virtual assistant 210 can analyze messages transmitted amongst the participant users of the communication session to identify tasks. This can include messages entered by a user of client device 115$_i$ to be transmitted to the other participants as part of the communication session, as well as messages received from other users as part of the communication session.

Further, in some embodiments, virtual assistant 210 can determine whether a message provided by the user of client device 115$_i$ was intended for the other participants of the communication session or intended for the virtual assistant. A user can use communication application 205 to enter a message intended for virtual assistant 210, such as a request or command that the virtual assistant assist the user with a specified task. For example, a user can enter a request such as "help us schedule a meeting" and virtual assistant can determine that the message was intended for virtual assistant 210. Alternatively, in some embodiments, a user can address messages intended for the virtual assistant by using a nickname for the personal assistant. For example, the user can enter a messages such as "Assistant, help us schedule a meeting." Virtual assistant 210 can determine that the message was intended for the virtual assistant based on the use of the nickname addressing the virtual assistant 210.

In some embodiments, messages determined by virtual assistant 210 to be intended for virtual assistant 210 will not be transmitted to the other participant users of the communication session. Likewise, responses provided by virtual assistant 210 can be presented as part of the communication session on client device 115$_i$, while not being presented to the other participant users of the communication session. In this way, a user of client device 115$_i$ can have a separate conversation with virtual assistant 210 to perform a specified task.

To assist a user with a task, virtual assistant 210 can communicate with one or more computing devices to gather data and perform requested operations. For example, virtual assistant 210 can gather data maintained by client device 115 in memory and/or from other applications on client device 115$_i$, such as calendar data, contact data, financial information, etc. Further, virtual assistant 210 can gather data from one or more components of client device 115$_i$, such as geographic coordinate data from Global positioning system (GPS) component, temperature data, sound data, etc. Virtual assistant 210 can further edit, modify or delete data, such as creating new calendar entries, modifying contact information, etc.

Virtual assistant 210 can also gather data from one or more computing devices in network communication with client device 115$_i$. For example, virtual assistant 210 can communicate with one or more of web servers 120 to request and receive data. For example, virtual assistant 210 can communicate with web servers 120 to gather sports scores, movie show times, driving directions, etc. Further, virtual assistant 210 can perform requested operations, such as purchase movie tickets, login to a user account, provide payment information, etc.

Further, virtual assistant 210 can also gather data from client devices 115. For example, to assist a user in determining the estimated time of arrival of a participant of the communication session, virtual assistant 210 can communicate with a client device 115$_j$ of the participant user to gather geographic location data of the user, which can then be used to calculate the estimated time of arrival. In some embodiments, virtual assistant 210 can be required to receive approval from the participant of the communication session prior to receiving data from the participants client device 115$_j$. For example, virtual assistant 210 can transmit a message as part of the communication session to the client device 115$_j$ requesting the specified data and the receiving participant can select to either approve or deny the request.

In some embodiments, virtual assistant 210 can gather data from content management system 105. For example, virtual assistant 210 can gather data from user accounts maintained by content managements system 210. This can include demographic data for one or more participants of the communication session, contact information, content items assigned to each user, such as applications utilized by each user, etc. In some embodiments, virtual assistant 210 can be required to receive approval from the participant of the communication session prior to being able to access data from the participant's user account. For example, virtual assistant 210 can transmit a message as part of the communication session to the client device 115$_j$ requesting approval to access the participant's user account and the receiving participant can select to either approve or deny the request.

Alternatively, a participant can authorize virtual assistant 210 to access their user account by selecting to utilize the virtual assistant with respect to the communication session. Thus, virtual assistant 210 can be automatically authorized to access the user account of each participant of the communication session that has selected to utilize the virtual assistant 210. Virtual assistant 210 can transmit messages requesting approval to access the user account of any participant that has not selected to utilize the personal assistant 210.

In some embodiments, virtual assistant 210 can gather data directly from the participants of a communication session. For example, virtual assistant 210 can present a poll as part of the communication session to gather feedback from the users. This can include presenting the users with multiple options, such as potential restaurants, meeting times, etc. The poll can enable each participant to enter their selection and virtual assistant 210 can select a time, restaurant, etc., based on the provided selections.

In some embodiments, the options presented to the users as part of a poll can be based on data gathered by virtual assistant 210 from the users. For example, to help with the task of selecting a restaurant, the virtual assistant can gather location information from each participant and select restaurants that are nearby or equidistance from the participants. The selected restaurants can then be presented to the users in a poll.

As another example, to assist users schedule a meeting, virtual assistant 210 can gather calendar information from each user to identify a set of candidate times that works best for the participants. Virtual assistant 210 can then present the candidate times to the users as part of the communication session and allow the users to provide feedback.

In some embodiments, virtual assistant 210 can place a temporary hold on the candidate times while the users are providing feedback. The temporary hold will indicate the candidate times as taken or potentially taken until virtual assistant 210 can finalize a time for the meeting. Once virtual assistant 210 finalizes the time for the meeting, the unselected candidate times will no longer be held and the selected candidate time will be scheduled for the meeting.

As another example, to assist a user to perform a financial transaction with one or more other users, virtual assistant 210 can gather data indicating payment methods available to each user and select a set of candidate payment methods that are available to each user. For example, a payment method can be an application that enables a user to transfer money from one party to another. Virtual assistant 210 can determine which payment methods are installed on each user's client device 115 and then present a set of candidate payments methods from which the user can select.

Figure 3:
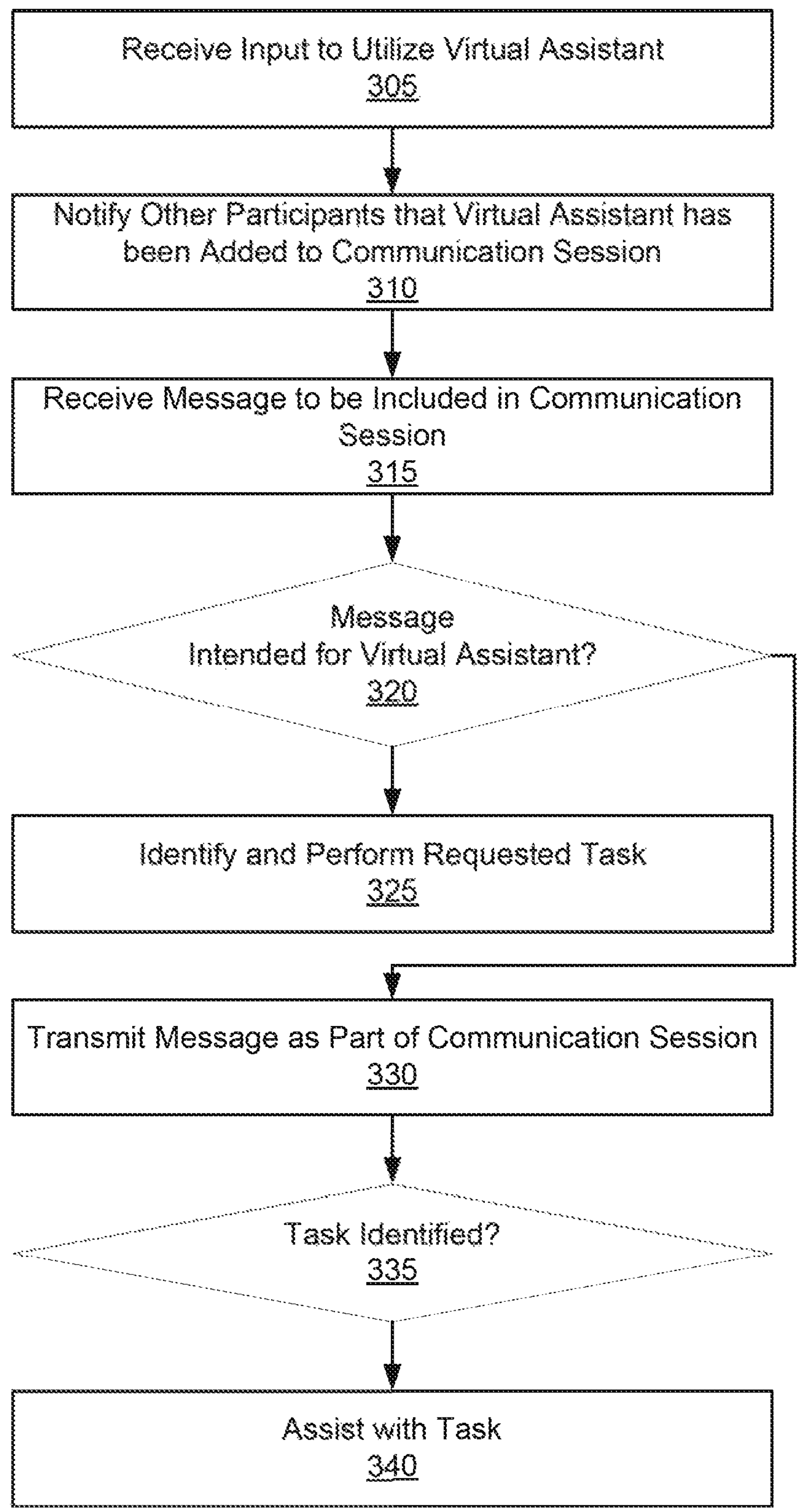
FIG. 3 shows a method of a client device utilizing a virtual assistant to assist with a communication session.

FIG. 3 shows a method of a client device 115$_i$ utilizing a virtual assistant 120 to assist with a communication session. The method shown in FIG. 3 is described in view of the systems shown in FIG. 1 and FIG. 2. Although specific steps are shown in FIG. 3, in other embodiments the method may have more or less steps. Further, the order in which the steps are performed is just one possible embodiment and is not meant to be limiting. The method may be performed in a variety of differing orders, including one or more steps being performed simultaneously, and/or including more or less steps than those shown in FIG. 3.

At block 305, communication application 205 receives an input indicating that the user of client device 115$_i$ would like to utilize virtual assistant 210 to assist with tasks in relation to a specified communication session. For example, the user may have added a nickname associated with virtual assistant 210 as a participant to the communication session. Alternatively, the user may have selected a user interface element indicating that the user would like to utilize virtual assistant 210. In another example, the user can select to utilize virtual assistant 210 by directly addressing virtual assistant 210 in the communication session. For example, the user can enter a message that begins with the a nickname associated with virtual assistant 210, thereby automatically adding virtual assistant 210 to the communication session. In other examples, any other participant of in the communication session can separately confirm and/or consent whether to include virtual assistant 210.

At block 310, communication application 205 can notify the other participant that the virtual assistant is being utilized. For example, the nickname for the personal assistant can be presented as a member of the communication session. Alternatively, communication application 205 can transmit a message to the other participants as part of the communication session that indicates that virtual assistant 210 is being utilized. In some embodiments, the message can prompt the other participants to select to utilize the virtual assistant as well.

At block 315, communication application 205 receives a message to be included in the communication session. For example, a user of client device 115$_i$ can enter a message using the communication application.

At block 320, virtual assistant 210 determines whether the message was intended for virtual assistant 210. For example, virtual assistant 210 can use semantic recognition to analyze the message and determine whether the message was intended for virtual assistant 210 or, alternatively, for the other participants of the communication session.

If at block 320, virtual assistant 210 determines that the message was intended for virtual assistant 210, the method continues to block 325. At block 325 the virtual assistant 210 identifies and assists the user with the requested task. The message may not be transmitted to the other recipients of the communication session because it was intended for virtual assistant 210.

Alternatively, if at block 320, virtual assistant 210 determines that the message was not intended for virtual assistant 210 (i.e., the message was intended for the other recipients of the communication session) the method continues to block 330. At block 220 communication application 205 transmits the message as part of the communication session to the other participants of the communication session.

If virtual assistant 210 determines the message is not intended for virtual assistant 210 then at block 335, virtual assistant 210 determines whether there is a task that virtual assistant 210 can assist with. For example, virtual assistant 210 can use semantic recognition to analyze one or more messages included in the communication session to determine whether there is a task that virtual assistant 210 can assist with. If at block 335, virtual assistant identifies a task, the method continues to block 340 where virtual assistant 210 assists the user with the task.

Figure 4A:
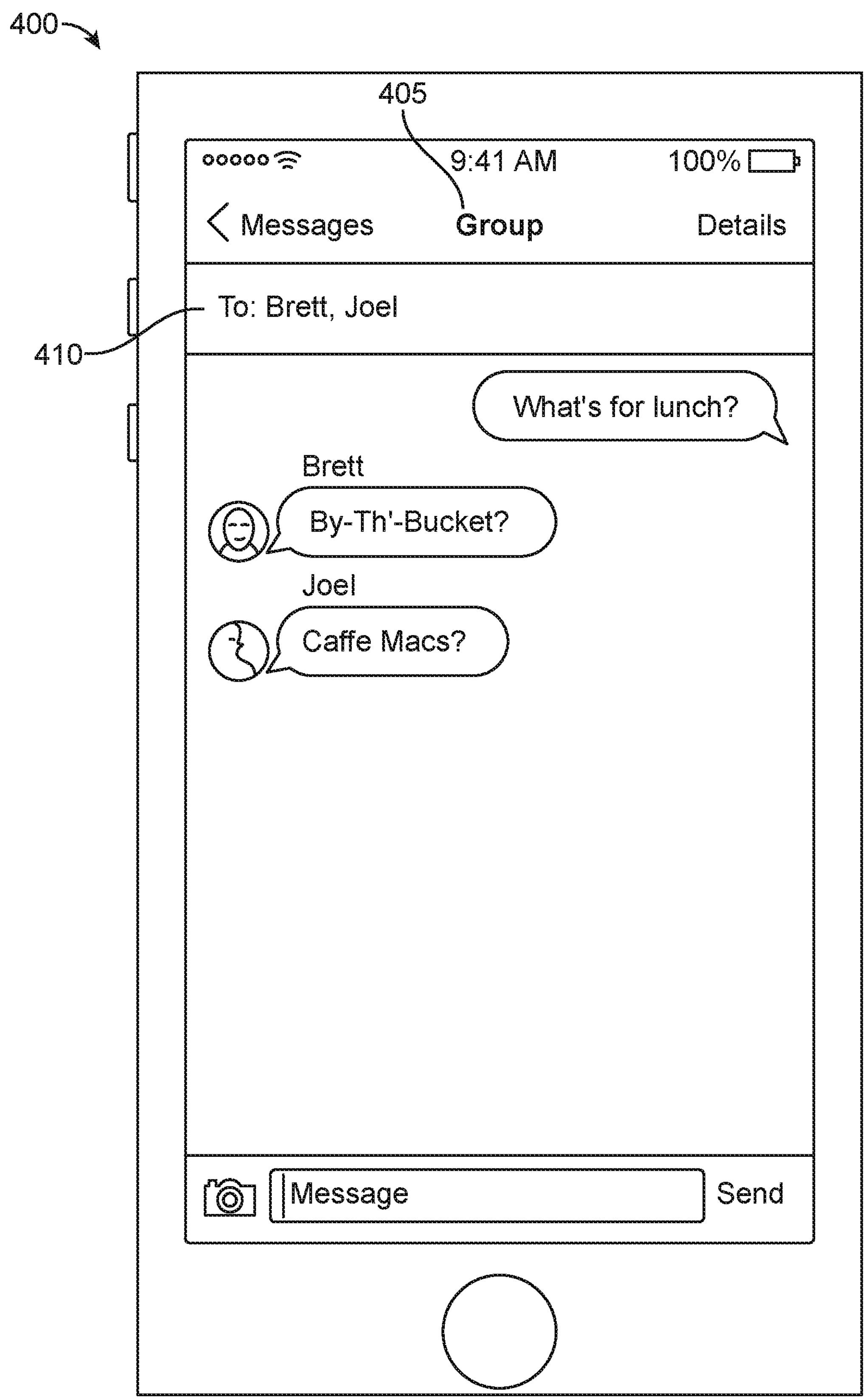
FIGS. 4A-4F shows an example of a virtual assistant assisting a participant of a communication session.

FIGS. 4A-4F shows an example of a virtual assistant assisting a participant of a communication session. FIG. 4A shows a client device 400 used to conduct a communication session 405 between multiple participants. As shown the communication session 405 includes a recipient list 410 identifying the participants of the communication session 405 that will receive messages from the user of client device 405. Accordingly, the communication session 405 has three participants: the user of the client device 400, Brett and Joel. The participants are using the communication session 405 to determine where to eat lunch.

Figure 4B:
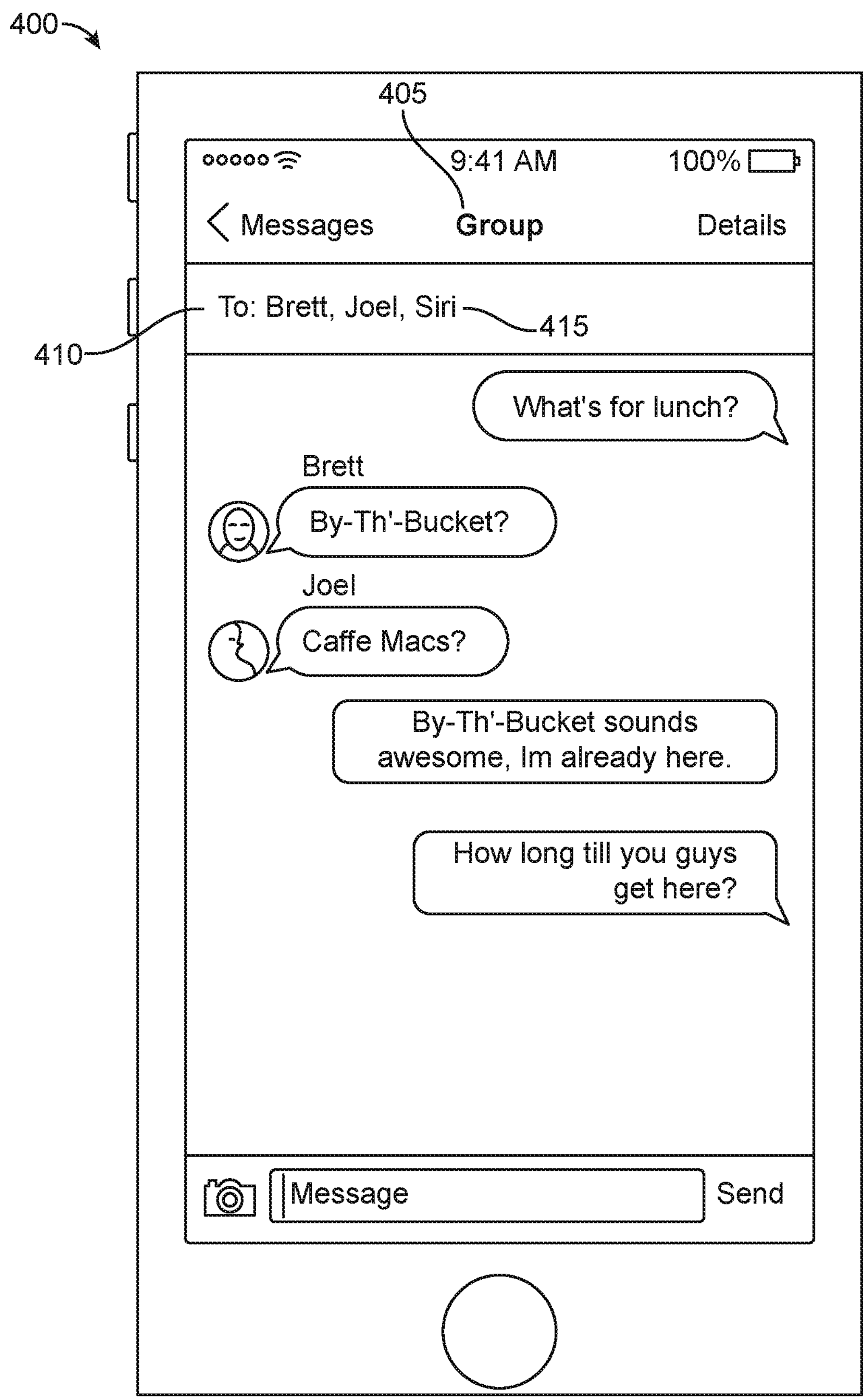

FIG. 4B shows that virtual assistant 415 is included in the recipient list 410, indicating that the user of client device 400 has selected to utilize the virtual assistant in relation to the communication session 405. As shown, the user of the client device 400 has entered the message "how long till you guys get here?"

Figure 4C:
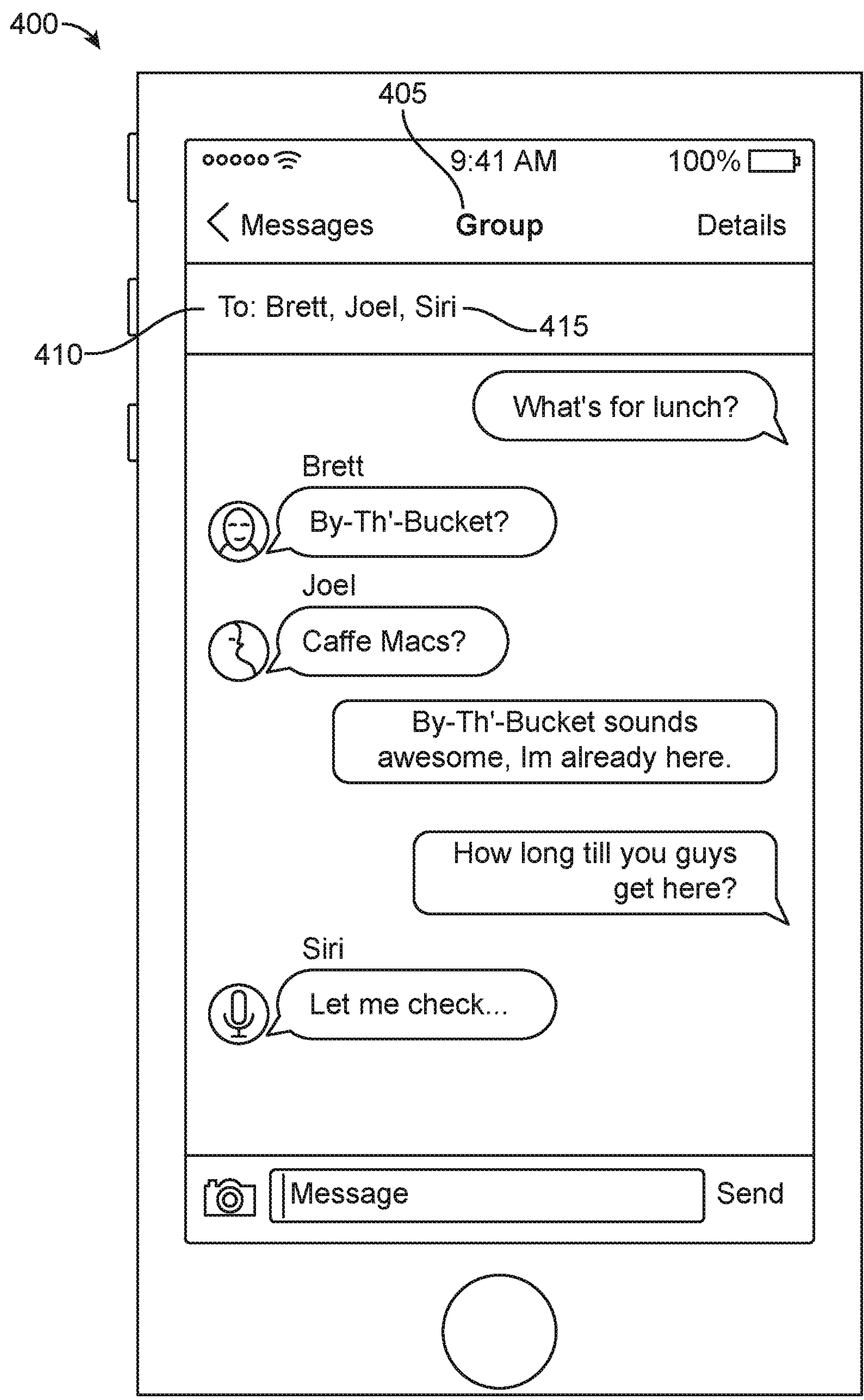

FIG. 4C shows that virtual assistant 415 has presented a message as part of the communication session 405 indicating that the virtual assistant has identified a task and is assisting the user with the identified task. In this case, the task is determining when the other participants of the communication session 405 will arrive at the restaurant for lunch. In some embodiments, the message from virtual assistant 415 can be presented on only the client device 400 and not on the client devices of the other participants of the communication session 405. Alternatively, in some embodiments can be presented on the client device of one or more of the other participants of the communication session 405.

Figure 4D:
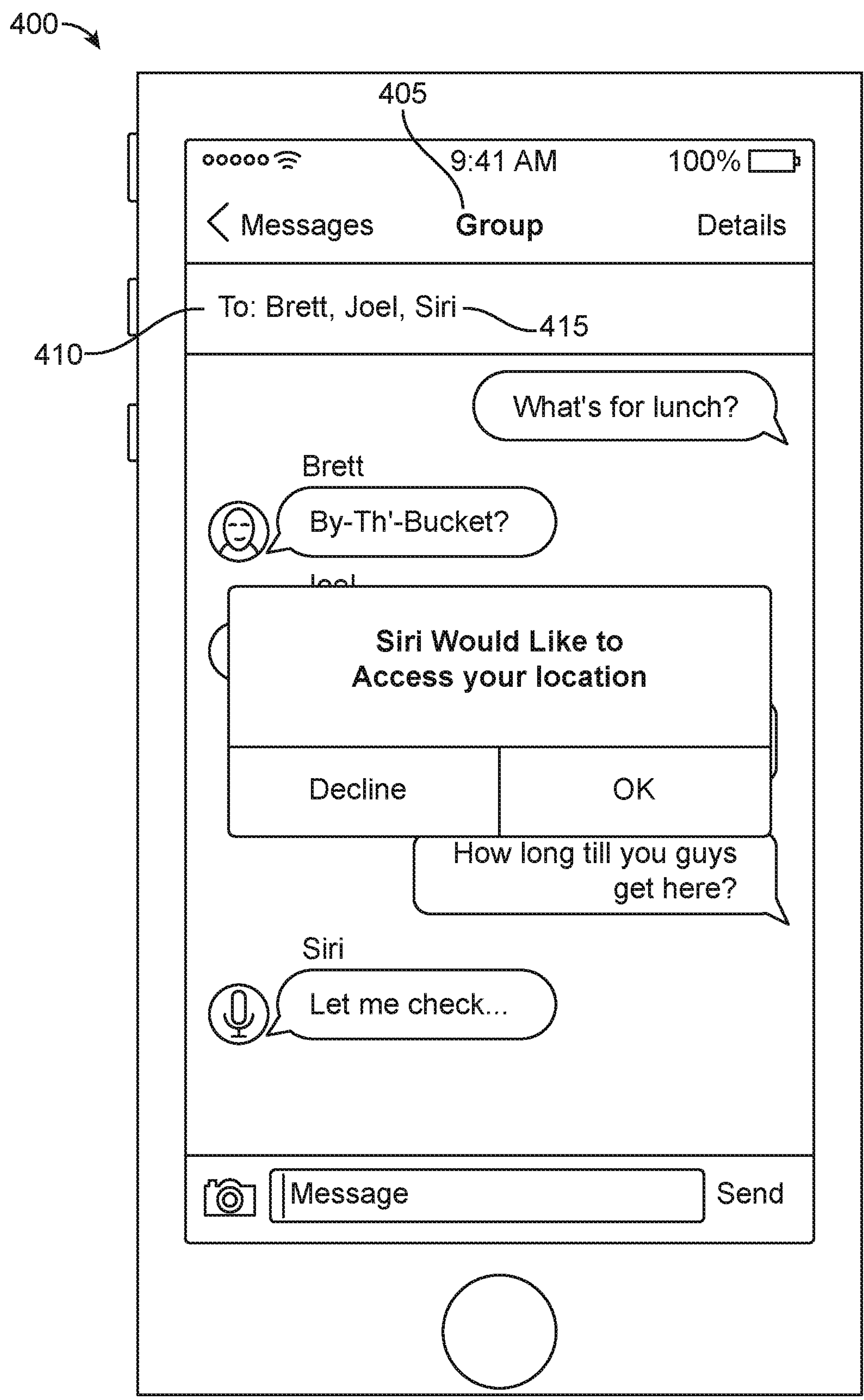

FIG. 4D shows that virtual assistant 415 is requesting authorization to access the location information of the user. This message can be presented to each of the participants of the communication session. If a user selects to decline the authorization request, the virtual assistant will not be able to access the location information of the user. If a user selects to authorize the personal assistant to access the location information of the user, virtual assistant 415 will be able to request and receive the location information. For example, the virtual assistant can request the location information from the users client device. Alternatively, virtual assistant 415 can gather the location information from a content management system that maintains user accounts for the users, such as content management system 105 of FIG. 1.

Figure 4E:
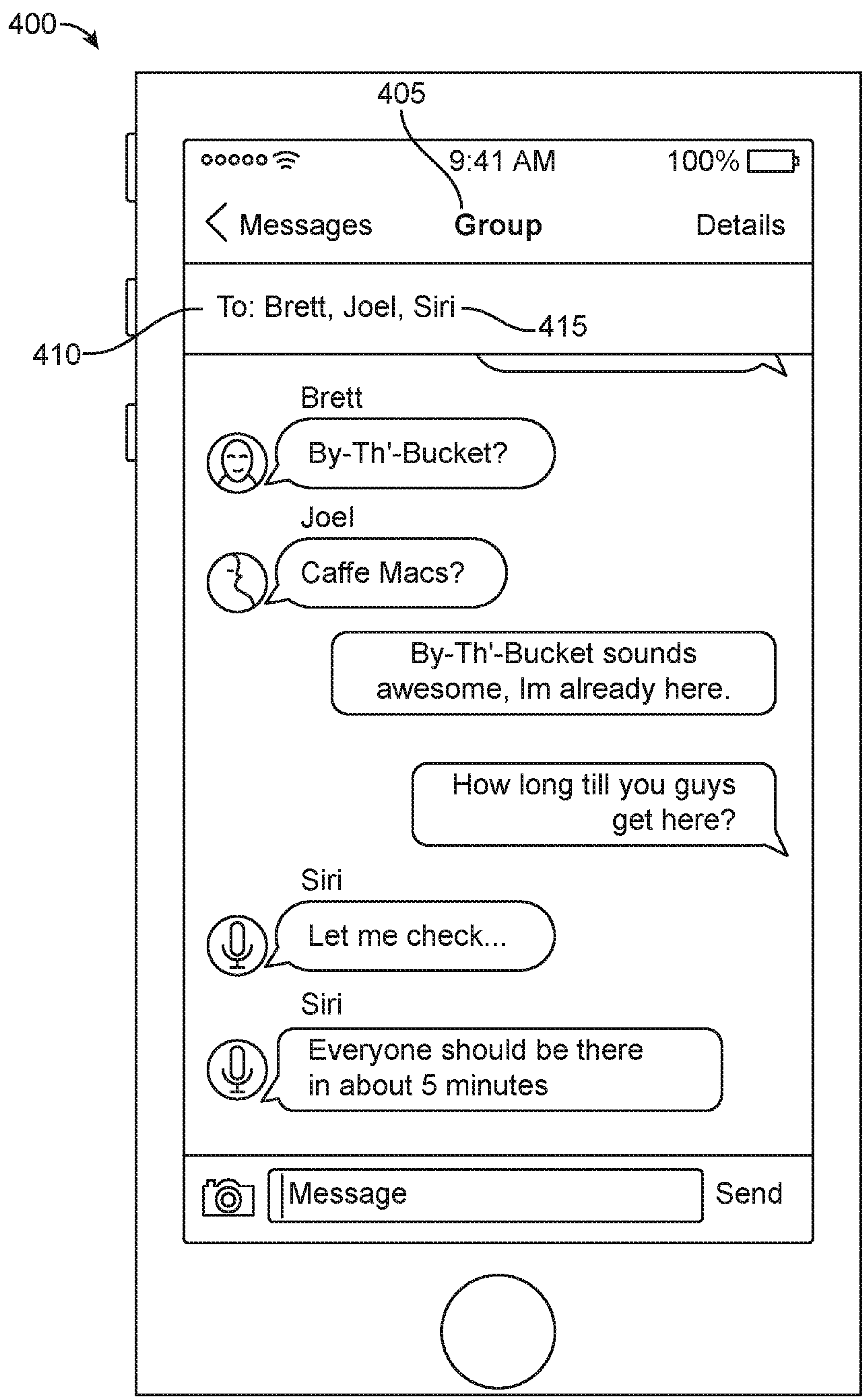

FIG. 4E shows that the virtual assistant 415 has entered a message into the communication session that completes the user's task of determining when the other participants will arrive at the restaurant. The message from virtual assistant 415 can be presented only to the user of the client device 400 as part of the communication session 405. Alternatively, the message from virtual assistant 415 can be presented on the client device of one or more of the other participants of the communication session 405.

Figure 4F:
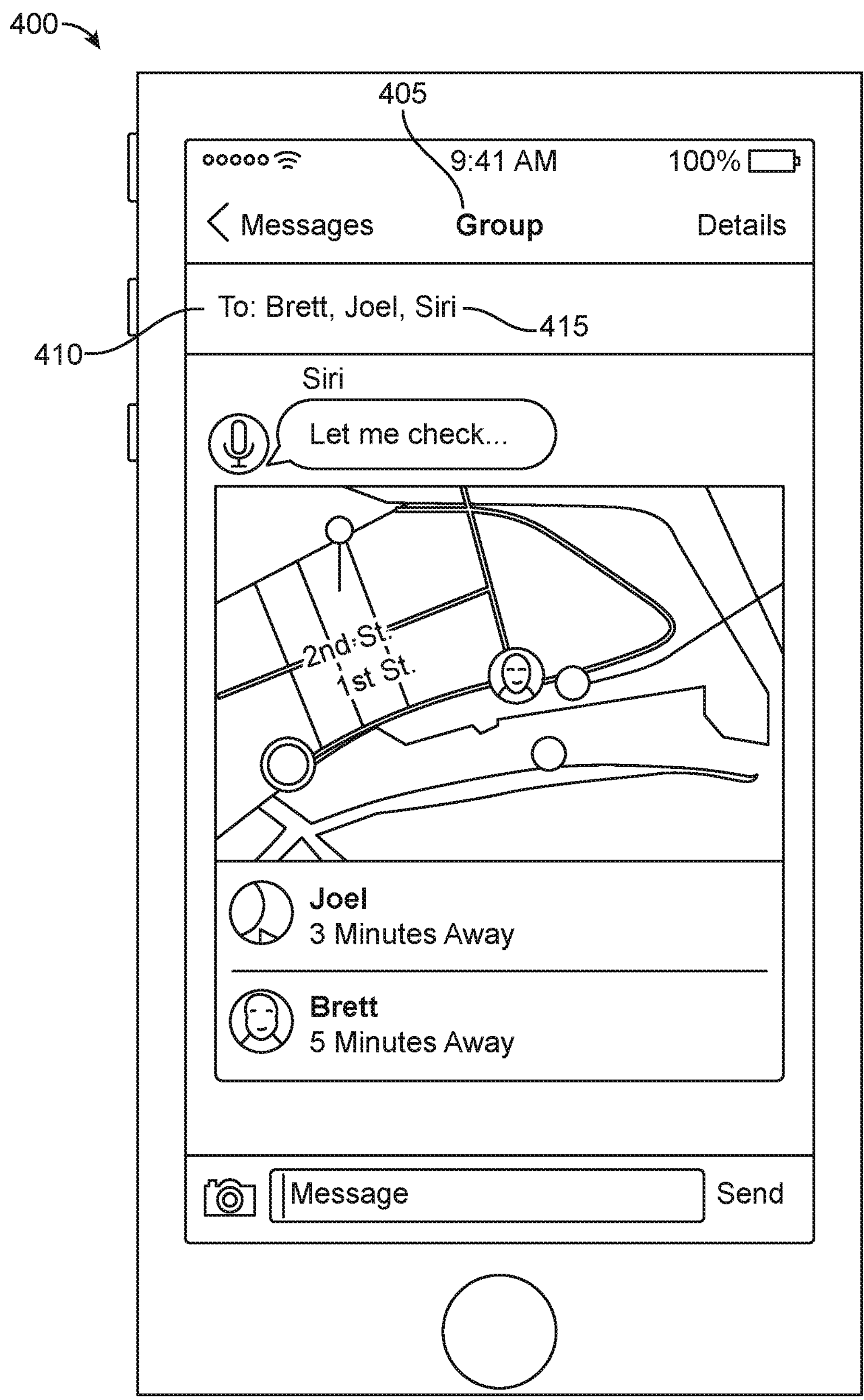

FIG. 4F shows another embodiment of virtual assistant 415 providing the user with the estimated time of arrival of the other participants of the communication session. As shown, a map interface is presented as part of the communication session and the location of the other participants is presented on the map interface.

Figure 5A:
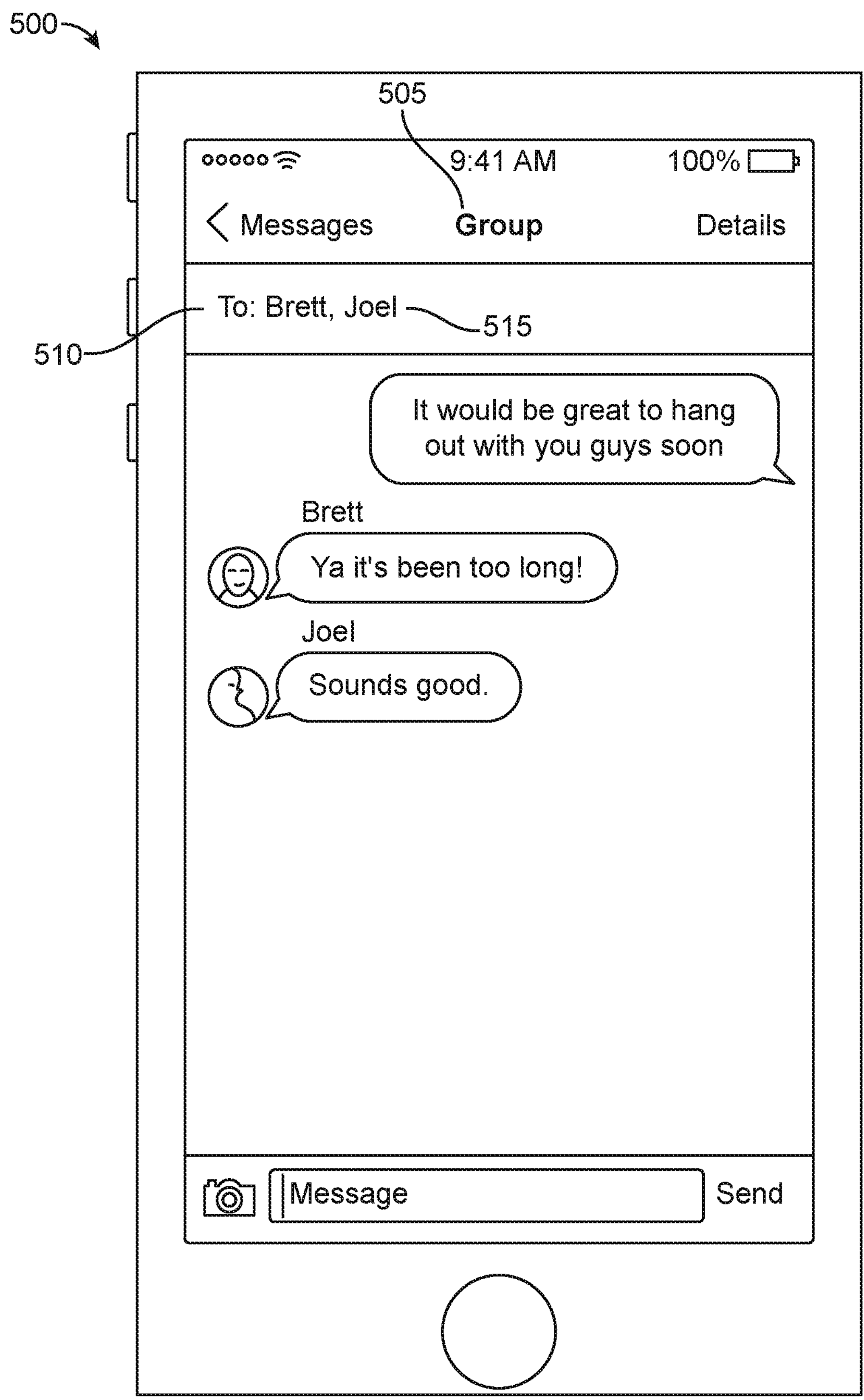
FIGS. 5A-5D show an example of the virtual assistant assisting participants of a communication session to schedule a meeting.

FIGS. 5A-5D show an example of the virtual assistant assisting participants of a communication session to schedule a meeting. As shown in FIG. 5A, a user of a client device 500 is participating in a communication session 505 with two other participants. The participants of a communication session 505 are discussing meeting up to hang out. As shown by the participant list 510, the virtual assistant is not being utilized in relation to the communication session 505.

Figure 5B:
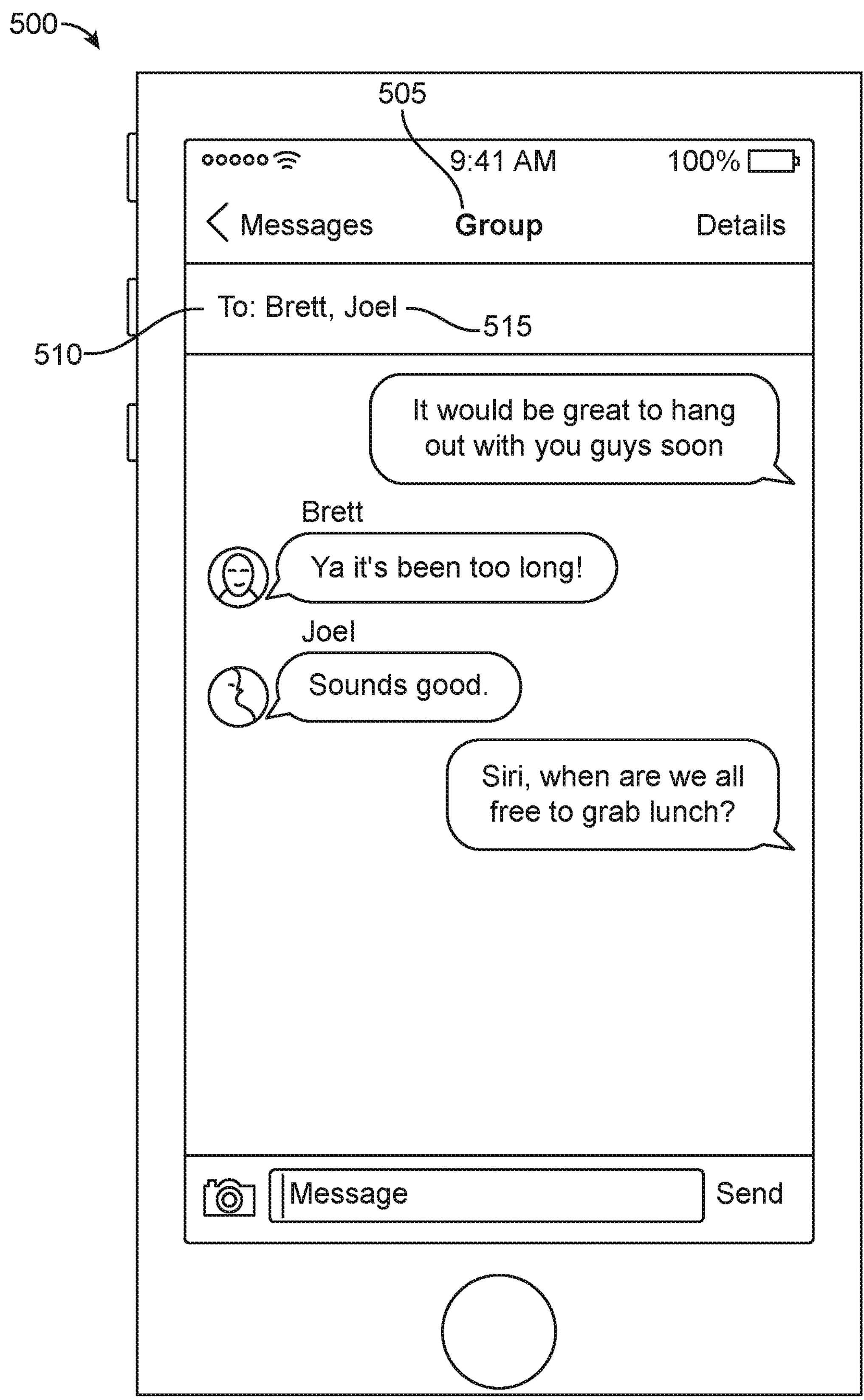

FIG. 5B shows a message entered by the user of client device 500 that is addressed to virtual assistant 515. The message further identifies a task of determining a time when each participant of the communication session 505 is available for lunch. This message can indicate that the user would like to utilize the virtual assistant as well as provide the specified task.

Figure 5C:
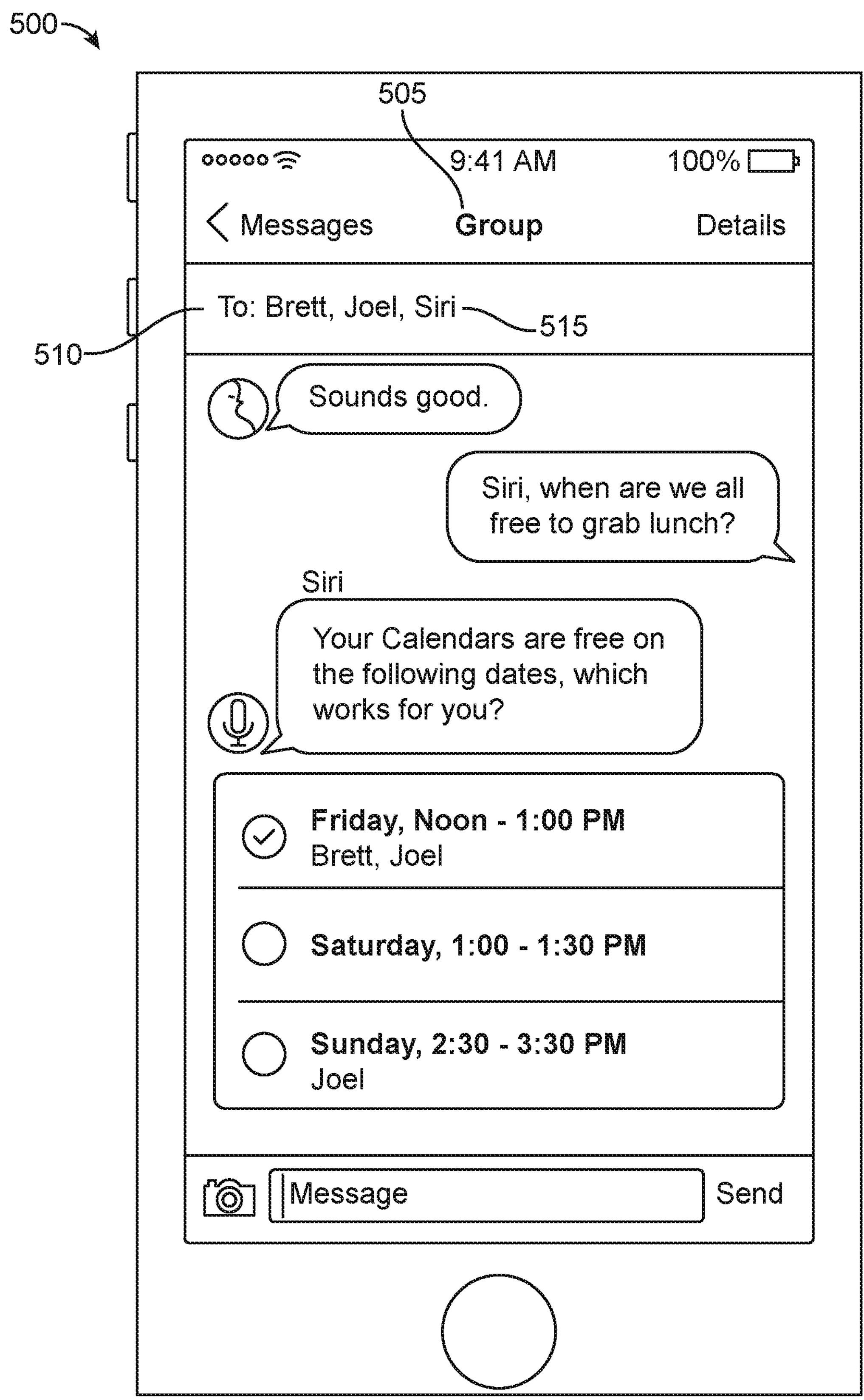

FIG. 5C shows that virtual assistant 515 has been added to the participant list 510 of the communication session 505, indicating that a user has selected to utilize virtual assistant 515. Further, the virtual assistant has presented a poll as part of the communication session 505 that provides the participants with an opportunity to select the time that best works for them. Virtual assistant 515 can determine the presented times based on calendar data gathered from each participant. For example, virtual assistant 515 can gather the calendar data from the client devices of the participants or, alternatively, from a content management system that maintains user accounts for the participants. The presented times can be times at which each of the participants' calendars is not booked (e.g., times at which each participant is free). Further, in some embodiments, virtual assistant 515 can place a temporary hold on each of the participants' calendars for the presented times. This can ensure that the presented times will not be booked while virtual assistant 515 is awaiting responses from the participants. Virtual assistant 515 can place this hold by communicating with the participants' client devices and/or by communicating with the content management system to edit calendar data for the participants.

Figure 5D:
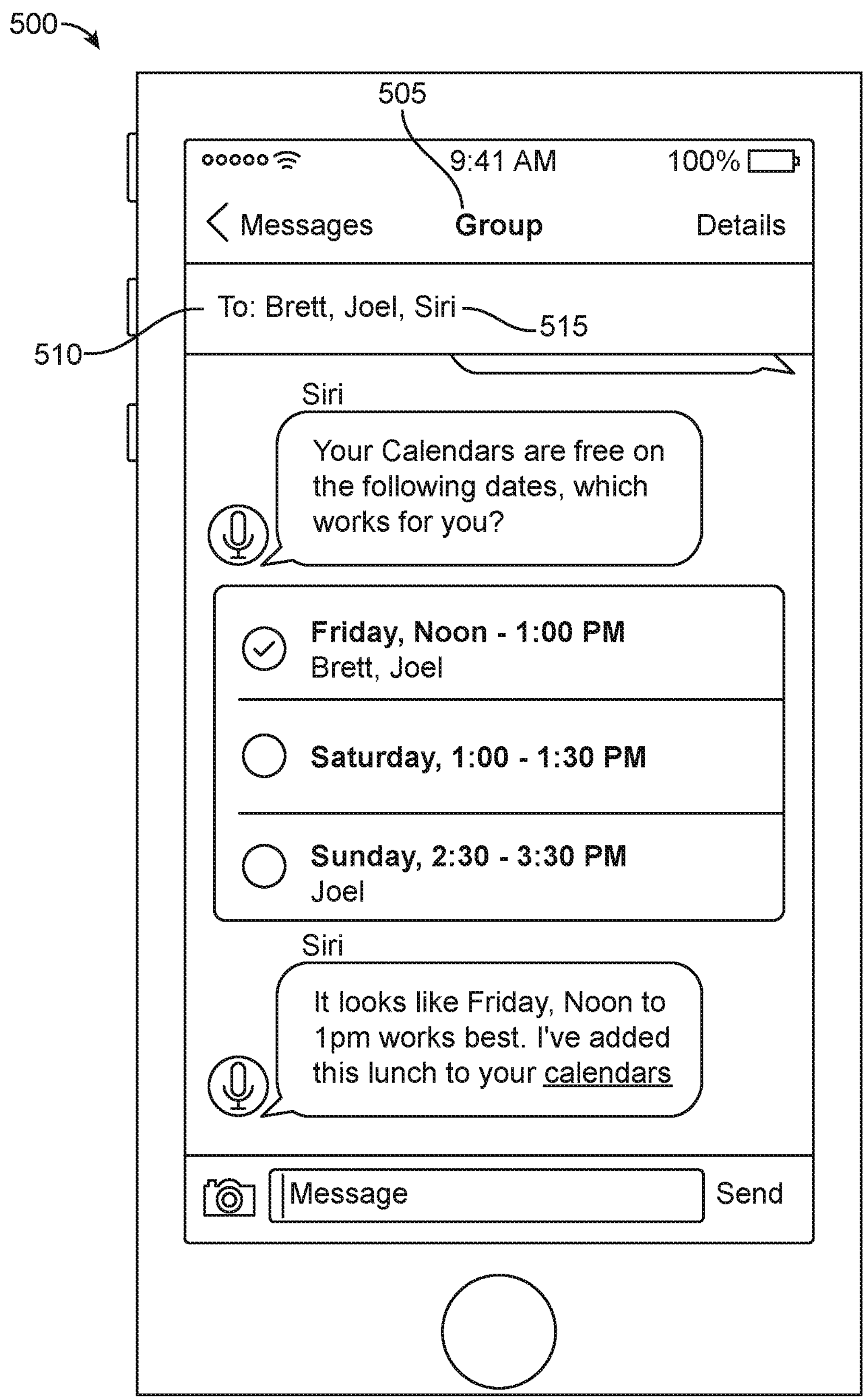

FIG. 5D shows that virtual assistant 515 has determined that Friday from noon to 1 pm is the best time for the meeting and that virtual assistant 515 has added the lunch meeting to the participants' calendars.

Figure 6A:
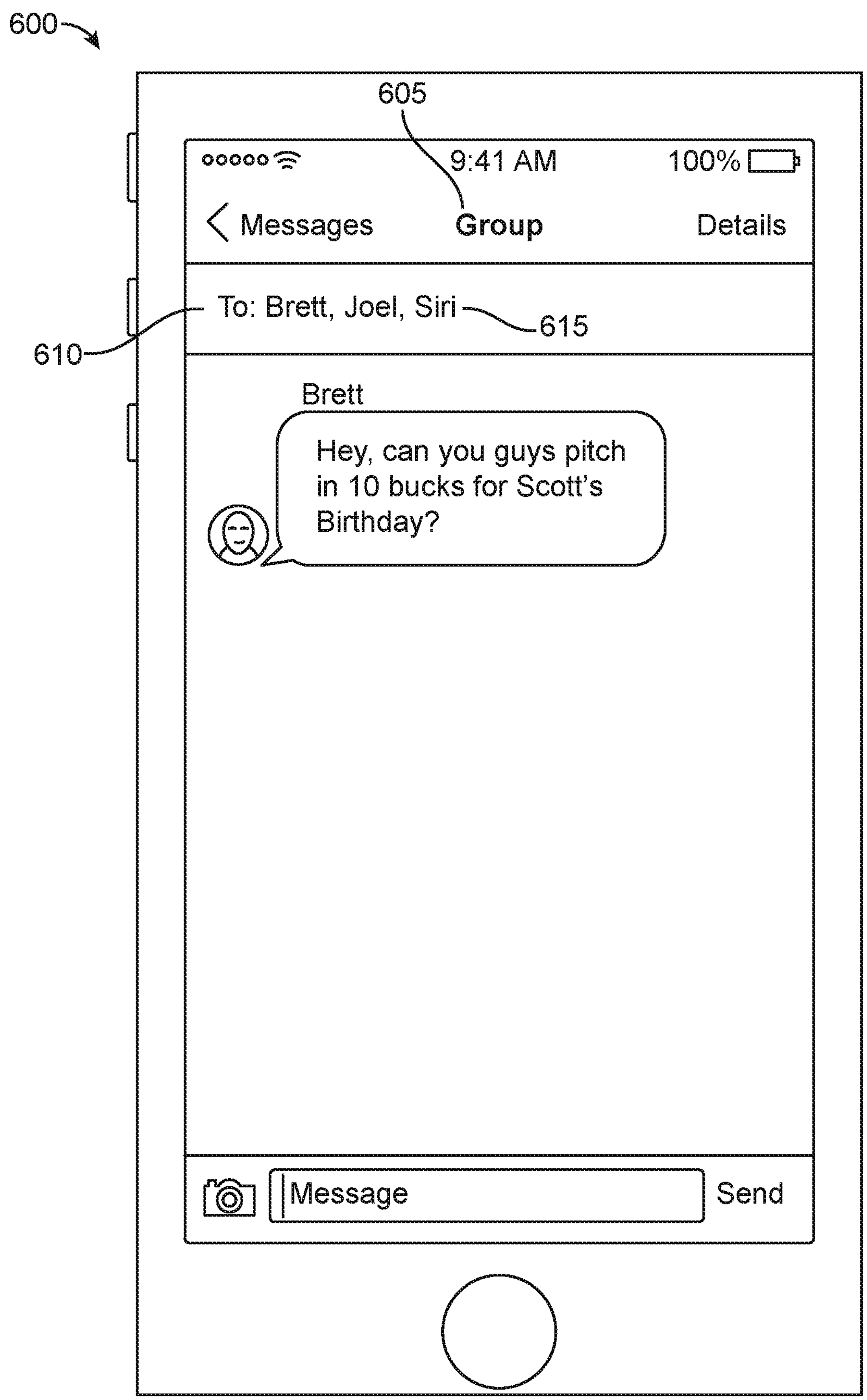
FIGS. 6A-6E show an example of a virtual assistant assisting participants of a communication session to complete a financial transaction.

FIGS. 6A-6E show an example of a virtual assistant assisting participants of a communication session to complete a financial transaction. As shown in FIG. 6A, a user of the client device 600 has received a message as a part of a communication session 605. As indicated by the participant list 610, the virtual assistant is being utilized.

Figure 6B:
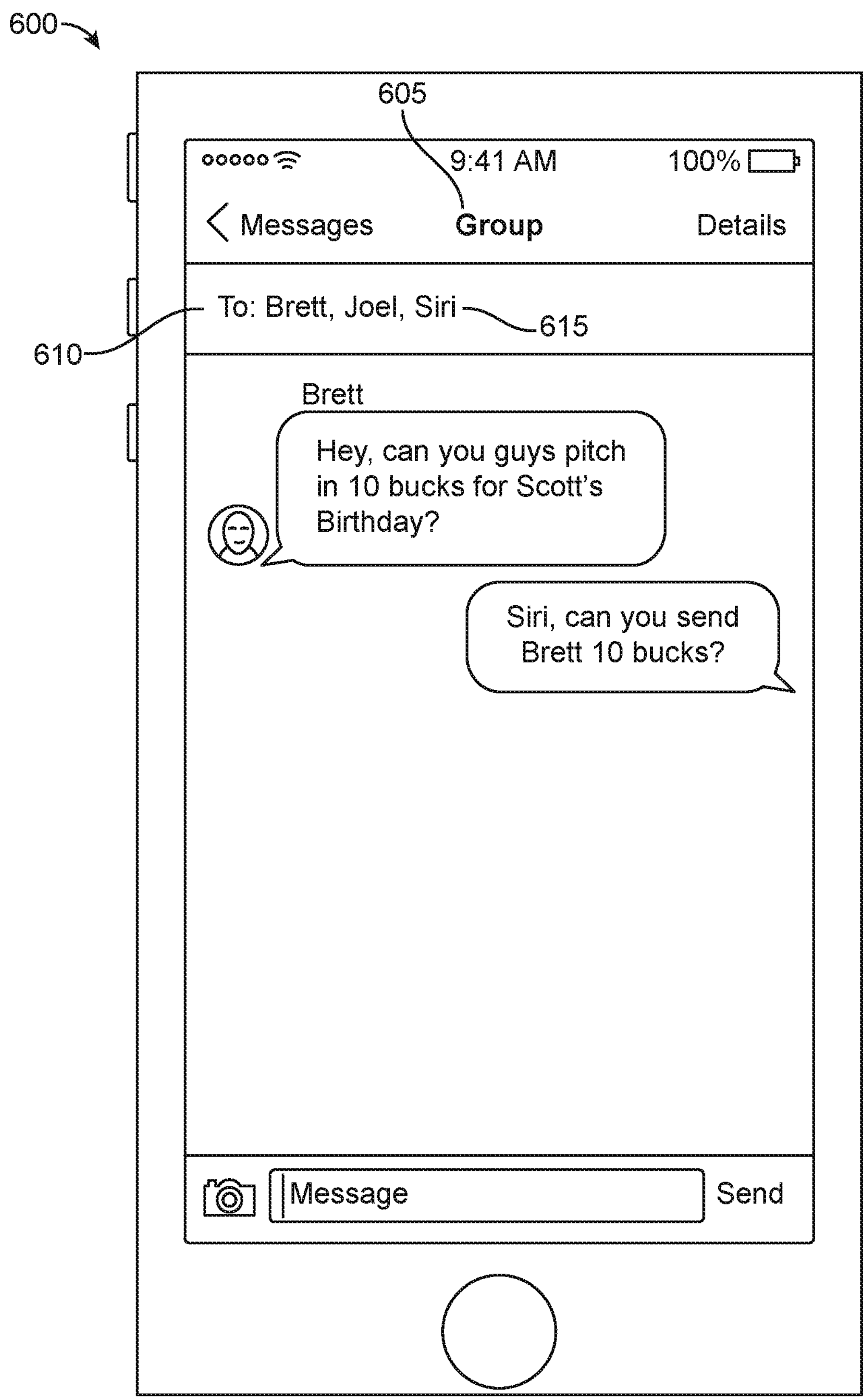

FIG. 6B shows that the user of the client device 600 has entered a message as part of the communication session and that the message is directed to virtual assistant 615. Further, the message requests that virtual assistant 615 send ten dollars to Brett. This message is intended for virtual assistant 615 rather than the other participants of the communication session 605 so the message can be presented on only client device 600 and not shown or presented on the client devices of the other participants.

Figure 6C:
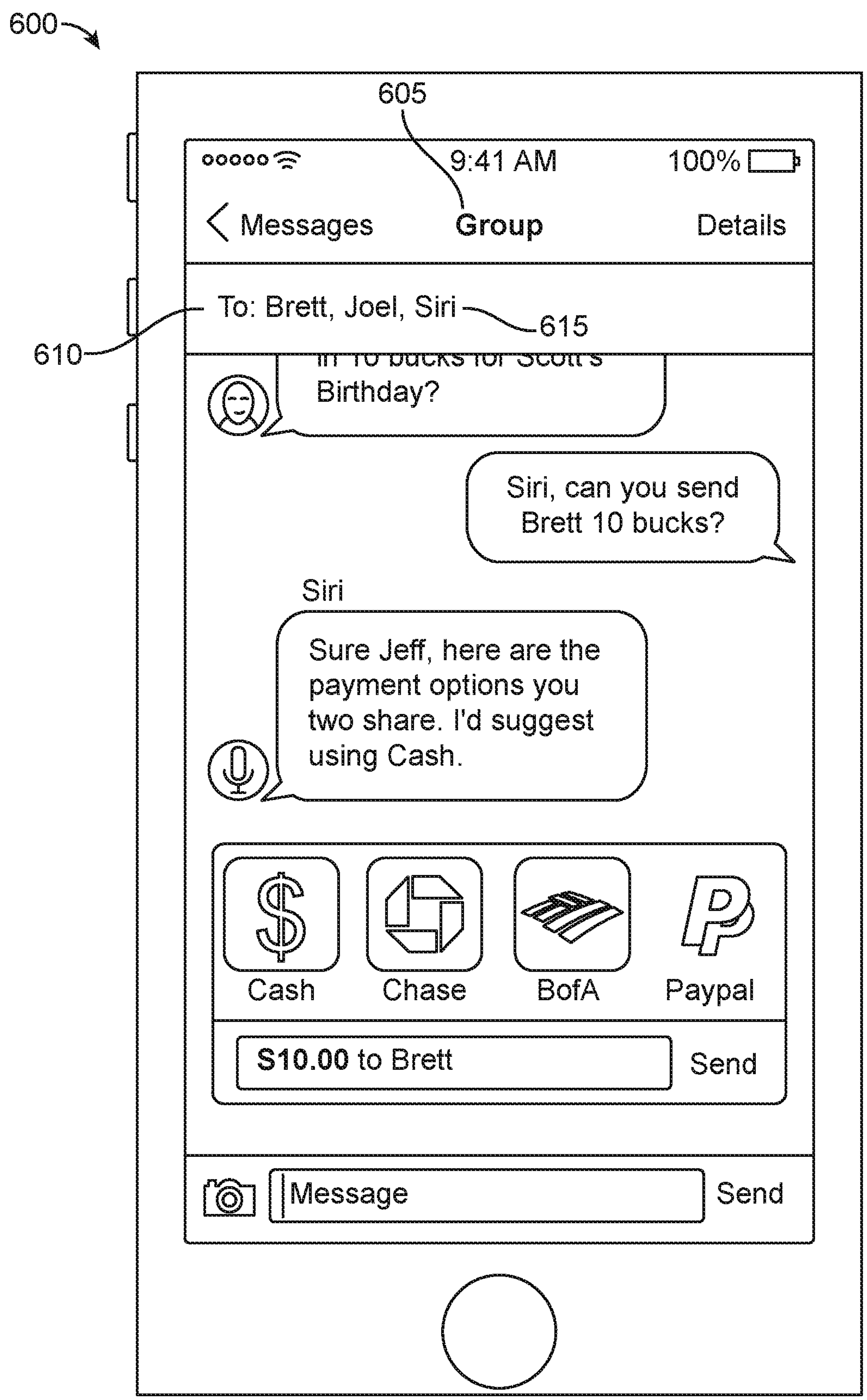

FIG. 6C shows that virtual assistant 615 has entered a message in response to the user's request. Again, this message can be presented only on the user's client device 605 and not shown to the other participants of the communication session.

As shown, virtual assistant 615 has presented the user with multiple payments options which the user can use to send money. The presented payment options can include financial applications that are available to the user as well as the intended recipient. Virtual assistant 615 can gather data identifying the financial applications that are available to the user and the intended recipient by querying the respective users' client devices and/or communicating with a content management system that maintains user accounts for the respective users.

Virtual assistant 615 also suggests a specific payment option which may be the financial application that is used most commonly by both the user and the intended recipient. The user can select the desired financial application to send the money as well as confirm the payment amount and the intended recipient.

Figure 6D:
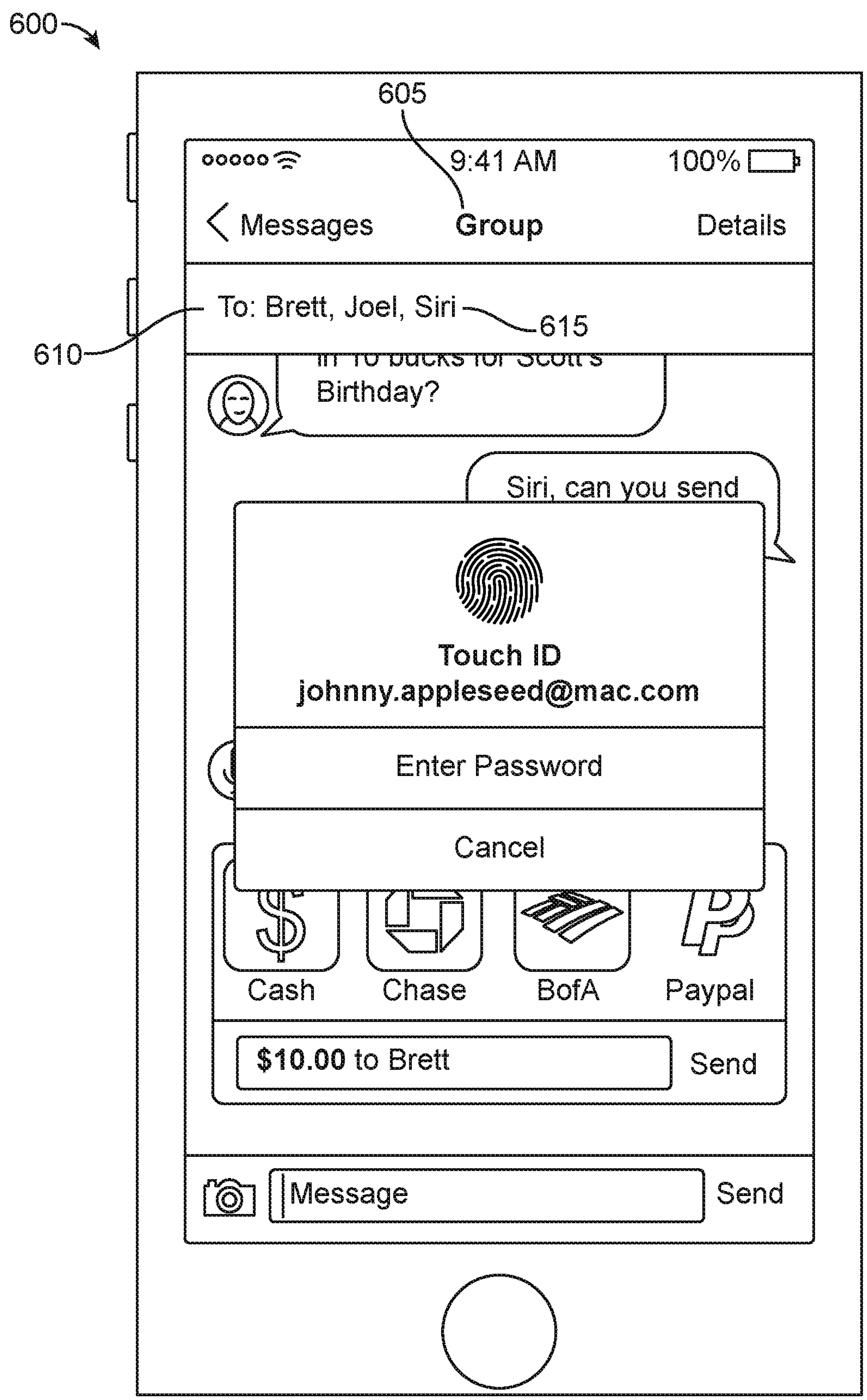

FIG. 6D shows that Virtual assistant 615 can be required to provide authentication information to complete the financial transaction. For example, the user can be required to enter a password, fingerprint, etc.

Figure 6E:
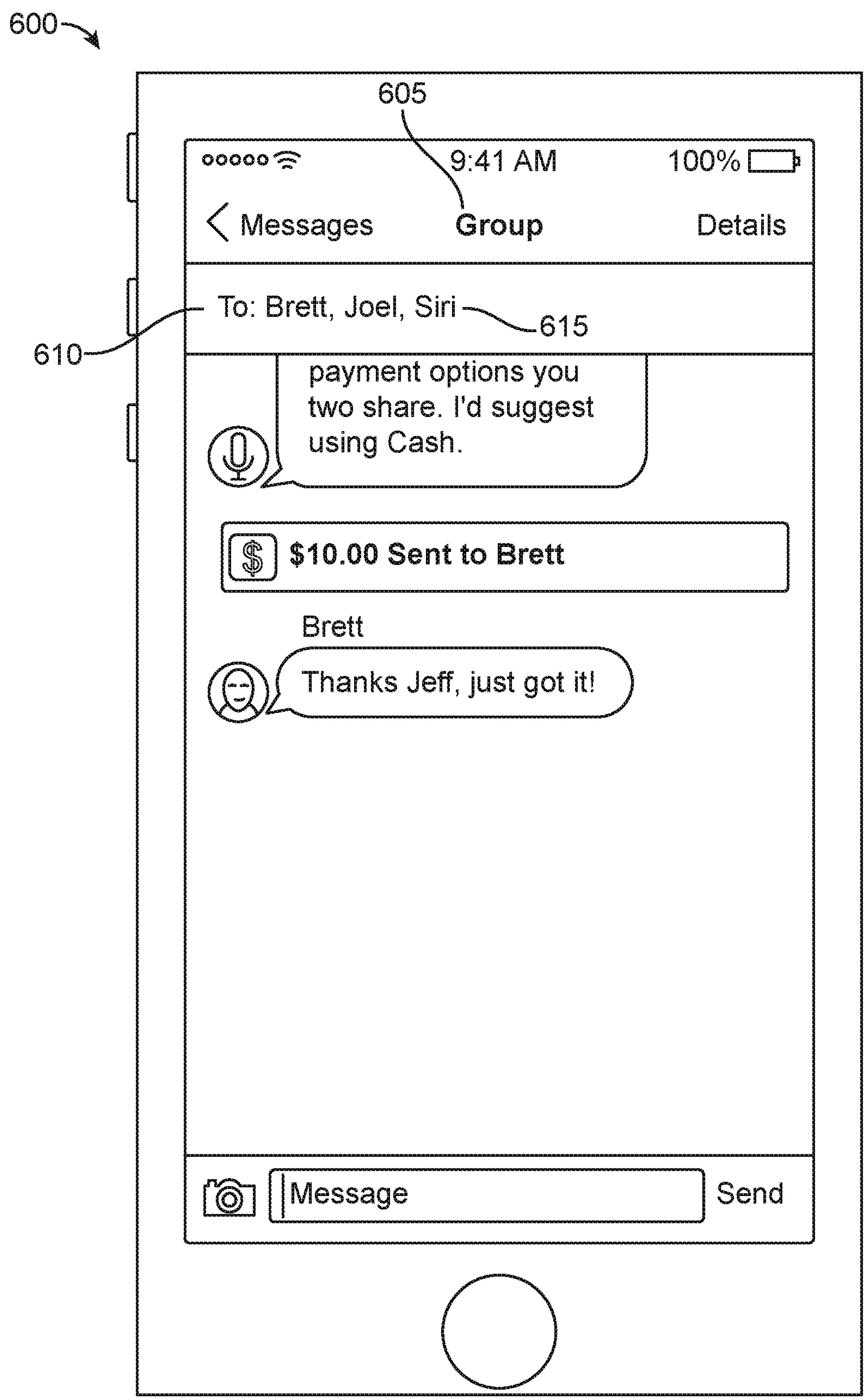

FIG. 6E shows that virtual assistant 615 has presented a message confirming that the funds were transferred as part of the financial transaction. Again, this message can be presented only to the user rather than to the other participants of the communication session 605. Finally, the recipient of the funds has entered a message into the communication session 605 confirming that the funds have been received.

Figure 7A:
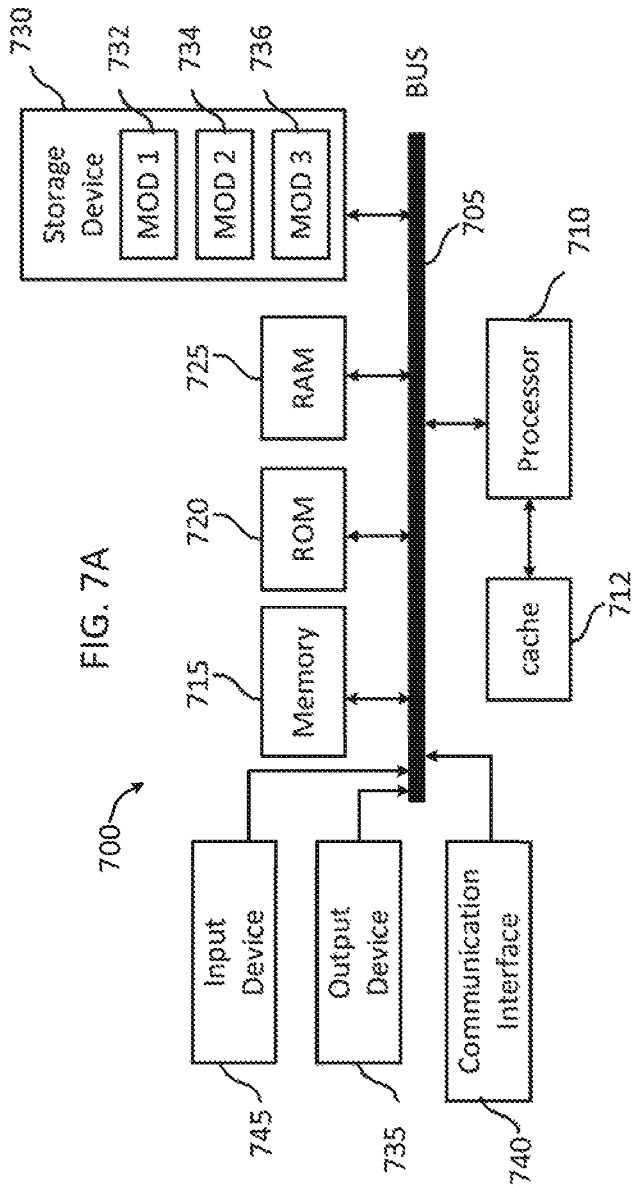
FIGS. 7A and 7B illustrate exemplary possible system embodiments.
Figure 7B:
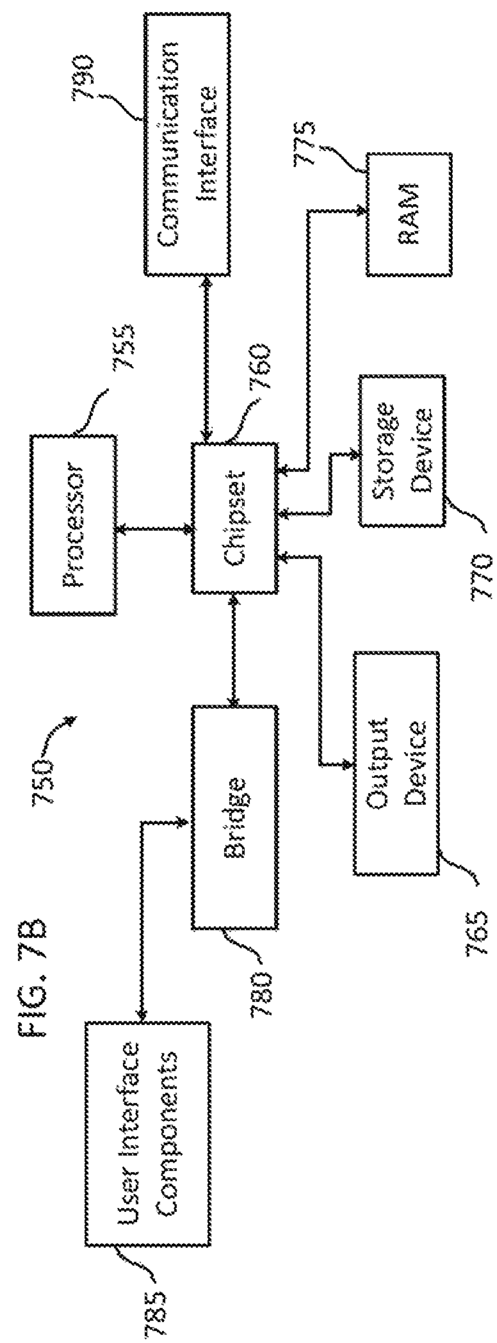

FIG. 7A, and FIG. 7B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 705. Exemplary system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that exemplary systems 700 and 750 can have more than one processor 710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A non-transitory computer-readable storage medium containing instructions that, when executed by a computer processor of a first client device, cause the first client device to:

display, by the first client device, as part of a communication session that takes place within a messaging application between a first user operating the first client device and at least a second user, a first message prepared by the first user;

determine, by a virtual assistant of the first client device, based on a semantic analysis of the first message, that the first message identifies a first task with which the virtual assistant can assist the first user;

in response to determining that the first message identifies the first task, assist, by the first client device, the first user with the first task, wherein assisting the first user with the first task includes:

displaying, as part of the communication session and within the messaging application, a response generated by the virtual assistant based on the first task, wherein the response is not transmitted to at least the second user; and receive a user selection of the displayed response;

in response to receiving the user selection of the displayed response, present, on the first client device and as part of the communication session, additional content generated by the virtual assistant based on the displayed response.

2. The non-transitory computer-readable storage medium of claim 1, wherein the instructions, when executed by the computer processor, further cause the first client device to:

display, by the first client device, as part of the communication session, a second message prepared by the first user;

determine, by the virtual assistant of the first client device, based on a semantic analysis of the second message, whether the second message is directed to the virtual assistant or to at least the second user;

determine, by the virtual assistant of the first client device, based on the semantic analysis of the second message, that the second message is directed to at least the second user; and in response to determining that the second message is directed to at least the second user, transmit, by the first client device, the second message to at least the second user as part of the communication session.

3. The non-transitory computer-readable storage medium of claim 2, wherein the instructions, when executed by the computer processor, further cause the first client device to:

determine, by the virtual assistant of the first client device, based on the semantic analysis of the second message, that the second message identifies a second task with which the virtual assistant can assist the first user; and in response to determining that the second message identifies the second task, assist, by the first client device, the first user with the second task.

4. The non-transitory computer-readable storage medium of claim 3, wherein the instructions, when executed by the computer processor, further cause the first client device to:

present, on the first client device and as part of the communication session, a request message asking the first user whether the first user would like the virtual assistant to assist the first user with the second task; and receive an input indicating that the first user would like the virtual assistant to assist the first user with the second task.

5. The non-transitory computer-readable storage medium of claim 1, wherein the displayed response includes one or more words determined based on the first task.

6. The non-transitory computer-readable storage medium of claim 1, wherein the instructions, when executed by the computer processor, further cause the first client device to:

generate a second message based on the displayed response; and transmit the second message to at least the second user.

7. The non-transitory computer-readable storage medium of claim 1, wherein the instructions, when executed by the computer processor, further cause the first client device to:

identify, by the virtual assistant of the first client device, a plurality of applications installed on the first client device that are capable of completing the first task;

present, on the first client device and as part of the communication session, a request message prompting the first user to select an application from the plurality of applications to complete the first task;

receive an input from the first user selecting a first application from the plurality of applications;

in response to receiving the input from the first user, execute the selected first application to perform the first task; and present, on the first client device and as part of the communication session, a confirmation message indicating the first task was performed.

8. The non-transitory computer-readable storage medium of claim 1, wherein the first task comprises retrieving information associated with the first message.

9. The non-transitory computer-readable storage medium of claim 1, wherein the instructions, when executed by the computer processor, further cause the first client device to:

transmit, to a second client device as part of the communication session, a notification message indicating that the virtual assistant is being utilized in relation to the communication session, wherein the second client device is associated with the second user.

10. The non-transitory computer-readable storage medium of claim 1, wherein the first task comprises performing a financial transaction between the first user and at least the second user.

11. The non-transitory computer-readable storage medium of claim 10, wherein the instructions, when executed by the computer processor, further cause the first client device to:

identify, by the virtual assistant of the first client device, a set of financial applications installed on both the first client device and a second client device that are capable of completing the financial transaction, wherein the second client device is associated with the second user;

transmit, to the second client device, a second message as part of the communication session, the second message prompting the second user to select a financial application from the set of financial applications to complete the financial transaction;

receive, from the second client device, a first reply message identifying the financial application selected from the set of financial applications selected by the second user to complete the financial transaction; and execute the financial application.

12. The non-transitory computer-readable storage medium of claim 1, wherein the first task comprises scheduling a meeting including the first user and at least the second user.

13. The non-transitory computer-readable storage medium of claim 12, wherein the instructions, when executed by the computer processor, further cause the first client device to:

identify, based on calendar data for the first user and at least the second user, a set of candidate times for the meeting;

place a temporary hold on the set of candidate times, wherein the set of candidate times appear booked in calendars of the first user and at least the second user while the temporary hold is in place;

present the first user and at least the second user with a poll to select from the set of candidate times, the poll presented as part of the communication session; and schedule the meeting during one of the candidate times based on response data received from the first user and at least the second user to the poll.

14. The non-transitory computer-readable storage medium of claim 1, wherein the first task comprises determining an estimated time of arrival for at least the second user.

15. The non-transitory computer-readable storage medium of claim 14, wherein determining the estimated time of arrival for at least the second user comprises:

requesting authorization to access location information of at least the second user; and in accordance with a determination that the second user selects to authorize access to the location information of at least the second user:

gathering the location information of at least the second user; and displaying, based on the location information of at least the second user, the estimated time of arrival for at least the second user.

16. A method, comprising:

at a first client device with one or more processors, memory, and a display:

displaying, by the first client device, as part of a communication session that takes place within a messaging application between a first user operating the first client device and at least a second user, a first message prepared by the first user;

determining, by a virtual assistant of the first client device, based on a semantic analysis of the first message, that the first message identifies a first task with which the virtual assistant can assist the first user;

in response to determining that the first message identifies the first task, assisting, by the first client device, the first user with the first task, wherein assisting the first user with the first task includes:

displaying, as part of the communication session and within the messaging application, a response generated by the virtual assistant based on the first task, wherein the response is not transmitted to at least the second user; and receiving a user selection of the displayed response;

in response to receiving the user selection of the displayed response, presenting, on the first client device and as part of the communication session, additional content generated by the virtual assistant based on the displayed response.

17. The method of claim 16, further comprising:

displaying, by the first client device, as part of the communication session, a second message prepared by the first user;

determining, by the virtual assistant of the first client device, based on a semantic analysis of the second message, whether the second message is directed to the virtual assistant or to at least the second user;

determining, by the virtual assistant of the first client device, based on the semantic analysis of the second message, that the second message is directed to at least the second user; and in response to determining that the second message is directed to at least the second user, transmitting, by the first client device, the second message to at least the second user as part of the communication session.

18. The method of claim 17, further comprising:

determining, by the virtual assistant of the first client device, based on the semantic analysis of the second message, that the second message identifies a second task with which the virtual assistant can assist the first user; and in response to determining that the second message identifies the second task, assisting, by the first client device, the first user with the second task.

19. The method of claim 18, further comprising:

presenting, on the first client device and as part of the communication session, a request message asking the first user whether the first user would like the virtual assistant to assist the first user with the second task; and receiving an input indicating that the first user would like the virtual assistant to assist the first user with the second task.

20. The method of claim 16, wherein the displayed response includes one or more words determined based on the first task.

21. The method of claim 16, further comprising:

generating a second message based on the displayed response; and transmitting the second message to at least the second user.

22. The method of claim 16, further comprising:

identifying, by the virtual assistant of the first client device, a plurality of applications installed on the first client device that are capable of completing the first task;

presenting, on the first client device and as part of the communication session, a request message prompting the first user to select an application from the plurality of applications to complete the first task;

receiving an input from the first user selecting a first application from the plurality of applications;

in response to receiving the input from the first user, executing the selected first application to perform the first task; and presenting, on the first client device and as part of the communication session, a confirmation message indicating the first task was performed.

23. The method of claim 16, wherein the first task comprises retrieving information associated with the first message.

24. The method of claim 16, further comprising:

transmitting, to a second client device as part of the communication session, a notification message indicating that the virtual assistant is being utilized in relation to the communication session, wherein the second client device is associated with the second user.

25. The method of claim 16, wherein the first task comprises performing a financial transaction between the first user and at least the second user.

26. The method of claim 25, further comprising:

identifying, by the virtual assistant of the first client device, a set of financial applications installed on both the first client device and a second client device that are capable of completing the financial transaction, wherein the second client device is associated with the second user;

transmitting, to the second client device, a second message as part of the communication session, the second message prompting the second user to select a financial application from the set of financial applications to complete the financial transaction;

receiving, from the second client device, a first reply message identifying the financial application selected from the set of financial applications selected by the second user to complete the financial transaction; and executing the financial application.

27. The method of claim 16, wherein the first task comprises scheduling a meeting including the first user and at least the second user.

28. The method of claim 27, further comprising:

identifying, based on calendar data for the first user and at least the second user, a set of candidate times for the meeting;

placing a temporary hold on the set of candidate times, wherein the set of candidate times appear booked in calendars of the first user and at least the second user while the temporary hold is in place;

presenting the first user and at least the second user with a poll to select from the set of candidate times, the poll presented as part of the communication session; and scheduling the meeting during one of the candidate times based on response data received from the first user and at least the second user to the poll.

29. The method of claim 16, wherein the first task comprises determining an estimated time of arrival for at least the second user.

30. The method of claim 29, wherein determining the estimated time of arrival for at least the second user comprises:

requesting authorization to access location information of at least the second user; and in accordance with a determination that the second user selects to authorize access to the location information of at least the second user:

gathering the location information of at least the second user; and displaying, based on the location information of at least the second user, the estimated time of arrival for at least the second user.

31. A first client device, comprising:

a computer processor; and a memory containing instructions that, when executed by the computer processor, cause the first client device to:

display, by the first client device, as part of a communication session that takes place within a messaging application between a first user operating the first client device and at least a second user, a first message prepared by the first user;

determine, by a virtual assistant of the first client device, based on a semantic analysis of the first message, that the first message identifies a first task with which the virtual assistant can assist the first user;

in response to determining that the first message identifies the first task, assist, by the first client device, the first user with the first task, wherein assisting the first user with the first task includes:

displaying, as part of the communication session and within the messaging application, a response generated by the virtual assistant based on the first task, wherein the response is not transmitted to at least the second user; and receive a user selection of the displayed response;

in response to receiving the user selection of the displayed response, present, on the first client device and as part of the communication session, additional content generated by the virtual assistant based on the displayed response.

32. The first client device of claim 31, wherein the instructions, when executed by the computer processor, further cause the first client device to:

display, by the first client device, as part of the communication session, a second message prepared by the first user;

determine, by the virtual assistant of the first client device, based on a semantic analysis of the second message, whether the second message is directed to the virtual assistant or to at least the second user;

determine, by the virtual assistant of the first client device, based on the semantic analysis of the second message, that the second message is directed to at least the second user; and in response to determining that the second message is directed to at least the second user, transmit, by the first client device, the second message to at least the second user as part of the communication session.

33. The first client device of claim 32, wherein the instructions, when executed by the computer processor, further cause the first client device to:

determine, by the virtual assistant of the first client device, based on the semantic analysis of the second message, that the second message identifies a second task with which the virtual assistant can assist the first user; and in response to determining that the second message identifies the second task, assist, by the first client device, the first user with the second task.

34. The first client device of claim 33, wherein the instructions, when executed by the computer processor, further cause the first client device to:

present, on the first client device and as part of the communication session, a request message asking the first user whether the first user would like the virtual assistant to assist the first user with the second task; and receive an input indicating that the first user would like the virtual assistant to assist the first user with the second task.

35. The first client device of claim 31, wherein the displayed response includes one or more words determined based on the first task.

36. The first client device of claim 31, wherein the instructions, when executed by the computer processor, further cause the first client device to:

generate a second message based on the displayed response; and transmit the second message to at least the second user.

37. The first client device of claim 31, wherein the instructions, when executed by the computer processor, further cause the first client device to:

identify, by the virtual assistant of the first client device, a plurality of applications installed on the first client device that are capable of completing the first task;

present, on the first client device and as part of the communication session, a request message prompting the first user to select an application from the plurality of applications to complete the first task;

receive an input from the first user selecting a first application from the plurality of applications;

in response to receiving the input from the first user, execute the selected first application to perform the first task; and present, on the first client device and as part of the communication session, a confirmation message indicating the first task was performed.

38. The first client device of claim 31, wherein the first task comprises retrieving information associated with the first message.

39. The first client device of claim 31, wherein the instructions, when executed by the computer processor, further cause the first client device to:

transmit, to a second client device as part of the communication session, a notification message indicating that the virtual assistant is being utilized in relation to the communication session, wherein the second client device is associated with the second user.

40. The first client device of claim 31, wherein the first task comprises performing a financial transaction between the first user and at least the second user.

41. The first client device of claim 40, wherein the instructions, when executed by the computer processor, further cause the first client device to:

identify, by the virtual assistant of the first client device, a set of financial applications installed on both the first client device and a second client device that are capable of completing the financial transaction, wherein the second client device is associated with the second user;

transmit, to the second client device, a second message as part of the communication session, the second message prompting the second user to select a financial application from the set of financial applications to complete the financial transaction;

receive, from the second client device, a first reply message identifying the financial application selected from the set of financial applications selected by the second user to complete the financial transaction; and execute the financial application.

42. The first client device of claim 31, wherein the first task comprises scheduling a meeting including the first user and at least the second user.

43. The first client device of claim 42, wherein the instructions, when executed by the computer processor, further cause the first client device to:

identify, based on calendar data for the first user and at least the second user, a set of candidate times for the meeting;

place a temporary hold on the set of candidate times, wherein the set of candidate times appear booked in calendars of the first user and at least the second user while the temporary hold is in place;

present the first user and at least the second user with a poll to select from the set of candidate times, the poll presented as part of the communication session; and schedule the meeting during one of the candidate times based on response data received from the first user and at least the second user to the poll.

44. The first client device of claim 31, wherein the first task comprises determining an estimated time of arrival for at least the second user.

45. The first client device of claim 44, wherein determining the estimated time of arrival for at least the second user comprises:

requesting authorization to access location information of at least the second user; and in accordance with a determination that the second user selects to authorize access to the location information of at least the second user:

gathering the location information of at least the second user; and displaying, based on the location information of at least the second user, the estimated time of arrival for at least the second user.

* * * * *